United States Patent
Sugasaki

(10) Patent No.: US 7,531,291 B2
(45) Date of Patent: May 12, 2009

(54) LASER-DECOMPOSABLE RESIN COMPOSITION AND LASER-DECOMPOSABLE PATTERN-FORMING MATERIAL AND FLEXOGRAPHIC PRINTING PLATE PRECURSOR OF LASER ENGRAVING TYPE USING THE SAME

(75) Inventor: Atsushi Sugasaki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/848,269

(22) Filed: Aug. 31, 2007

(65) Prior Publication Data

US 2008/0057437 A1    Mar. 6, 2008

(30) Foreign Application Priority Data

| Sep. 1, 2006 | (JP) | ............................ 2006-237784 |
| Sep. 27, 2006 | (JP) | ............................ 2006-263213 |
| Mar. 28, 2007 | (JP) | ............................ 2007-085986 |

(51) Int. Cl.
*G03F 7/00* (2006.01)
*G03F 7/004* (2006.01)

(52) U.S. Cl. ............... 430/284.1; 430/270.1; 430/281.1
(58) Field of Classification Search ............. 430/270.1, 430/281.1, 284.1, 302, 303
See application file for complete search history.

(56) References Cited

U.S. PATENT DOCUMENTS 6,727,044 B1    4/2004    Fujimaki et al.

FOREIGN PATENT DOCUMENTS

| EP | 0710573 A1 | 5/1996 |
| EP | 1234662 A2 | 8/2002 |
| EP | 1564591 A2 | 8/2005 |
| EP | 1571493 A1 | 9/2005 |
| JP | 8-258442 A | 10/1996 |
| JP | 10-119436 A | 5/1998 |
| JP | 10-244751 A | 9/1998 |
| JP | 11-352691 A | 12/1999 |
| JP | 2001-117229 A | 4/2001 |
| WO | 90-12342 A1 | 10/1990 |

*Primary Examiner*—Amanda C. Walke
(74) *Attorney, Agent, or Firm*—Sughrue Mion, PLLC

(57) ABSTRACT

A laser-decomposable resin composition of the invention contains a polyurethane resin having a structure wherein an aromatic group is directly connected to a urethane bond.

6 Claims, No Drawings

LASER-DECOMPOSABLE RESIN COMPOSITION AND LASER-DECOMPOSABLE PATTERN-FORMING MATERIAL AND FLEXOGRAPHIC PRINTING PLATE PRECURSOR OF LASER ENGRAVING TYPE USING THE SAME

FIELD OF THE INVENTION

The present invention relates to a laser-decomposable resin composition, more particularly to a resin composition satisfying both high decomposability enabling engraving with laser and preservation stability, and a laser-decomposable pattern-forming material and flexographic printing plate precursor of laser engraving type using the same.

BACKGROUND OF THE INVENTION

Decomposable resins and decomposable resin compositions means resins decomposable in response to an external factor, for example, a thermal factor, a mechanical factor, a photochemical factor, a radiation-chemical factor or a factor with a chemical agent and are well known. Change in he form (liquefaction or vaporization) or change in the nature or property, for example, molecular weight, hardness, viscoelasticity, glass transition point (Tg), solubility or adhesiveness of the resin or resin composition before and after the decomposition, which is caused by the decomposition of resin, is utilized in various fields.

Examples of the decomposable resin and decomposable resin composition include a biodegradable plastic (for example, polylactic acid) for decreasing environmental impact of plastic material and a slow releasing material which can gradually release a component, for example, medical agent or fragrance in the field of healthcare, cosmetic or life science. However, they gradually decompose by oxygen, light or enzyme in a natural environment, within the living body, in the soil or the like and thus they do not stably maintain their initial states and can not induce at once a large change in the nature upon the external stimulation.

Resins which are decomposed by light or heat for improvement in the recycling efficiency or simplification of the disposal and adhesives which decrease the adhesiveness thereof are also developed. Further, it is known that ceramic or carbon fiber is mixed with a decomposable resin and then the decomposable resin is removed, for example, by calcination to form a porous material. However, in these cases, the materials are altogether treated or processed and it is not intended to form the desired pattern only in the desired portion. Also, large energy is required for the decomposition treatment.

With respect to the application to image formation, for instance, it is known that both preservation stability and image fixability of toner are achieved by utilizing change in the nature due to heat at the heat-fixing of the toner containing a heat-decomposable resin. However, the resin per se does not have sufficient response to the pattern-wise stimulation.

As for pattern-forming materials, on the other hand, for example, a so-called chemically-amplified resist is well known as a photoresist. Specifically, a composition containing an acid generator and an acid-decomposable resin is pattern-wise exposed followed by heat treatment if desired, to decompose pattern-wise the resin and the pattern is formed with development processing. Although the composition satisfies both the preservation stability and the pattern-forming property at a practical level, the development process in which the processing conditions are fully controlled is indispensable for the formation of pattern. Further, the pattern-formation in a thick layer having, for example, several tens of micrometers or more is difficult, though it is possible to apply to at layer.

A method of forming an image utilizing a step of removing (ablation) a part of thin layer by imagewise irradiation of laser beam is also known (JP-A-10-119436 (the term "JP-A" as used herein means an "unexamined published Japanese patent application")). However, the compounds recited as the heat-decomposable resin are only conventional general-purpose resins, for example, polyesters, polycarbonates or polyurethanes, and the thickness of the layer is only around 1 to 2 µm. It is also know to use a compound defined its heat decomposability (JP-A-10-244751). However, the thickness of the layer described therein is also only around 1 to 2 µm.

As a mask material for paste printing to a printed circuit board or the like, a mask for forming a pattern having approximately 100 to 200 µm utilizing a photo - decomposable resin sheet and a production method of the mask are described (JP-A-8-258442). However, a specific compound does not disclosed in the patent. Also, the controlled development processing is indispensable in order to form the pattern while regulating the degree of exposure and development.

On the other hand, in order to form a pattern in a thick layer by a simple process, for example, pattern-formation by laser processing is known, in which the base material per se is removed, deformed or discolored by imagewise irradiation of laser beam. For instance, a method of recording information, for example, a lot number on a product (for example, video tape or home electric appliances) composed of a variety of base materials as utilized as a laser maker. In such cases, conventional resins are used as they are as the base material.

In the pattern-formation by laser processing, it is desired that a laser engraving portion (concave portion) be rapidly formed. For this purpose, a high-sensitive laser-decomposable resin composition and a high-sensitive laser-decomposable pattern-forming material is needed.

In particular, in case of a flexographic printing plate precursor of a direct drawing type by laser (so-called flexographic printing plate precursor for laser engraving), since ease of engraving by laser beam (engraving sensitivity) dominates plate-making speed, a flexographic printing plate precursor for laser engraving using a high-sensitive laser-decomposable resin composition has been required.

On the other band, a photopolymerizable composition containing a polyurethane resin and a lithographic printing plate precursor for laser scanning exposure using the photopolymerizable composition in a photopolymerizable photosensitive layer are known (JP-A-11-352691 (corresponding to U.S. Pat. No. 6,727,044) and P-A-2001-117229). The polyurethane resin functions there as a binder of the photopolymerizable composition or photopolymerizable photosensitive layer and it does not decompose by the laser scanning exposure.

SUMMARY OF THE INVENTION

An object of the present invention is to provide a laser-decomposable resin composition having high sensitivity. Another object of the invention is to provide a laser-decomposable pattern-forming material having high sensitivity. A further object of the invention is to provide a flexographic printing plate precursor of laser engraving type having high sensitivity.

As a result of the extensive investigations, the inventor has found that by incorporating a polyurethane resin having a structure wherein an aromatic group is directly connected to a urethane bond into a laser-decomposable resin composition, the resin composition is easily decomposed by laser irradiation to complete the invention. Specifically, the above-described objects can be achieved by the following constitutions.

(1) A laser-decomposable resin composition comprising a polyurethane resin having a structure wherein an aromatic group is directly connected to a urethane bond.

(2) The laser-decomposable resin composition as described in (1) above, wherein the polyurethane resin is a polyurethane resin including a urethane bond represented by the following formula (1):

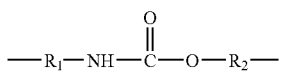

(1)

In formula (1), $R_1$ and $R_2$ each independently represents a divalent organic group, provided that at least one of $R_1$ and $R_2$ is an aromatic group.

(3) The laser-decomposable resin composition as described in (2) above, wherein $R_2$ in formula (1) represents an aromatic group.

(4) The laser-decomposable resin composition as described in (2) above, wherein $R_1$ and $R_2$ in formula (1) each represents an aromatic group.

(5) The laser-decomposable resin composition as described in any one of (1) to (4) above, wherein the polyurethane resin further has a carbonate site.

(6) The laser-decomposable resin composition as described in any one of (1) to (4) above, wherein the polyurethane resin further has an acetal site.

(7) The laser-decomposable resin composition as described in any one of (1) to (6) above which further comprises a polymerizable compound.

(8) The laser-decomposable resin composition as described in any one of (1) to (7) above which further comprises a binder polymer.

(9) A laser-decomposable resin composition prepared by curing the laser-decomposable resin composition as described in (7) above.

(10) A laser-decomposable resin composition prepared by curing the laser-decomposable resin composition as described in (8) above.

(11) A pattern-forming material comprising a support and a heat-decomposable resin layer comprising the laser-decomposable resin composition as described in any one of (1) to (7) and (9) above.

(12) A pattern-forming material comprising a support and a heat-decomposable resin layer comprising the laser-decomposable resin composition as described in (8) or (10) above.

(13) A laser-decomposable pattern-forming material comprising a support having thereon at least two heat-decomposable resin layers wherein a resin constituting the heat-decomposable resin layer close to the support is a polyurethane resin having a structure wherein an aromatic group is directly connected to a urethane bond.

(14) The laser-decomposable pattern-forming material as described in (13) above, wherein heat decomposition temperature of a resin constituting the heat-decomposable resin layer positioned above the heat-decomposable resin layer close to the support is higher Man heat decomposition temperature of the polyurethane resin having a structure wherein an aromatic group is directly connected to a urethane bond.

(15) The laser-decomposable pattern-forming material as described in (13) or (14) above, wherein the polyurethane resin is a polyurethane resin including a urethane bond represented by the following formula (1):

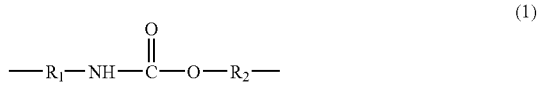

In formula (1), $R_1$ and $R_2$ each independently represents a divalent organic group, provided that at least one of $R_1$ and $R_2$ is an aromatic group.

(16) The laser-decomposable pattern-forming material as described in (15) above, wherein $K_2$ in formula (1) represents an aromatic group.

(17) The laser-decomposable pattern-forming material as described in (15) above, wherein $R_1$ and $R_2$ in formula (1) each represents aromatic group.

(18) The laser-decomposable pattern-forming material as described in any one of (13) to (17) above, wherein the polyurethane resin further has a carbonate site.

(19) A flexographic printing plate precursor of laser engraving type comprising the laser-decomposable pattern-forming material as described in any one of (11) to (18) above.

By using the laser-decomposable resin composition according to the present invention, a laser-decomposable pattern-forming material having high sensitivity, particularly, a flexographic printing plate precursor of laser engraving type having high sensitivity, is obtained and laser engraving can be conducted in high sensitivity to easily form a pattern.

DETAILED DESCRIPTION OF THE INVENTION

The laser-decomposable resin composition according to the invention will be described in more detail below.

The laser-decomposable resin composition according to the invention comprises a polyurethane resin having a structure wherein an aromatic group is directly connected to a urethane bond.

First, the polyurethane resin having a structure wherein an aromatic group is directly connected to a urethane bond is described below.

The polyurethane resin having a structure wherein an aromatic group is directly connected to a urethane bond (hereinafter, also referred to as a specific polyurethane resin) means that at least one of a diisocyanate compound and a diol compound for use i the production thereof contains an aromatic group. Specifically, it is a resin obtained by using as a starting material, an aromatic diisocyanate compound and/or an aromatic diol compound in the production of the polyurethane resin.

Of the polyurethane resins having a structure wherein an aromatic group is directly connected to a urethane bond, a polyurethane resin including a urethane bond represented by formula (1) shown below is particularly preferable.

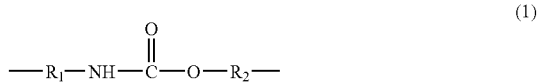

In formula (1), $R_1$ and $R_2$ each independently represents a divalent organic group, provided that at least one of $R_1$ and $R_2$ is an aromatic group.

The aromatic group described in formula (1) is not particularly restricted and from the standpoint of ease of synthesis, a phenylene group which may have a substituent or a naphthylene group which may have a substituent is preferable. In particular, a phenylene group which may have a substituent is preferable. Especially, a phenylene group substituted with an electron withdrawing substituent, for example, a carbonyl group, a halogen atom or a nitro group is preferable.

The basic skeleton of the specific polyurethane resin according to the invention is described below. The specific polyurethane resin is a polyurethane resin comprising as the basic skeleton, a structural unit based on a reaction product of at least one diisocyanate compound represented by formula (4) shown below and at least one diol compound represented by formula (5) shown below.

OCN—X⁰—NCO (4)

HO—Y⁰—OH (5)

In formulae (4) and (5), $X^o$ and $Y^o$ each independently represents a divalent organic residue, provided that at least one of the organic residues represented by $X^o$ and $Y^o$ is connected to the NCO group or the OH group with an aromatic group.

(i) Diisocyanate Compound

In the diisocyanate compound represented by formula (4), it is preferable that the organic residue represented by $X^o$ has an aromatic group directly connected the NCO group.

Preferable examples of the diisocyanate compound include a diisocyanate compound represented by the following formula (6):

OCN-L¹-NCO (6)

In formula (6), $L^1$ represents a divalent aromatic hydrocarbon group which may have a substituent. Examples of the substituent include an alkyl group, an aralkyl group, an aryl group, an alkoxy group, an aryloxy group and a halogen atom (e.g., —F, —Cl, —Br or —I). If desired, $L^1$ may contain other functional group which does not react with the isocyanate group, for example, an ester group, a urethane group, an amido group or a ureido group.

Specific examples of tie diisocyanate compound represented by formula (6) include the following compounds. Specifically, an aromatic diisocyanate compound, for example, 2,4-tolylene diisocyanate, dimer of 2,4-tolylene diisocyanate, 2,6-tolylene diisocyanate, p-xylylene diisocyanate, m-xylylene diisocyanate, 4,4'-diphenylmethane diisocyanate, 1,5-naphthylene diisocyanate or 3,3'-dimethylbiphenyl-4,4'-diisocyanate is exemplified.

From the standpoint of heat decomposability, 4,4'-diphenylmethane diisocyanate or 1,5-naphthylene diisocyanate is particularly preferable.

In the specific polyurethane resin used in the invention, a diisocyanate compound other than the above-described diisocyanate compound may be used together in view of, for example, increase in compatibility with other components in the laser-decomposable resin composition and improvement in preservation stability.

For example, an aliphatic diisocyanate compound, for example, hexamethylene diisocyanate, trimethylhexamethylene diisocyanate, lysine diisocyanate or dimeric acid diisocyanate; an alicyclic diisocyanate compound, for example, isophorone diisocyanate, 4,4'-methylenebis(cyclohexyl isocyanate), methylcyclohexane-2,4(or 2,6)-diisocyanate or 1,3-(isocyanatomethyl)cyclohexane; and a diisocyanate compound obtained by a reaction of diol with diisocyanate, for example, an adduct of 1 mole of 1,3-butylene glycol and 2 moles of tolylene diisocyanate are exemplified.

Also, a diisocyanate compound obtained by adding a monofunctional alcohol to one of three NCO groups of triisocyanate can be used.

(2) Diol Compound

In the diol compound represented by formula (5), it is preferable that the organic residue represented by $Y^o$ has an aromatic group directly connected to the OH group.

Specifically, diol compounds represented by formulae (A-1) to (A-3) shown below are preferable.

HO—Ar¹—OH (A-1)

HO—(Ar¹—Ar²)ₘ—OH (A-2)

HO—Ar¹—X—Ar²—OH (A-3)

In the formulae, $Ar^1$ and $Ar^2$, which may be the same or different, each represents an aromatic ring. Examples of the aromatic ring include a benzene ring, a naphthalene ring, an anthracene ring, a pyrene ring and a heterocyclic ring. The aromatic ring may have a substituent. Examples of the substituent include an alkyl group, an aralkyl group, an aryl group, an alkoxy group, an aryloxy group and a halogen atom (e.g., —F, —Cl, —Br or —I).

From the standpoint of availability of raw materials, a benzene ring or a naphthalene ring is preferable. Taking also the film-forming property into under consideration, a benzene ring is particularly preferable.

X represents a divalent organic residue. m is preferably from 1 to 3 from the standpoint of the film-forming property, and particularly preferably 1.

Preferable examples of e diol compound represented by formula (A-1) include 1,4-dihydroxybenzene and 1,8-dihydroxynaphthalene.

Preferable examples of the diol compound represented by formula (A-2) include 4,4'-dihydroxybiphenyl and 2,2'-dihydroxybinaphthyl.

Preferable examples of the diol compound represented by formula (A-3) include bisphenol A and 4,4'-bis(hydroxyphenyl)methane.

In the specific polyurethane resin used in the invention, a diol compound other the above-described diol compound may be used together in view of for example, increase in compatibility with other components in the laser-decomposable resin composition and improvement in preservation stability.

Such a diol compound includes, for example, a polyetherdiol compound, a polyesterdiol compound and polycarbonatediol compound.

Examples of the polyetherdiol compound include compounds represented by formulae (7), (8), (9), (10) and (11) shown below and a random copolymer of ethylene oxide and propylene oxide having a hydroxy group at the terminal thereof.

(7)

(8)

-continued

  (9)

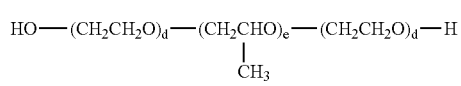  (10)

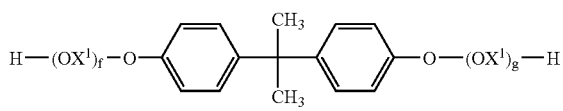  (11)

In the formulae (7) to (11), $R^{14}$ represents a hydrogen atom or a methyl group. $X^1$ represents a group shown below. a, b, c, d, e, f and g each represents an integer of 2 or more, and preferably an integer of 2 to 100.

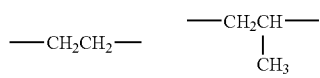

Specific examples of the polyetherdiol compound represented by formula (7) or (8) include the following compounds. Specifically, diethylene glycol, triethylene glycol, tetraethylene glycol, pentaethylene glycol, hexaethylene glycol, heptaethylene glycol, octaethylene glycol, di-1,2-propylene glycol, tri-1,2-propylene glycol, tetra-1,2-propylene glycol, hexa-1,2-propylene glycol, di-1,3-propylene glycol, tri-1,3-propylene glycol, tetra-1,3-propylene glycol, di-1,3-butylene glycol, tri-1,3-butylene glycol, hexa-1,3-butylene glycol, polyethylene glycol having a weight average molecular weight of 1,000, polyethylene glycol having a weight average molecular weight of 1,500, polyethylene glycol having a weight average molecular weight of 2,000, polyethylene glycol having a weight average molecular weight of 3,000, polyethylene glycol having a weight average molecular weight of 7,500, polypropylene glycol having a weight average molecular weight of 400, polypropylene glycol having a weight average molecular weight of 700, polypropylene glycol having a weight average molecular weight of 1,000, polypropylene glycol having a weight average molecular weight of 2,000, polypropylene glycol having a weight average molecular weight of 3,000 and polypropylene glycol having a weight average molecular weight of 4,000 are exemplified.

Specific examples of the polyetherdiol compound represented by formula (9) include the following compounds. Specifically, PTMG650, PTMG1000, PTMG2000 and PTMG3000 (trade name, produced by Sanyo Chemical Industries, Ltd.) are exemplified.

Specific examples of the polyetherdiol compound represented by formula (10) include the following compounds. Specifically, Newpol PE-61, Newpol PE-62, Newpol PE-64, Newpol PE-68, Newpol PE-71, Newpol PE-74, Newpol PE-75, Newpol PE-78, Newpol PE-108, Newpol PE-128 and Newpol PE-61 (trade name, produced by Sanyo Chemical Industries, Ltd.) are exemplified.

Specific examples of the polyetherdiol compound represented by formula (11) include the following compounds. Specifically, Newpol BPE-20, Newpol BPE-20F, Newpol BPE-2ONK, Newpol BPE-20T, Newpol BPE-20G, Newpol BPE-40, Newpol BPE-60, Newpol BPE-100, Newpol BPE-180, Newpol BPE-2P, Newpol BPE-23P, Newpol BPE-3P and Newpol BPE-5P (trade name, produced by Sanyo Chemical Industries, Ltd.).

Specific examples of the random copolymer of ethylene oxide and propylene oxide having a hydroxy group at the terminal thereof include the following compounds. Specifically, Newpol 50HB-100, Newpol 50HB-260, Newpol 50HB-400, Newpol 50HB-660, Newpol 50HB-2000 and Newpol 50HB-5100 (trade name, produced by Sanyo Chemical Industries, Ltd.).

Examples of the polyesterdiol compound include compounds represented by formulae (12) and (13) shown below.

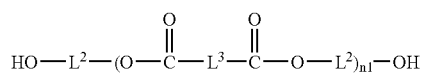  (12)

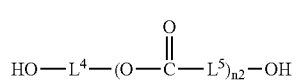  (13)

In formulae (12) and (13), $L^2$, $L^3$ and $L^4$, which may be the same or different, each represents a divalent aliphatic or aromatic hydrocarbon group, and $L^5$ represents a divalent aliphatic hydrocarbon group. Preferably, $L^2$, $L^3$ and $L^4$ each represents an alkylene group, an alkenylene group, an alkynylene group or an arylene group, and $L^5$ represents an alkylene group. Also, $L^2$, $L^3$, $L^4$ and $L^5$ each may have other functional group which does not react with the isocyanate group, for example, an ether group, a carbonyl group, an ester group, a cyano group, an olefin group, a urethane group, an amido group, a ureido group or a halogen atom. n1 and n2 each represents an integer of 2 or more, and preferably an integer of 2 to 100.

Examples of the polycarbonatediol compound include compounds represented by formula (14) shown below.

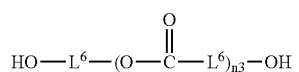  (14)

In formula (14), $L^6$, which may be the same or different, each represents a divalent aliphatic or aromatic hydrocarbon group. Preferably, $L^6$ represents an alkylene group, an alkenylene group, an alkynylene group or an arylene group. Also, $L^6$ may have other functional group which does not react with the isocyanate group, for example, an ether group, a carbonyl group, an ester group, a cyano group, an olefin group, a urethane group, an amido group, a ureido group or a halogen atom. n3 represents an integer of 2 or more, and preferably an integer of 2 to 100.

Specific examples of the diol compound represented by formula (12), (13) or (14) include Compound No. 1 to Compound No. 18 set forth below. In the specific examples, n represents an integer of 2 or more.

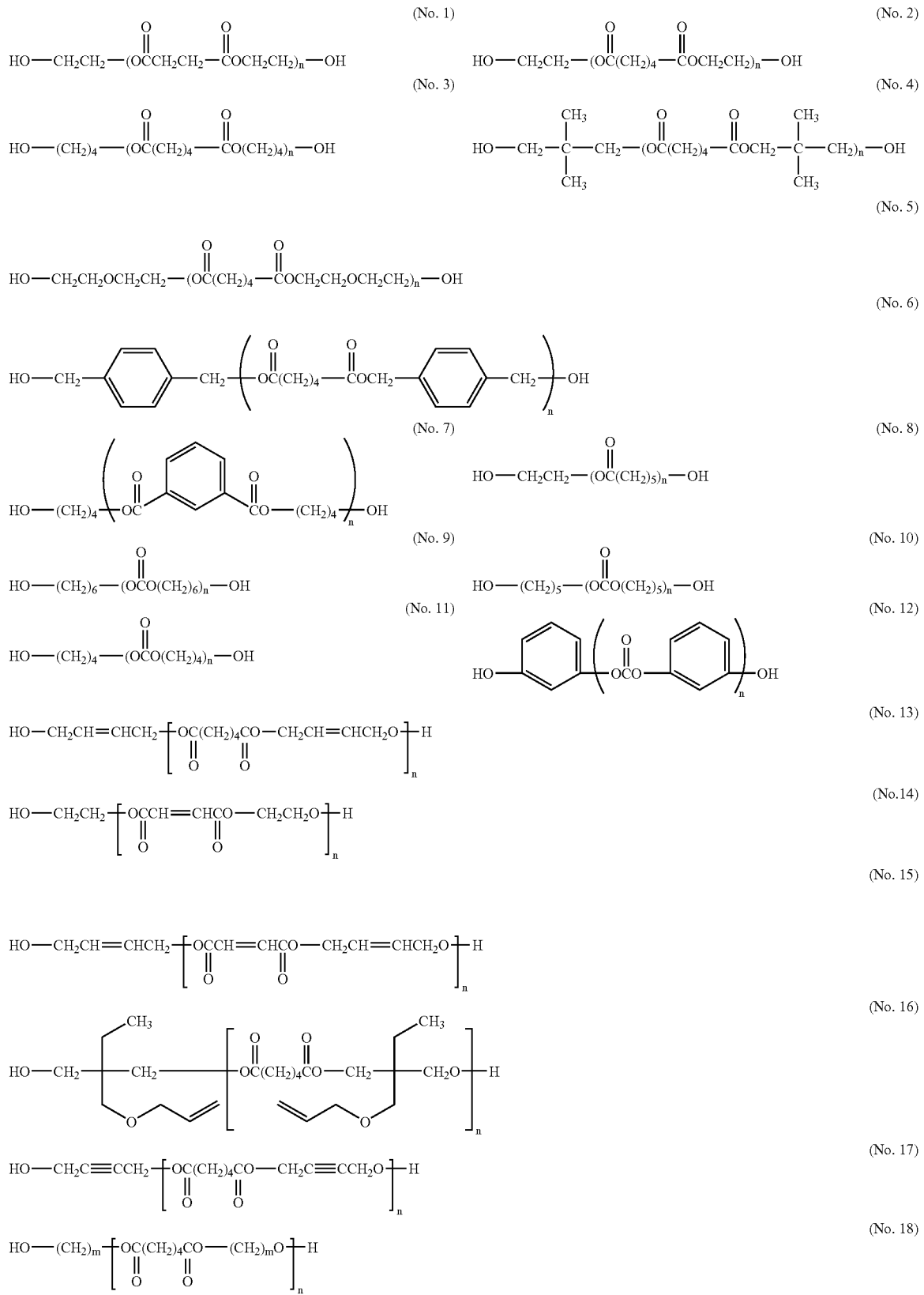

Also, in the synthesis of the specific polyurethane resin, a diol compound having a substituent which does not react with the isocyanate group in addition to the above-described diol compound can be used. Such a diol compound includes compounds represented by formulae (15) and (16) shown below.

$$\text{HO-L}^7\text{-O—CO-L}^8\text{-CO—O-L}^7\text{-OH} \quad (15)$$

$$\text{HO-L}^8\text{-CO—O-L}^7\text{-OH} \quad (16)$$

In formulae (15) and (16), $L^7$ and $L^8$, which may be the same or different, each represents a divalent aliphatic hydrocarbon group, aromatic hydrocarbon group or heterocyclic group, each of which may have a substituent (for example, an alkyl group, an aralkyl group, an aryl group, an alkoxy group, an aryloxy group or a halogen atom (e.g., —F, —Cl, —Br or —I)). $L^7$ and $L^8$ each may have other functional group which does not react with the isocyanate group, for example, a carbonyl group, an ester group, a urethane group, an amido group or a ureido group, if desired. Alternatively, $L^7$ and $L^8$ may be combined with each other to form a ring.

Further, in the synthesis of the specific polyurethane resin, a diol compound having an acid group, for example, a carboxyl group, a sulfone group or a phosphoric group can be used together. Particularly, the diol compound having a carboxyl group is preferable from the standpoint of improvement in film strength and water resistance resulting from a hydrogen bond. Examples of the diol compound having a carboxyl group include compounds represented by formulae (17) to (19) shown below.

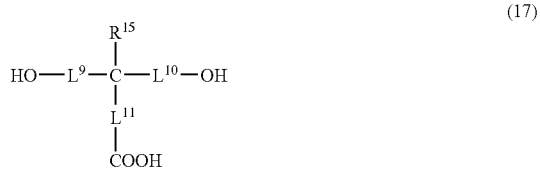

(17)

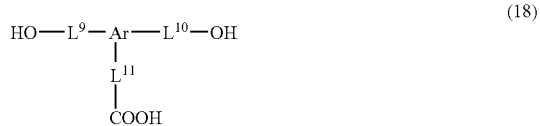

(18)

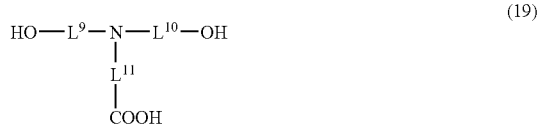

(19)

In formulae (17) to (19), $R^{15}$ represents a hydrogen atom, an alkyl group, or an aralkyl group, an aryl group, an alkoxy group or an aryloxy group, each of which may have a substituent (for example, a cyano group, a nitro group, a halogen atom (e.g., —F, —Cl, —Br or —I), —CONH$_2$, —COOR$^{16}$, —OR$^{16}$, —NHCONHR$^{16}$, —NHCOOR$^{16}$, —NHCOR$^{16}$ or OCONHR$^{16}$ (wherein $R^{16}$ represents an alkyl group having from 1 to 10 carbon atoms or an aralkyl group having from 7 to 15 carbon atoms)), and preferably a hydrogen atom, an alkyl group having from 1 to 8 carbon atoms or an aryl group having from 6 to 15 carbon atoms. $L^9$, $L^{10}$ and $L^{11}$, which may be the same or different, each represents a single bond or a divalent aliphatic or aromatic hydrocarbon group which may have a substituent (preferably, for example, an alkyl group, an aralkyl group, an aryl group, an alkoxy group or a halogen atom), preferably an alkylene group having from 1 to 20 carbon atoms or an arylene group having from 6 to 15 carbon atoms, and more preferably an alkylene group having from 1 to 8 carbon atoms. Also, if desired, $L^9$, $L^{10}$ and $L^{11}$ each may contain other functional group which does not react with the isocyanate group, for example, a carbonyl group, an ester group, a urethane group, an amido group, a ureido group or an ether group. Further, two or three of $R^{15}$, $L^9$, $L^{10}$ and $L^{11}$ may be combined with each other to form a ring.

Ar represents a trivalent aromatic hydrocarbon group which may have substituent, aid preferably an aromatic group having from 6 to 15 carbon atoms.

Specific examples of the diol compound having a carboxy group represented by formula (17), (18) or (19) include the following compounds. Specifically, 3,5-dihydroxybenzoic acid, 2,2-bis(hydroxymethyl)propionic acid, 2,2-bis(2-hydroxyethyl)propionic acid, 2,2-bis(3-hydroxypropyl)propionic acid, bis(hydroxymethyl)acetic acid, bis(4-hydroxyphenyl)acetic acid, 2,2-bis(hydroxymethyl)butyric acid, 4,4-bis(4-hydroxyphenyl)pentanoic acid, tartaric acid, N,N-dihydroxyethylglycine and N,N-bis(2-hydroxyethyl)-3-carboxypropionamide are exemplified.

Moreover, in the synthesis of the specific polyurethane resin, a compound obtained by ring opening of tetracarboxylic acid dianhydride represented by formulae (20) to (22) shown below with a diol compound can be used together.

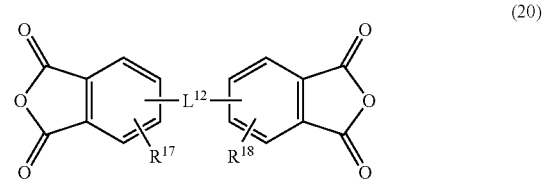

(20)

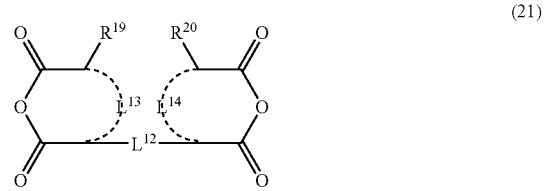

(21)

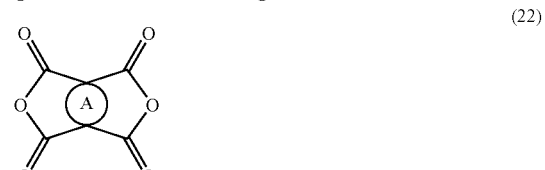

(22)

In formulae (20) to (22), $L^{12}$ represents a single bond, a divalent aliphatic or aromatic hydrocarbon group which may have a substituent (preferably, for example, an alkyl group, an aralkyl group, an aryl group, an alkoxy group, a halogen atom, an ester group or an amido group), —CO—, —SO—, —SO$_2$—, —O— or -s-, and preferably a single bond, a divalent aliphatic hydrocarbon group having from 1 to 15 carbon atoms, —CO—, —SO$_2$—, —O— or -s-. $R^{17}$ and $R^{18}$, which may be the same or different, each represents a hydrogen atom, an alkyl group, an aralkyl group, an aryl group, an alkoxy group or a halogen atom, and preferably a hydrogen atom, an alkyl group having from 1 to 8 carbon atoms, an aryl group having from 6 to 15 carbon atoms, an alkoxy group having from 1 to 8 carbon atoms or a halogen atom. Alternatively, two of $L^{12}$, $R^{17}$ and $R^{18}$ may be combined with each other to form a ring $R^{19}$ and $R^{20}$, which may be the same or different, each represents a hydrogen atom, an alkyl group, an aralkyl group, an aryl group or a halogen atom, and preferably a hydrogen atom, an alkyl group having from 1 to 8 carbon atoms or an aryl group having from 6 to 15 carbon atoms. Alternatively, two of $L^{12}$, $R^{19}$ and $R^{20}$ may be combined with each other to form a ring. $L^{13}$ and $L^{14}$, which may be the same or different, each represents a single bond, a double bond or a divalent aliphatic hydrocarbon group, and preferably a single bond, a double bond or a methylene group. A represents a monocyclic or polycyclic aromatic ring, and preferably an aromatic ring having from 6 to 18 carbon atoms.

Specific examples of the compound represented by formula (20), (21) or (22) include the following compounds. Specifically, an aromatic tetracarboxylic acid dihydride, for example, pyromellitic acid dihydride, 3,3',4,4'-benzophenonetetracarboxylic acid dihydride, 3,3',4,4'-diphenyltetracarboxylic acid dihydride, 2,3,6,7-naphthalenetetracarboxylic acid dihydride, 1,4,5,8-naphthalenetetracarboxylic acid dihydride, 4,4'-sulfonyldiphthalic acid dihydride, 2,2-bis(3, 4-dicarboxyphenyl)propane dihydride, bis(3,4-dicarboxyphenyl)ether dihydride, 4,4'-[3,3'(alkylphosphoryldiphenylene)-bis(iminocarbonyl)]diphthalic acid dihydride, adduct of hydroquinonediacetate and trimellitic acid anhydride or adduct of diacetyldiamine and trimellitic acid anhydride; an alicyclic tetracarboxylic acid dihydride, for example, 5-(2,5-dioxotetrahydrofuryl)-3-methyl-3-cyclohexene-1,2-dicarboxylic acid dihydride (Epicron B-4400, produced by Dainippon Ink and Chemicals, Inc.), 1,2,3 4-cyclopentanetetracarboxylic acid dihydride, 1,2,4,5-cyclohexanetetracarboxylic acid dihydride or tetrahydrofurantetracarboxylic acid dihydride; and an aliphatic tetracarboxylic acid dihydride, for example, 1,2,3,4-butanetetracarboxylic acid dihydride or 1,2,4,5-pentanetetracarboxylic acid dihydride are exemplified.

A method of introducing the compound obtained by ring opening of tetracarboxylic acid dianhydride with a diol compound into the polyurethane resin includes, for example, the following methods:
a) Method wherein an alcohol-terminated compound obtained by ring-opening of the tetracarboxylic acid dianhydride with a diol compound is reacted with a diisocyanate compound, and
b) Method wherein an alcohol-terminated urethane compound obtained by reacting a diisocyanate compound under an excess diol compound condition is reacted with the tetracarboxylic acid dianhydride.

Specific examples of the diol compound for use in the ring-opening reaction include the following compounds. Specifically, ethylene glycol, diethylene glycol, triethylene glycol, tetraethylene glycol, propylene glycol, dipropylene glycol, polyethylene glycol, polypropylene glycol, neopentyl glycol, 1,3-butylene glycol, 1,6-hexanediol, 2-butene-1,4-diol, 2,2,4-trimethyl-1,3-pentanediol, 1,4-bis-β-hydroxyethoxycyclohexane, cyclohexanedimethanol, tricylodecanedimethanol, hydrogenated bisphenol A, hydrogenated bisphenol F, an ethylene oxide adduct of bisphenol A, a propylene oxide adduct of bisphenol A, an ethylene oxide adduct of bisphenol F, a propylene oxide adduct of bisphenol F, an ethylene oxide adduct of hydrogenated bisphenol A, a propylene oxide adduct of hydrogenated bisphenol A, hydroquinone dihydroxy ethyl ether, p-xylylene glycol, dihydroxyethylsulfone, bis(2-hydroxyethyl)-2,4-tolylenedicarbamate, 2,4-tolylene-bis(2-hydroxyethylcarbamide), bis(2-hydroxyethyl)-m-xylylenedicarbamate and bis(2-hydroxyethyl) isophthalate are exemplified.

The specific polyurethane resin according to the invention may include an organic group comprising at least one of an ether bond, an amido bond, a urea bond, an ester bond, a urethane bond, a biuret bond and an arophanato bond, as a functional group, in addition to the urethane bond.

In particular, it is preferred that the specific polyurethane resin further has a carbonate site and/or an acetal site in addition to the urethane bond.

In the case wherein the specific polyurethane resin has a carbonate site, it is believed that carbon dioxide gas resulting from heat decomposition of the carbonate site generates simultaneously with heat decomposition of the urethane bond in the main chain and the carbon dioxide gas assists heat decomposition of the specific polyurethane resin and scattering or removing of the heat-decomposed material, and as a result laser decomposition sensitivity is improved and depth of laser engraving increases.

The carbonate site may be present any one of the main chain and side chain of the polyurethane resin and is preferably present in the main chain from the stand point of improvement in the laser decomposition sensitivity. More preferably, the carbonate sites are present in main chain and side chain.

In order to produce the specific polyurethane resin having a carbonate site, two embodiments can be considered, including an embodiment wherein the diisocyanate, as a raw material, has the carbonate site and an embodiment wherein the diol, as a raw material, has the carbonate site. Any embodiment may be used according to the invention. The embodiment wherein the diol has the carbonate site is preferable in view of ease of synthesis of raw material.

The content of repeating unit including the carbonate site in the specific polyurethane resin is preferably from 0.1 to 50% by mole, more preferably from 5 to 50% by mole, particularly preferably from 20 to 50% by mole, based on the total molar amount of raw materials constituting the specific polyurethane resin in view of preferably maintaining both the laser decomposition sensitivity and film-forming property.

Of the specific polyurethane resins according to the invention, those including a urethane bond wherein both $R_1$ and $R_2$ in formula (1) are aromatic groups (both adjacent sides of the urethane bond are aromatic groups) and having the carbonate site in the main chain are particularly preferable.

Preferable examples of the raw material for the specific polyurethane resin having a carbonate site include tie above-described polycarbonate diol compounds.

In the case wherein the specific polyurethane resin has an acetal site, on the other hand, it is believed that since the acetal site decomposes simultaneously with or at lower temperature than heat decomposition of the urethane bond in the main chain, the heat decomposition efficiency of the specific polyurethane resin is totally increased, and as a result, laser decomposition sensitivity is improved and depth of laser engraving increases.

The acetal site is preferably introduced into the main chain from the stand point of the laser decomposability. In order to produce the specific polyurethane resin having an acetal site, two embodiments can be considered, including an embodiment wherein the diisocyanate, as a raw material, has the acetal site and an embodiment wherein the dial, as a raw material, has the acetal site. Any embodiment may be used according to the invention. The embodiment wherein the diol has the acetal site is preferable in view of ease of synthesis of raw material.

The content of repeating unit including the acetal site in the specific polyurethane resin is preferably from 0.1 to 50% by mole, more preferably from 5 to 50% by mole, particularly preferably from 20 to 50% by mole, based on the total molar amount of raw materials constituting the specific polyurethane resin in view of preferably maintaing both the laser decomposition sensitivity and film-forming property.

Of the specific polyurethane resins, those including a urethane bond wherein both $R_1$ and $R_2$ in formula (1) are aromatic groups (both adjacent sides of the urethane bond are aromatic groups) and having the acetal site in the main chain are particularly preferable.

The acetal site-containing diol compound used for the raw material may be a chain form or a cyclic form.

Preferable examples of the raw material for the specific polyurethane resin having an acetal site include acetal diol compounds set forth below.

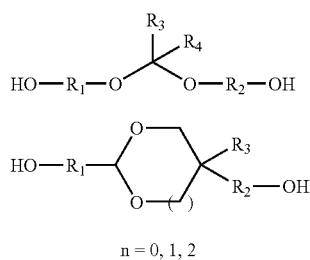

(A-1)

(A-2)

$n = 0, 1, 2$

In formulae (A-1) and (A-2), $R_1$ and $R_2$, which may be the same or different, each represents a divalent organic group which may have a substituent (for example, a divalent aliphatic hydrocarbon group, aromatic hydrocarbon group or heterocyclic group which may have, for example, an alkyl group, an aralkyl group, an aryl group, an alkoxy group, an aryloxy group or a halogen atom (e.g., —F, —Cl, —Br or —I), and $R_3$ and $R_4$, which may be the same or different, each represents a hydrogen atom or a monovalent organic group which may have a substituent (for example, an alkyl group, aralkyl group or aryl group which may have, for example, an alkyl group hang from 1 to 10 carbon atoms or an aralkyl group having from 7 to 15 carbon atoms, and each preferably represents a hydrogen atom, an alkyl group having from 1 to 8 carbon atoms or an aryl group having from 6 to 15 carbon atoms.

The acetal diol compound represented by formula (A-2) is preferable from the standpoint of the laser decomposability and film-forming property of the polyurethane produced by using the diol compound as the raw material.

Specific examples of the acetal diol compound are set forth below, but the invention should not be construed as being limited thereto.

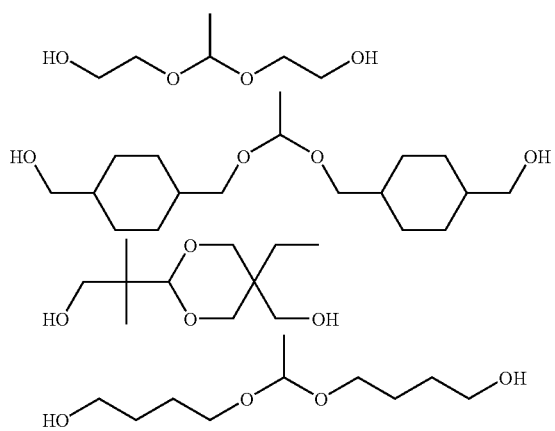

-continued

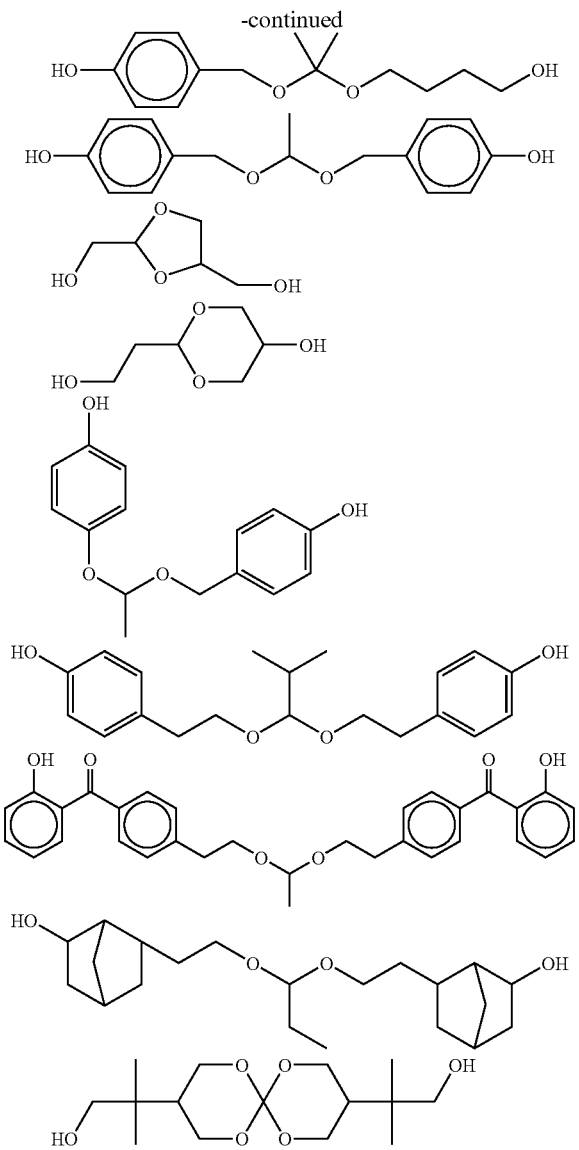

It is preferred that the specific polyurethane resin for use in the invention further includes a unit having an ethylenically unsaturated bond. As the polyurethane resin including a unit having an ethylenically unsaturated bond, the resin having at least one functional group represented by formulae (1) to (3) shown below in the side chain thereof is preferable. The functional groups represented by formulae (1) to (3) will be described below.

Formula (1):

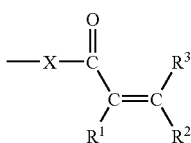

In formula (1), $R^1$ to $R^3$ each independently represents a hydrogen atom or a monovalent organic group. $R^1$ preferably includes, for example, a hydrogen atom or an alkyl group which may have a substituent. Among them, a hydrogen atom or a methyl group is preferable because of high radical reactivity. $R^2$ and $R^3$ each independently preferably includes, for example, a hydrogen atom, a halogen atom, an amino group, a carboxyl group, an alkoxycarbonyl group, a sulfo group, a nitro group, a cyano group, an alkyl group which may have a substituent, an aryl group which may have a substituent, an alkoxy group which may have a substituent an aryloxy group which may have a substituent, an alkylamino group which may have a substituent an arylamino group which may have a substituent, an alkylsulfonyl group which may have a substituent and an arylsulfonyl group which may have a substituent. Among them, a hydrogen atom, a carboxyl group, an alkoxycarbonyl group, an alkyl group which may have a substituent or an aryl group which may have a substituent is preferable because of high radical reactivity.

X represents an oxygen atom, a sulfur atom or —$N(R^{12})$—, and $R^{12}$ represents a hydrogen atom or a monovalent organic group. The monovalent organic group represented by $R^{12}$ includes, for example, an alkyl group which may have a substituent. Among them, a hydrogen atom, a methyl group, an ethyl group or an isopropyl group is preferable because of high radical reactivity.

Examples of the substituent capable of being introduced include an alkyl group, an alkenyl group, an alkynyl group, an aryl group, an alkoxy group, an aryloxy group, a halogen atom, an amino group, an alkylamino group, an arylamino group, a carboxyl group, an alkoxycarbonyl group, a sulfo group, a nitro group, a cyano group, an amido group, an alkylsulfonyl group and an arylsulfonyl group.

Formula (2):

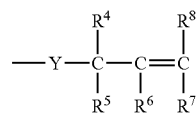

In formula (2), $R^4$ to $R^8$ each independently represents a hydrogen atom or a monovalent organic group. $R^4$ to $R^8$ each independently preferably includes, for example, a hydrogen atom, a halogen atom, an amino group, a dialkylamino group, a carboxyl group, an alkoxycarbonyl group, a sulfo group, a nitro group, a cyano group, an alkyl group which may have a substituent, an aryl group which may have a substituent, an alkoxy group which may have a substituent, an aryloxy group which may have a substituent, an alkylamino group which may have a substituent, an arylamino group which may have a substituent, an alkylsulfonyl group which may have a substituent and an arylsulfonyl group which may have a substituent. Among them, a hydrogen atom, a carboxyl group, an alkoxycarbonyl group, an alkyl group which may have a substituent or an aryl group which may have a substituent is preferable.

Examples of the substituent capable of being introduced include those described in Formula (1). Y represents an oxygen atom a sulfur atom or —$N(R^{12})$—, and $R^{12}$ has the same meaning as $R^{12}$ defined in Formula (1). Preferable examples of $R^{12}$ are also same as those described in Formula (1).

Formula (3):

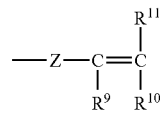

In formula (3), $R^9$ to $R^{11}$ each independently represents a hydrogen atom or a monovalent organic group. $R^9$ preferably represents a hydrogen atom or an alkyl group which may have a substituent. Among them, a hydrogen atom or a methyl group is preferable because of high radical reactivity. $R^{10}$ and $R^{11}$ each independently preferably increases, for example, a hydrogen atom, a halogen atom, an amino group, a dialkylamino group, a carboxyl group, an alkoxycarbonyl group, a sulfo group, a nitro group, a cyano group, an alkyl group which may have a substituent, an aryl group which may have a substituent, an alkoxy group which may have a substituent, an aryloxy group which may have a substituent, an alkylamino group which may have a substituent an arylamino group which may have a substituent, an alkylsulfonyl group which may have a substituent and an arylsulfonyl group which may have a substituent. Among them, a hydrogen atom, a carboxyl group, an alkoxycarbonyl group, an alkyl group which may have a substituent or an aryl group which may have a substituent is preferable because of high radical reactivity.

Examples of the substituent capable of being introduced include those described in Formula (1). Z represents an oxygen atom, a sulfur atom, —$N(R^{13})$— or a phenylene group which may have a substituent. $R^{13}$ preferably includes, for example, an alkyl group which may have a substituent. Among them, a methyl group, an ethyl group or an isopropyl group is preferable because of high radical reactivity.

In order to introduce the ethylenically unsaturated bond into the side chain of the polyurethane resin, a method of using as a raw material for the production of polyurethane resin, the diol compound having the ethylenically unsaturated bond in its side chain is preferable. Specific examples of the diol compound may include a commercially available compound, for example, trimethylolpropane monoalkyl ether and compounds easily prepared by a reaction between a halogenated diol compound, triol compound or aminodiol compound and a carboxylic acid, acid chloride, isocyanate, alcohol, amine, thiol or halogenated alkyl compound each containing the ethylenically unsaturated bond. Specific examples of the diol compound are set forth below, but the invention should not be construed as being limited thereto.

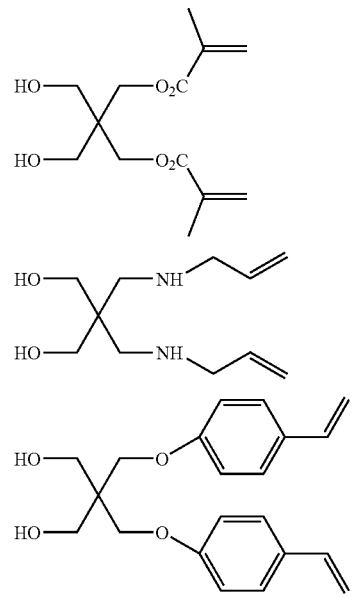

-continued
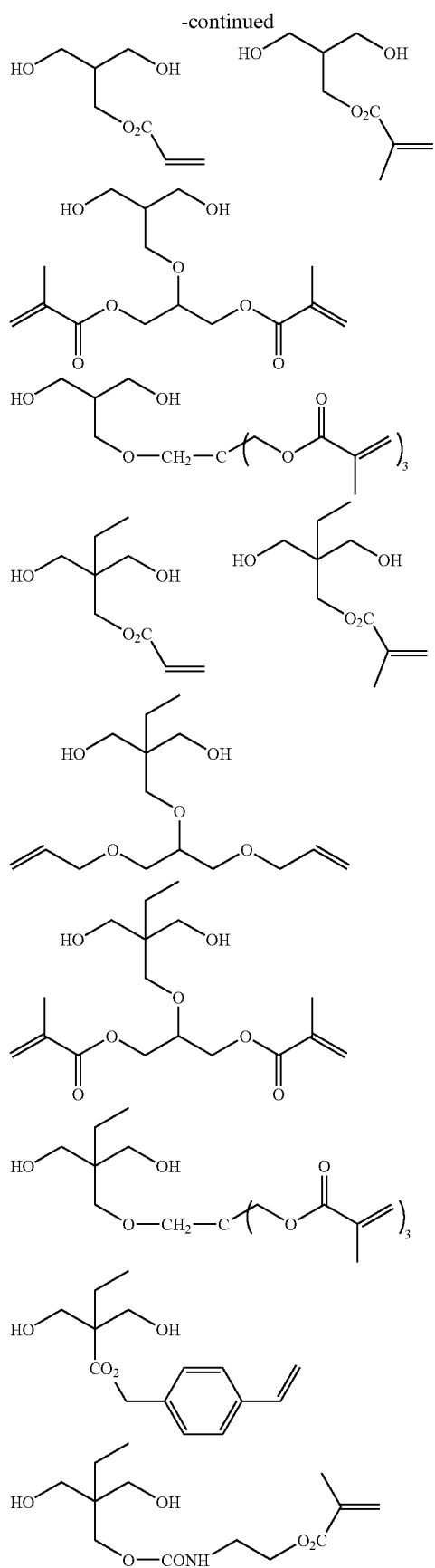
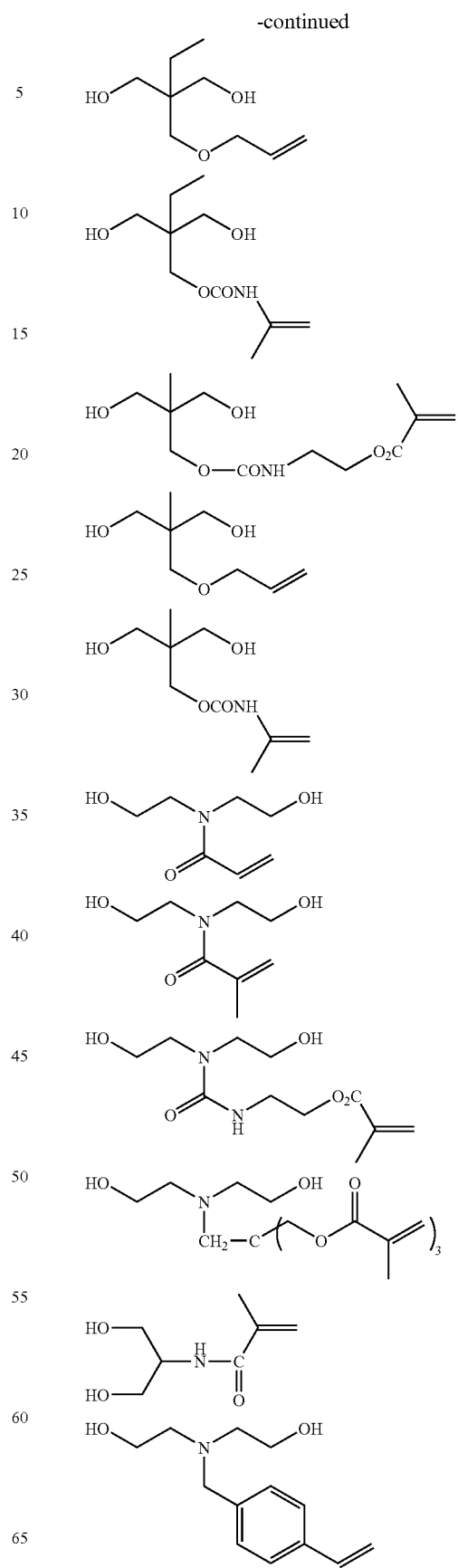

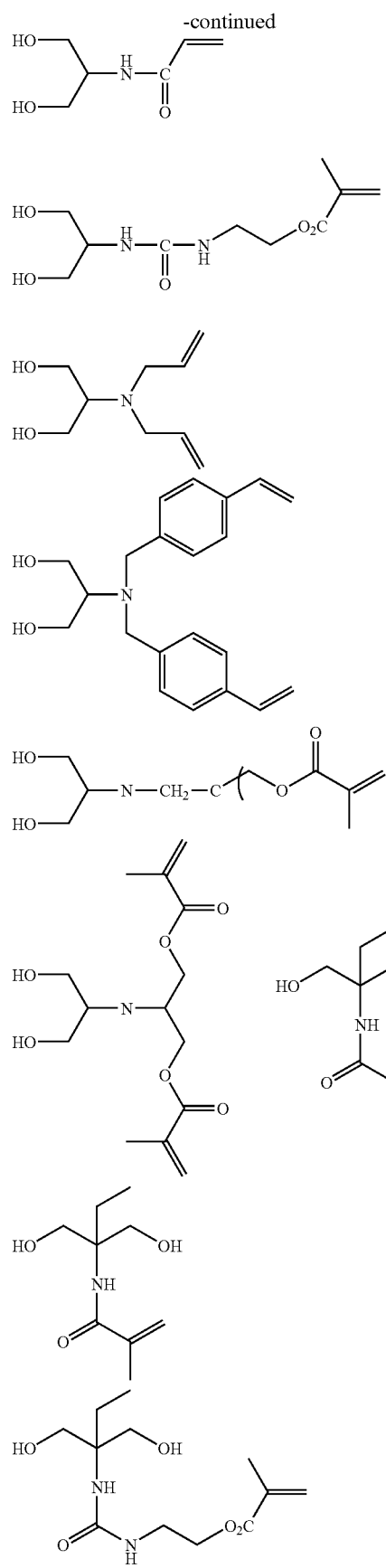
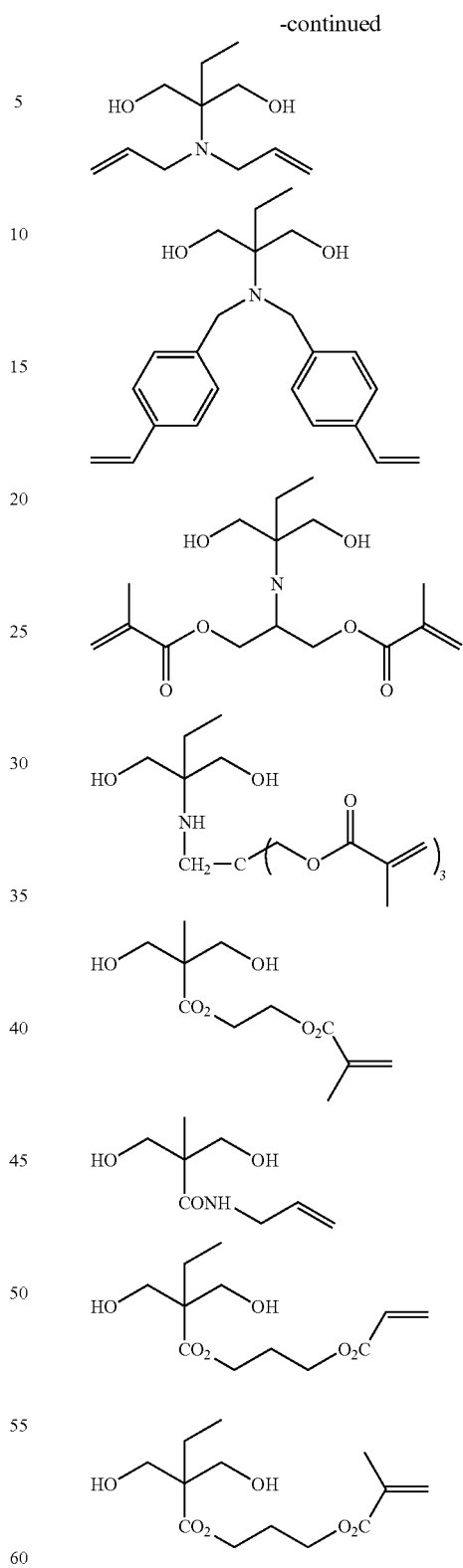
Also, as a more preferable polyurethane resin according to the invention, a polyurethane resin obtained by using a diol compound represented by formula (G) shown below, as one of the diol compounds having the ethylenically unsaturated bond in the synthesis of polyurethane resin is exemplified.

Formula (G):

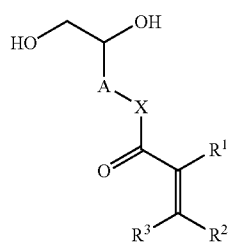

In formula (G), $R^1$ to $R^3$, each independently represents a hydrogen atom or a monovalent organic group, A represents a divalent organic residue, X represents an oxygen atom, a sulfur atom or —N($R^{12}$)—, and $R^{12}$ represents a hydrogen atom or a monovalent organic group.

$R^1$ to $R^3$ and X in formula (G) have the same meaning as $R^1$ to $R^3$ and X defined in formula (1) above, respectively. Preferable examples of $R^1$ to $R^3$ and X are also same as those described in Formula (1).

By using the polyurethane resin resulting from such a diol compound, it is believed that improvement in the film strength of layer can be achieved by the effect of inhibiting excess molecular motion of the polymer main chain due to the secondary alcohol having a large steric hindrance.

Specific examples of the diol compound represented by formula (G) preferably used in the synthesis of specific polyurethane resin are set for the below.

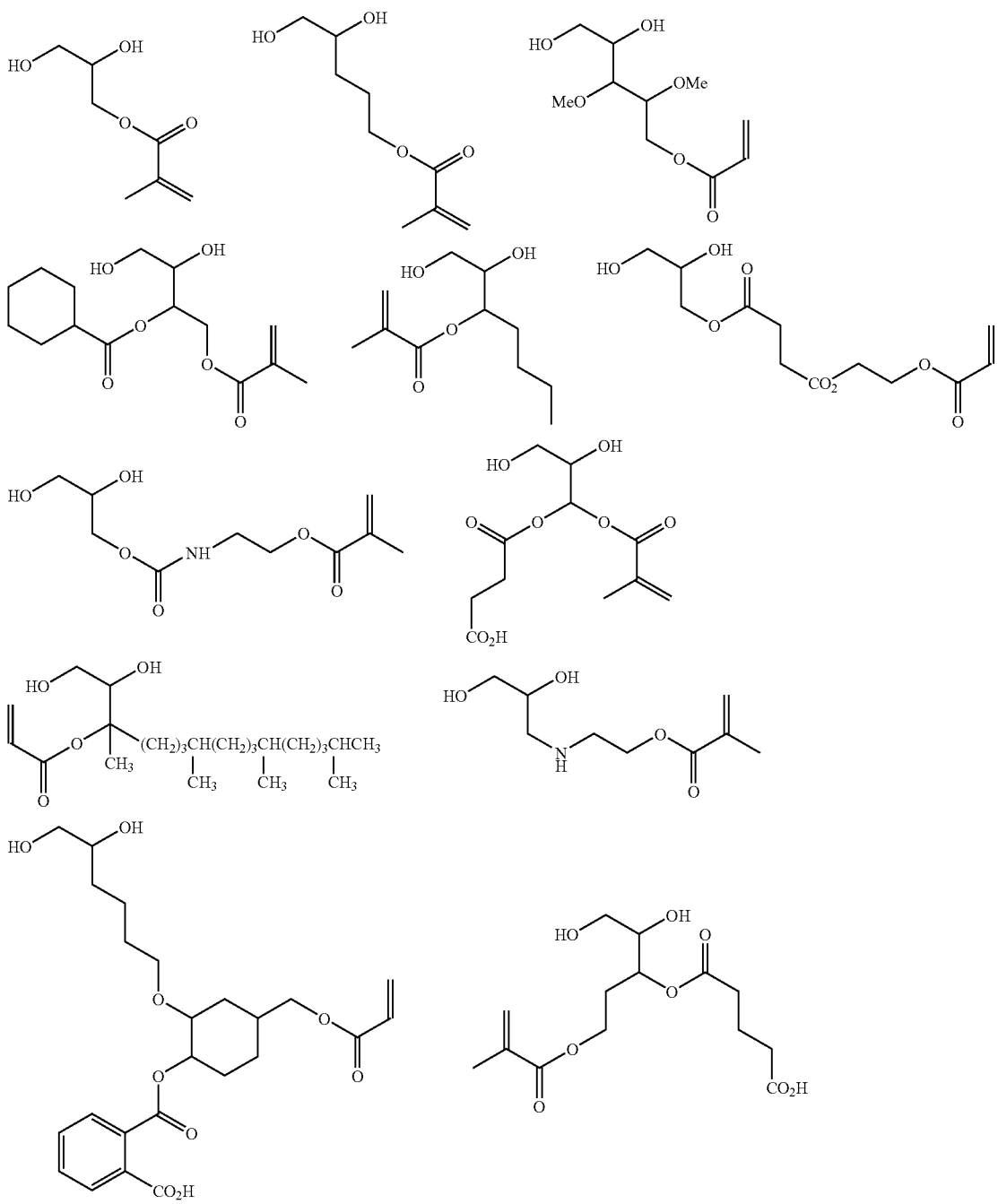

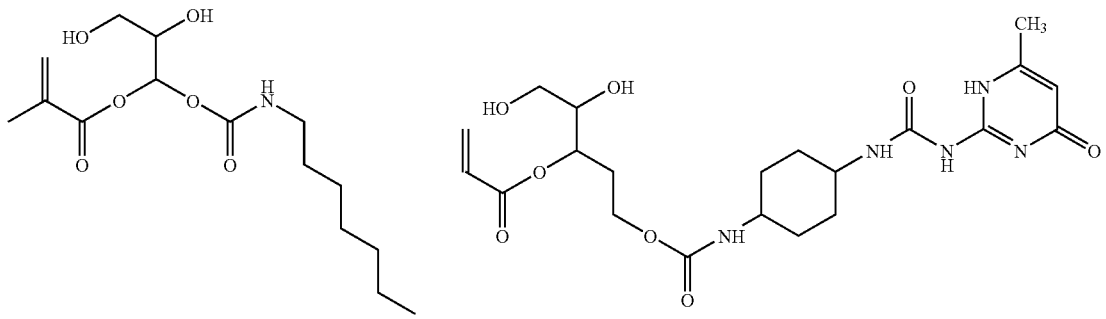
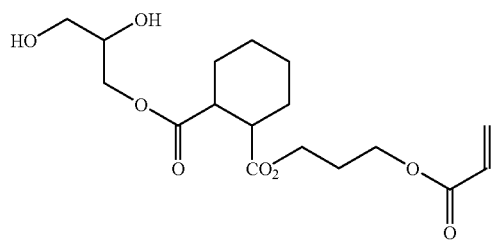
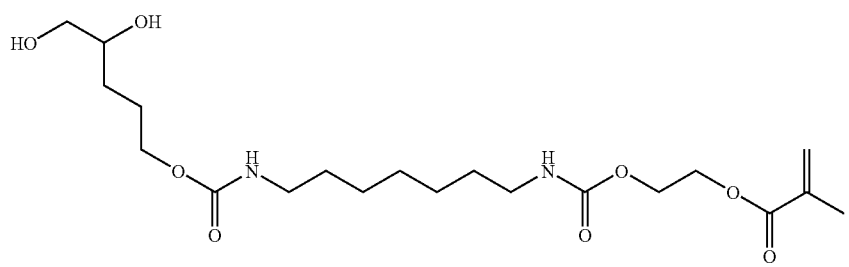
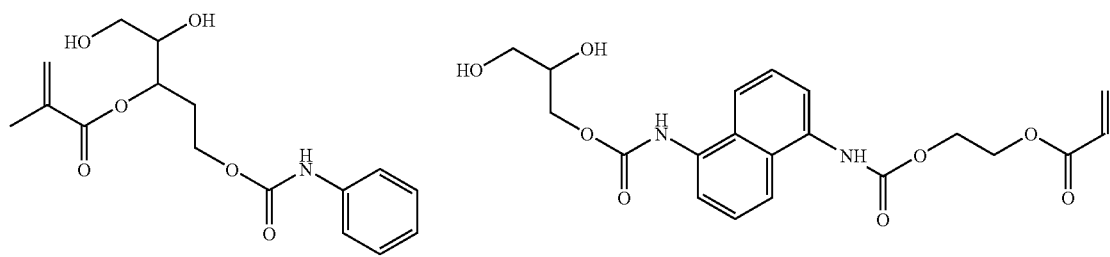
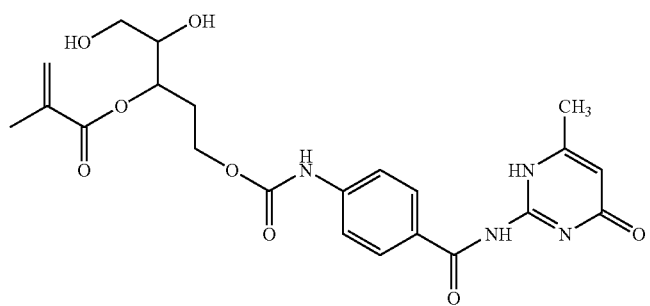

-continued

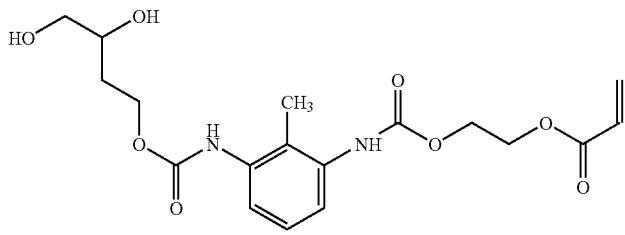

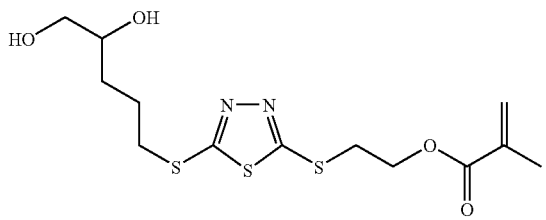

When the polyurethane resin is synthesized under condition of an excess NCO group, specifically, at an NCO/OH ratio of more than 1, the terminal of main chain becomes the NCO group, and by separately adding an alcohol having an ethylenically unsaturated bond (for example, 2-hydroxyethyl (meth)acrylate, Blemmer PME200, produced by NOF Corp.) to conduct addition thereto, the ethylenically unsaturated bond can be introduced into the terminal of main chain. According to the invention, as well as the side chain, the terminal of main chain may have the ethylenically unsaturated bond.

The specific polyurethane resin can be synthesized by heating the diisocyanate compound and diol compound described above in an aprotic solvent in the presence of a known catalyst having an activity responding to the reactivity of the compounds. A molar ratio (Ma:Mb) of the diisocyanate compound to the diol compound used in the synthesis is preferably from 1:1 to 1.2:1, and by treating, for example, with an alcohol or an amine, the product having desired physical properties, for example, molecular weight or viscosity and containing no residual isocyanate group can be finally synthesized.

The synthesis using a bismuth catalyst is preferable in comparison with at using a tin catalyst conventionally often used from the standpoint of environment and polymerization rate. As the bismuth catalyst, Neostan U-600 (trade name, produced by Nitto Kasei Co., Ltd.) is particularly preferable.

As for the specific polyurethane resin according to the invention, that having an ethylenically unsaturated bond in the polymer terminal and/or polymer main chain is also preferably used.

A method for introducing the unsaturated group into the polymer terminal includes the following method. Specifically, a method is exemplified wherein in the step of treatment of the residual isocyanate group at the polymer terminal, for example, with an alcohol or amine in the synthesis of polyurethane resin described above, an alcohol or amine having the unsaturated group is used.

A method for introducing the unsaturated group into the polymer main chain includes a method of using a diol compound having the unsaturated group in the direction of main chain in the synthesis of polyurethane resin. Specific examples of the diol compound having the unsaturated group in the direction of main chain include the following compounds. Specifically, cis-2-butene-1,4-diol, trans-2-butene-1,4-diol and polybutadienediol are exemplified.

The ethylenically unsaturated bond is preferably introduced into the polymer side chain rather than the polymer terminal because control of the introduction amount is easy so that the introduction amount can be increased and efficiency of crosslinking reaction increases.

The ethylenically unsaturated bond group introduced is preferably a methacryloyl group, acryloyl group or a styryl group, more preferably a methacryloyl group or acryloyl group, in view of crosslinked cured layer-forming property. From the standpoint of the crosslinked cured layer-forming property and storage stability of the resin composition, a methacryloyl group is more preferable.

With respect to the amount of ethylenically unsaturated bond introduced into the specific polyurethane resin according to the invention, the amount of ethylenically unsaturated bond group introduced into the side chain is preferably 0.3 meq/g or more, more preferably from 0.35 to 1.50 meq/g, in terms of equivalent Specifically, the polyurethane resin containing the methacryloyl group in the side chain in an amount of 0.35 to 1.50 meq/g is most preferable.

The molecular weight of the specific polyurethane resin according to the invention is preferably 10,000 or more, more preferably in a range of 40,000 to 200,000, in terms of weight average molecular weight. In particular, when the laser-decomposable resin composition according to the invention is used in an image-recording layer of a pattern-forming material, excellent strength of the image area is obtained in the above-described range of weight average molecular weight.

Specific examples of the specific polyurethane resin for use in the invention are set forth below, but the invention should not be construed as being limited thereto.

| Polyurethane Resin | Diisocyanate Compound Used (% by mole) | Diol Compound Used (% by mole) | Weight Average Molecular Weight |
|---|---|---|---|
| P-1 | 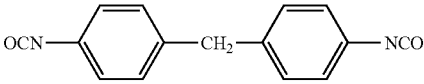 100 | 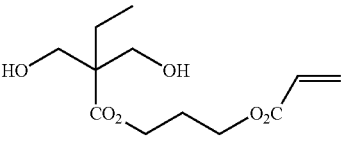 50 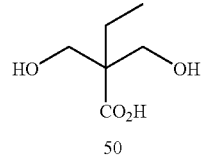 50 | 95,000 |
| P-2 | 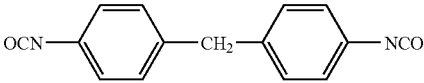 80 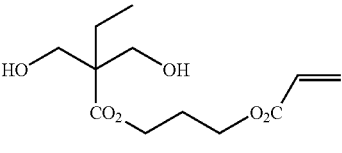 20 | 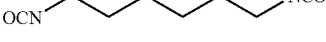 50 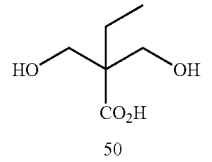 50 | 98,000 |
| P-3 | 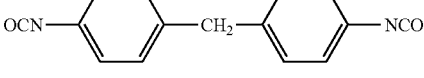 80 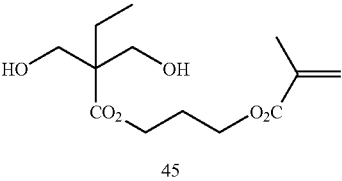 20 | 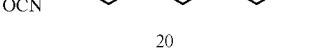 45 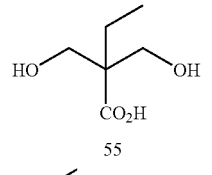 55 | 103,000 |
| P-4 | 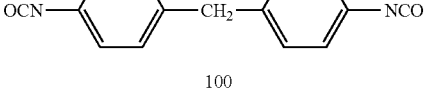 100 | 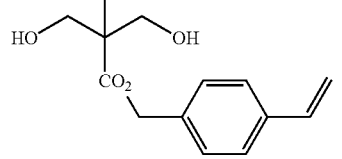 50 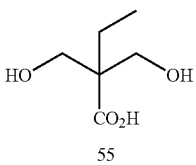 55 | 108,000 |

-continued
| Polyurethane Resin | Diisocyanate Compound Used (% by mole) | Diol Compound Used (% by mole) | Weight Average Molecular Weight |
|---|---|---|---|
| P-5 | 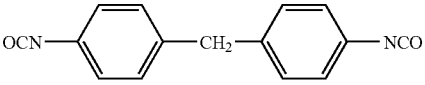 80 <br> 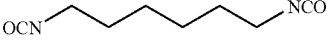 20 | 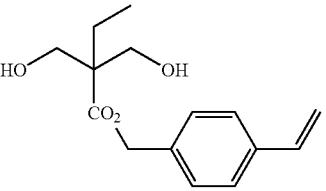 60 <br> 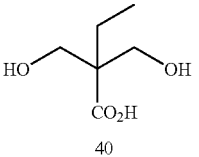 40 | 99,000 |
| P-6 | 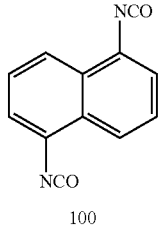 100 | 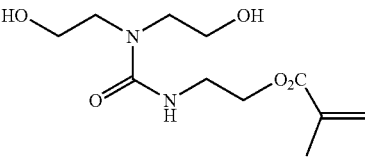 60 <br> 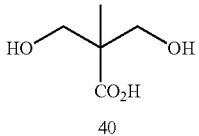 40 | 96,000 |
| P-7 | 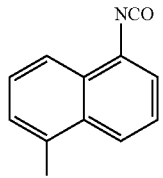 80 <br> 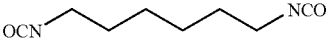 20 | 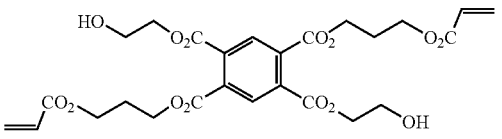 50 <br> 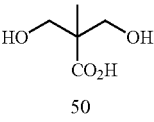 50 | 68,000 |

-continued
| Polyurethane Resin | Diisocyanate Compound Used (% by mole) | Diol Compound Used (% by mole) | Weight Average Molecular Weight |
|---|---|---|---|
| P-8 | 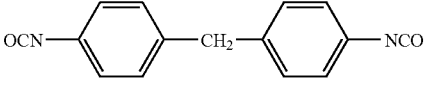 | 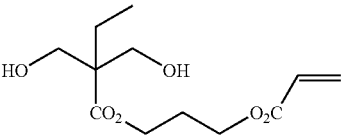 | 96,000 |
| P-9 | 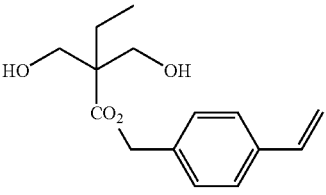 | 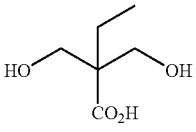 | 100,000 |
| P-10 | 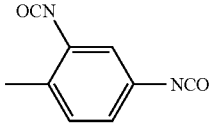 | 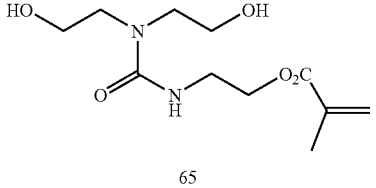 | 69,000 |

-continued
| Polyurethane Resin | Diisocyanate Compound Used (% by mole) | Diol Compound Used (% by mole) | Weight Average Molecular Weight |
|---|---|---|---|
| P-11 | 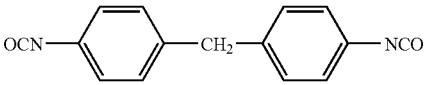 | 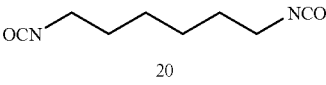 | 120,000 |
| P-12 | 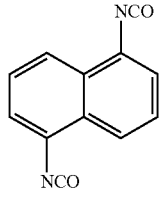 | 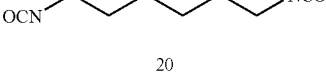 | 78,000 |
| P-13 | 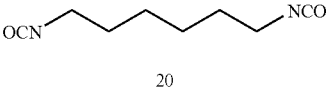 | 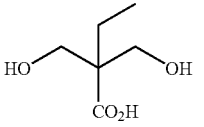 | 103,000 |

-continued
| Polyurethane Resin | Diisocyanate Compound Used (% by mole) | Diol Compound Used (% by mole) | Weight Average Molecular Weight |
|---|---|---|---|
| P-14 | 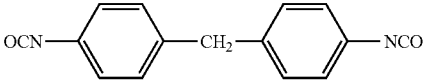 70 <br>  30 | 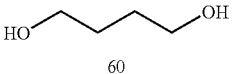 60 <br> 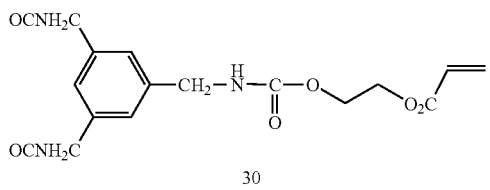 40 | 65,000 |
| P-15 | 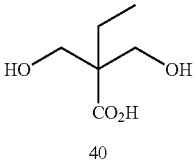 65 <br> 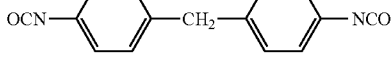 35 | 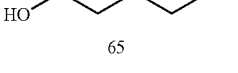 65 <br> 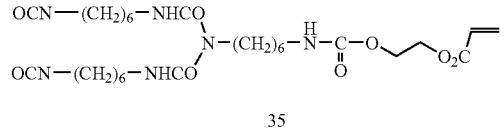 35 | 78,000 |
| P-16 | 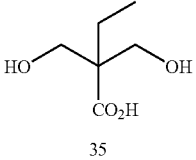 70 <br> 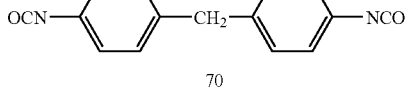 30 |  40 <br> 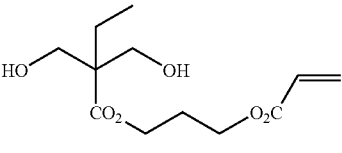 60 | 69,000 |
| P-17 | 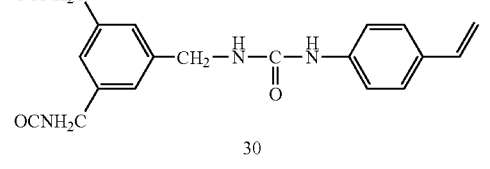 100 | 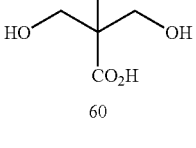 40 <br> 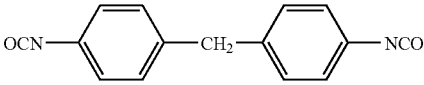 Mw 1000 10 <br>  50 | 99,000 |

-continued

| Polyurethane Resin | Diisocyanate Compound Used (% by mole) | Diol Compound Used (% by mole) | Weight Average Molecular Weight |
|---|---|---|---|
| P-18 | OCN—C₆H₄—CH₂—C₆H₄—NCO  80<br><br>OCN—(CH₂)₆—NCO  20 | HOCH₂—C(Et)(CH₂OH)—CO₂—(CH₂)₃—O₂C—C(=CH₂)CH₃  30<br><br>HOCH₂—C(Et)(CH₂OH)—CO₂H  60<br><br>HO—CH₂—C(CH₃)₂—CH₂—[O—C(=O)—(CH₂)₄—C(=O)—O—CH₂—C(CH₃)₂—CH₂]ₙ—OH  Mw 1500  10 | 87,000 |
| P-19 | OCN—C₆H₄—CH₂—C₆H₄—NCO  100 | HOCH₂—C(Et)(CH₂OH)—CO₂—CH₂—C₆H₄—CH=CH₂  40<br><br>HO—(CH₂CH₂CH₂CH₂O)ₙ—H  Mw 2000  10<br><br>HOCH₂—C(Et)(CH₂OH)—CO₂H  50 | 97,000 |
| P-20 | OCN—C₆H₄—CH₂—C₆H₄—NCO  80<br><br>OCN—(CH₂)₆—NCO  20 | HOCH₂—C(Et)(CH₂OH)—CO₂—CH₂—C₆H₄—CH=CH₂  35<br><br>HO—(CH₂)₂—[O—C(=O)—(CH₂)₅]ₙ—OH  Mw 1500  10<br><br>HOCH₂—C(Et)(CH₂OH)—CO₂H  55 | 103,000 |

-continued
| Polyurethane Resin | Diisocyanate Compound Used (% by mole) | Diol Compound Used (% by mole) | Weight Average Molecular Weight |
|---|---|---|---|
| P-21 | 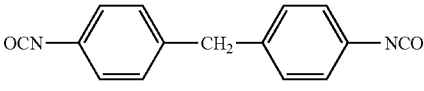 80<br>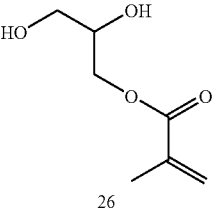 20 | 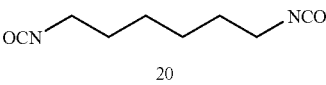 26<br>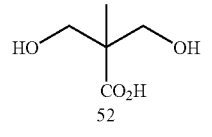 52<br>HO—(CH$_2$CHO)$_n$—H<br>\|<br>CH$_3$<br>Mw 1000<br>22 | 60,000 |
| P-22 | 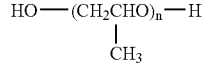 100 | 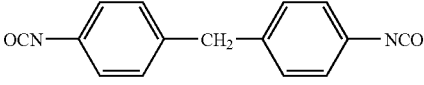 30<br>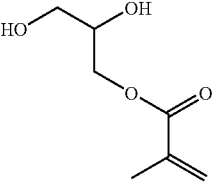 50<br>HO—(CH$_2$CHO)$_n$—H<br>\|<br>CH$_3$<br>Mw 1500<br>20 | 70,000 |
| P-23 | 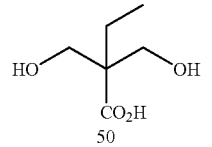 80<br>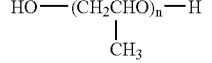 20 | 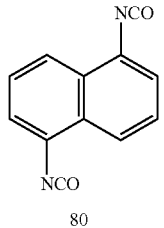 40<br>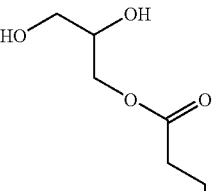 60 | 50,000 |

-continued
| Polyurethane Resin | Diisocyanate Compound Used (% by mole) | Diol Compound Used (% by mole) | Weight Average Molecular Weight |
|---|---|---|---|
| P-24 | 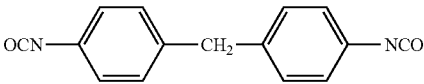 | 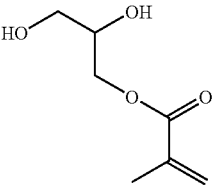 | 75,000 |
| P-25 | 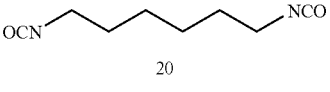 | 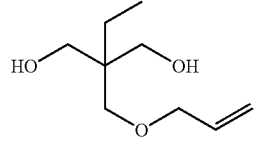 | 80,000 |
| P-26 | 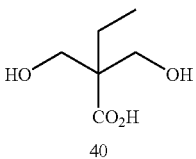 | 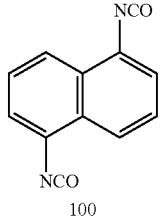 | 50,000 |

-continued
| Polyurethane Resin | Diisocyanate Compound Used (% by mole) | Diol Compound Used (% by mole) | Weight Average Molecular Weight |
|---|---|---|---|
| P-27 | 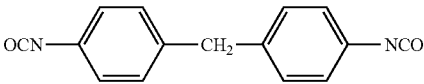 80<br><br>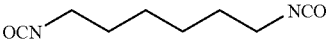 20 | HO—(CH$_2$CH—O)$_n$—H<br>     \|<br>     CH$_3$<br>40<br>(Mw = 400)<br><br>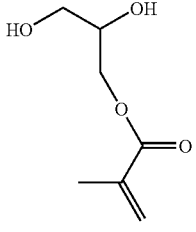 50<br><br>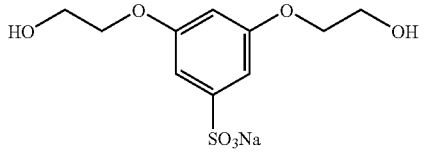 10 | 60,000 |
| P-28 | 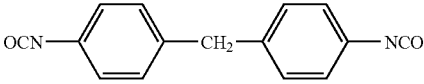 80<br><br>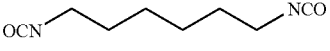 20 | HO—(CH$_2$CH—O)$_n$—H<br>     \|<br>     CH$_3$<br>100<br>(Mw = 1000) | 59,000 |
| P-29 | 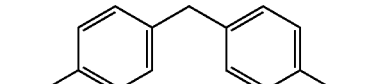 80<br><br>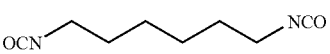 20 | HO—(CH$_2$CH—O)$_n$—H<br>     \|<br>     CH$_3$<br>22<br>Mw = 1000<br><br>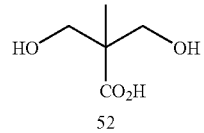 52<br><br>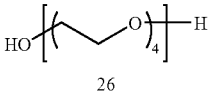 26 | 63,000 |

-continued
| Polyurethane Resin | Diisocyanate Compound Used (% by mole) | Diol Compound Used (% by mole) | Weight Average Molecular Weight |
|---|---|---|---|
| P-30 | 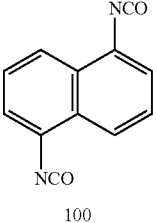 100 | 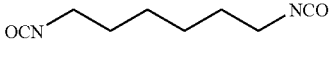 100 | 32,000 |
| P-31 | 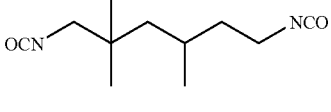 100 | 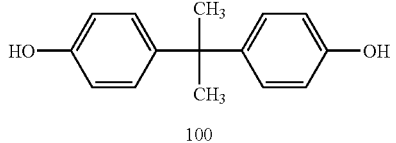 100 | 21,000 |
| P-32 | 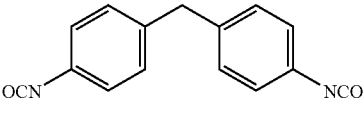 100 | 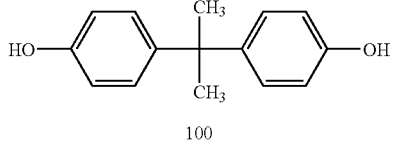 100 | 29,000 |
| P-33 | 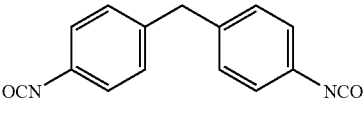 100 | 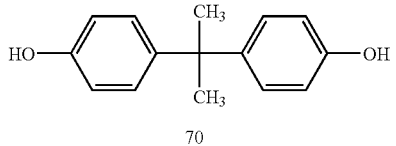 70 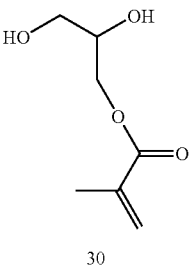 30 | 41,000 |
| P-34 | 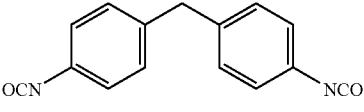 50 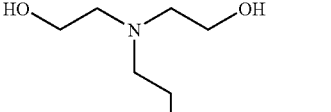 50 | 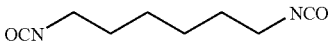 100 | 67,000 |

-continued
| Polyurethane Resin | Diisocyanate Compound Used (% by mole) | Diol Compound Used (% by mole) | Weight Average Molecular Weight |
|---|---|---|---|
| P-35 | 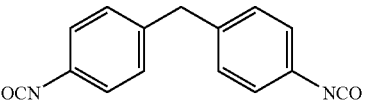<br>100 | HO—(CH$_2$)$_6$—(OCO(CH$_2$)$_6$)$_n$—OH<br>(Mn = 860)<br>80<br><br><br>20 | 69,000 |
| P-36 | 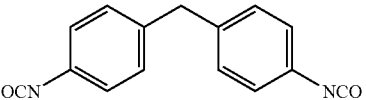<br>100 | HO—(CH$_2$)$_6$—(OCO(CH$_2$)$_6$)$_n$—OH<br>(Mn = 860)<br>80<br><br>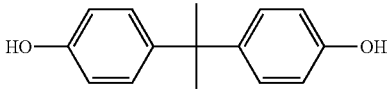<br>20 | 68,000 |
| P-37 | 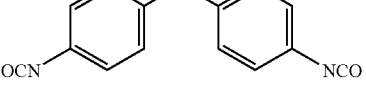<br>100 | HO—(CH$_2$CH)$_n$—O—H<br>\|<br>CH$_3$<br>(Mw = 1000)<br>20<br><br>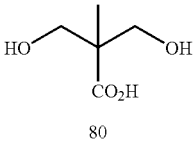<br>80 | 48,000 |
| P-38 | 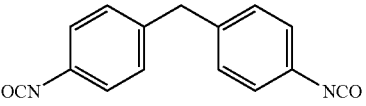<br>50<br><br>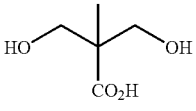<br>50 | HO—(CH$_2$CH)$_n$—O—H<br>\|<br>CH$_3$<br>(Mw = 1000)<br>20<br><br>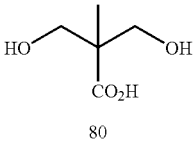<br>80 | 50,000 |

-continued

| Polyurethane Resin | Diisocyanate Compound Used (% by mole) | Diol Compound Used (% by mole) | Weight Average Molecular Weight |
|---|---|---|---|
| P-39 | 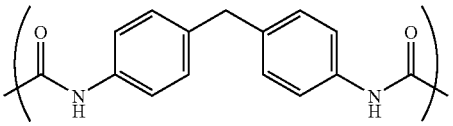 100 | 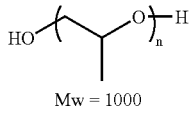 Mw = 1000 / 10 ; 40 | 47,000 |

The specific polyurethane resin according to the invention has a feature that it is heat-decomposed at relatively low temperature (not higher than 250° C.) in comparison with a binder polymer of a conventional laser decomposable resin composition (most commercially available conventional resins are heat-decomposed at high temperature of 300 to 400° C.). Therefore, the laser-decomposable resin composition comprising the specific polyurethane resin can be decomposed in high sensitivity. Also, even in a system where the specific polyurethane resin is used together with a binder polymer particularly, in the state of phase separation), due to heat generation upon laser irradiation, the specific polyurethane resin is first decomposed and gas (for example, nitrogen gas) generated at the vaporization accompanied with the heat decomposition of the specific polyurethane resin assists and accelerates vaporization of the coexisting binder polymer. Accordingly, it is believed that the laser-decomposable resin composition containing the specific polyurethane resin and the binder polymer is improved in the laser decomposability to achieve the high sensitivity in comparison with a case wherein the specific polyurethane resin is not contained.

It is also possible to use a polyurethane resin other than the specific polyurethane resin is used together with the specific polyurethane resin according to the invention insofar as the effects of the invention are not impaired.

<Binder Polymer>

The laser-decomposable resin composition according to the invention may contain a binder polymer. It is useful for the binder polymer to form the state of phase separation when it is used together with the specific polyurethane resin according to the invention. The binder polymer included in the laser-decomposable resin composition according to the invention is preferably a binder polymer having a carbon-carbon unsaturated bond in any one of its main chain and side chain. A polymer containing any one of an olefin bond (carbon-carbon double bond) and a carbon-carbon triple bond in its main chain is more preferable in view of ease of formation of the state of phase separation and high mechanical strength of the layer formed, and a polymer containing the olefin bond in its main chain is particularly preferable.

The polymer containing any one of an olefin bond and a carbon-carbon triple bond in its main chain includes, for example, SB (polystyrene-polybutadiene), SBS (polystyrene-polybutadiene-polystyrene), SIS (polystyrene-polyisoprene-polystyrene) or SEBS (polystyrene-polyethylene/polybutylene-polystyrene).

The confirmation of the phase separation can be performed by observation with SEM (scanning electron microscope). In particular, the polymer containing any one of an olefin bond and a carbon-carbon triple bond in its main chain is apt to undergo the phase separation and has a feature that it is stained upon contact with an osmium compound. On the other hand, since the specific polyurethane resin according to the invention is not stained with the osmium compound, it has an advantage in that the confirmation of the phase separation becomes easy by conducting the treatment of a sample of the phase separation with the osmium compound prior to the observation with SEM.

The number average molecular weight of the binder polymer is preferably in a range of 1,000 to 1,000,000, more preferably in a range of 5,000 to 500,000. When the number average molecular weight thereof is in the range of 1,000 to 1,000,000, the mechanical strength of the layer formed can be ensured. The term "number average molecular weigh" as used herein means a molecular weight obtained by measuring using gel permeation chromatography (GPC) and calculating in terms of standard polystyrene of a known molecular weight.

In the case wherein the laser-decomposable resin composition according to the invention contains the binder polymer, the amount of the binder polymer added is ordinarily from 1 to 99% by weight preferably from 5 to 80% by weight based on the total solid content of the resin composition.

Moreover, according to the invention, the binder polymer described above may be used together with a conventional resin described below. The amount of the resin used together is ordinarily from 1 to 90% by weight, preferably from 5 to 80% by weight, based on the binder polymer described above.

The resin used together may be an elastomer or a nonelastomer.

The number average molecular weight of the resin used together is preferably in a range of 1,000 to 1,000,000, more preferably in a range of 5,000 to 500,000. when the number average molecular weight thereof is in the range of 1,000 to 1,000,000, the mechanical strength of the layer formed can be ensured. The term "number average molecular weigh" as used herein means a molecular weight obtained by measuring using gel permeation chromatography (GPC) and calculating in terms of standard polystyrene of a known molecular weight.

As the resin used together, a resin easily liquefiable or a resin easily decomposable is preferable. The resin easily decomposable preferably contains in the molecular chain as a monomer unit easily decomposable, for example, a monomer unit derived from styrene, α-methylstyrene, α-methoxystyrene, an acryl ester, a methacryl ester, an ester compound, an ether compound, a nitro compound, a carbonate compound, a carbamoyl compound, a hemiacetal ester compound, an oxyethylene compound or an aliphatic cyclic compound. In particular, a polyether, for example, polyethylene glycol, polypropylene glycol or polytetraethylene glycol, an aliphatic polycarbonate, an aliphatic polycarbamate, polymethyl methacrylate, polystyrene, nitrocellulose, polyoxyethylene, polynorbornene, hydrogenated polycyclohexadiene or a polymer having a molecular structure of many branched structures, for example, a dendrimer is the representative example of the resin easily decomposable. Also, a polymer containing a lot of oxygen atoms in the molecular chain is preferable from the standpoint of the decomposability. Among them, the compound having a carbonate group, a carbamate group or a methacryl group in the polymer main chain is preferable in view of the high heat decomposability. For instance, a polyester or polyurethane synthesized using as the raw material, (poly)carbonatediol or (poly)carbonate dicarboxylic acid or a polyamide synthesized using as the raw material, (poly)carbonate diamine is illustrated as a preferable example of the polymer of good heat decomposability. The polymer may contain a polymerizable unsaturated group in the main chain or side chain thereof. In particular, when the polymer has a reactive functional group, for example, a hydroxy group, an amino group or a carboxyl group at the terminal, it is easy to introduce the polymerizable unsaturated group.

The thermoplastic elastomer is not particularly restricted and includes, for example, a urethane-series thermoplastic elastomer, an ester-series thermoplastic elastomer, an amide-series thermoplastic elastomer or a silicone-series thermoplastic elastomer. In order to more increase the heat decomposability, a polymer wherein an easily decomposable functional group, for example, a carbamoyl group or a carbonate group is introduced into its main chain can be used. Also, it may be used as a mixture with a polymer of higher heat decomposability. Since the thermoplastic elastomer is fluidized by heating, it is possible to mix with the complex for use in the invention. The term "thermoplastic elastomer" as used herein means a material which exhibits rubber elasticity at ambient temperature and is fluidized by heating to undergo fabrication as an ordinary thermoplastic plastic. With respect to the molecular structure, the thermoplastic elastomer comprises a soft segment like a polyether or a rubber molecule and a hard segment which prevents plastic deformation around ambient temperature as vulcanized rubber. As the hard segment, various types, for example, a frozen phase, a crystalline phase, a hydrogen bond or an ionic crosslinkage are present.

The kind of thermoplastic elastomer can be selected depending on the use of the resin composition. For instance, in the field requiring solvent resistance, a urethane-series, ester-series, amide-series or fluorine-series thermoplastic elastomer is preferable and in the field requiring heat resistance, a urethane-series, olefin-series, ester-series or fluorine-series thermoplastic elastomer is preferable. Further, the hardness can be widely changed depending on the kind of thermoplastic elastomer.

The non-elastomeric thermoplastic resin is not particularly restricted and includes, for example, a polyester resin, an unsaturated polyester resin, a polyamide resin, a polyamide-imide resin, a polyurethane resin, an unsaturated polyurethane resin a polysulfone resin, a polyethersulfone resin, a polyimide resin, a polycarbonate resin and a full aromatic polyester resin.

A hydrophilic polymer may be used as the resin used together. The hydrophilic polymer includes, for example, a hydrophilic polymer containing hydroxyethylene as a constituting unit. Specifically, polyvinyl alcohol, a vinyl alcohol/vinyl acetate copolymer (partially saponified polyvinyl alcohol) and a modified product thereof are exemplified. The hydrophilic polymers may be used individually or in combination of two or more thereof. Examples of the modified product include a polymer wherein at least a part of hydroxy groups are modified to carboxyl groups, a polymer wherein at least a part of hydroxy groups are modified to (meth)acryloyl groups, a polymer wherein at least a part of hydroxy groups are modified to amino groups, and a polymer having ethylene glycol, propylene glycol or a dimer thereof introduced into its side chain.

The polymer wherein at least a part of hydroxy groups are modified to carboxyl groups can be obtained by esterification of polyvinyl alcohol or partially saponified polyvinyl alcohol with a polyfunctional carboxylic acid, for example, succinic acid, maleic acid or adipic acid.

The polymer wherein at least a part of hydroxy groups are modified to (meth)acryloyl groups can be obtained by addition of a glycidyl group-containing ethylenically unsaturated monomer to the above-described carboxyl group-modified polymer or by esterification of polyvinyl alcohol or partially saponified polyvinyl alcohol with (meth)acrylic acid.

The polymer wherein at least a part of hydroxy groups are modified to amino groups can be obtained by esterification of polyvinyl alcohol or partially saponified polyvinyl alcohol with a carboxylic acid containing an amino group, for example, carbamic acid.

The polymer having ethylene glycol, propylene glycol or a dimer thereof introduced into its side chain can be obtained by heating polyvinyl alcohol or partially saponified polyvinyl alcohol together with a glycol in the presence of a sulfuric acid catalyst and removing water as a byproduct from the reaction system.

Of the hydrophilic polymers, the polymer wherein at least a part of hydroxy groups are modified to (meth)acryloyl groups is particularly preferably used. This is because by the direct introduction of an unreacted crosslinkable functional group to a polymer component, strength of the layer formed can be increased so that both flexibility and strength of the layer formed can be achieved.

The weight average molecular weight (measured by GPC and calculated in terms of polystyrene) of the hydrophilic polymer is preferably from 10,000 to 500,000. When the weight average molecular weight is 10,000 or more, the polymer is excellent the configuration retention property as a resin alone. When the weight average molecular weight is 500,000 or less, the polymer is easily soluble in a solvent, for example, water and advantageous to the preparation of a crosslinkable resin composition.

Further, the resin used together may be a solvent-soluble resin. Specific examples thereof include a polysulfone resin, a polyethersulfone resin, an epoxy resin, an alkyd resin, a polyolefin resin and a polyester resin.

The resin used together does not ordinarily have a polymerizable unsaturated group having a high reactivity. However, it may have the polymerizable unsaturated group having a high reactivity at the terminal of the molecular chain or in the side chain. When a polymer having the polymerizable unsaturated group having a high reactivity, for example, a methacryloyl group is used, a layer having the extremely high mechanical strength can be prepared. In particular, as for the polyurethane-series or polyester-series thermoplastic elastomer, the polymerizable unsaturated group having a high reactivity can be introduced into the molecule thereof with comparative ease. The terminology "be introduced into the molecule" as used herein means and includes cases wherein the polymerizable unsaturated group is directly bonded at both terminals or one terminal of the polymer main chain, at a terminal of the polymer side chain, or in the polymer main chain or side chain. Specifically, for instance, the resin having the polymerizable unsaturated group directly introduced at the terminal of molecule may be used. Alternatively, other method, for example, a method is preferably employed in which a compound having a molecular weight of about several thousands and including plural reactive groups, for example, a hydroxy group, an amino group, an epoxy group, a carboxyl group, an acid anhydride group, a ketone group, a hydrazine residue, an isocyanate group, an isothiocyanate group, a cyclic carbonate group or an ester group is reacted with a bonding agent (for example, a polyisocyanate group reacting with a hydroxy group or ado group) having a group capable of connecting with the reactive group of the above compound to conduct the adjustment of molecular weight and conversion to a terminal bonding group and then the resulting compound is reacted with an organic compound having a group capable of reacting with the terminal bonding group and a polymerizable unsaturated group to introduce the polymerizable unsaturated group into the terminal.

From the standpoint of achieving more preferable laser decomposition sensitivity, the system of using the specific polyurethane resin alone is preferable in comparison with the system wherein the specific polyurethane resin is used together with the binder polymer.

The laser-decomposable resin composition according to the invention may further contain a polymerizable compound (monomer), an initiator and other components, if desired. The polymerizable compound (monomer), initiator and other components will be described hereinafter.

Polymerizable Compound (Monomer)

The polymerizable compound (monomer) is described in greater detail below taking a case wherein an addition polymerizable compound is used as an example.

<Addition Polymerizable Compound>

The addition-polymerizable compound having at least one ethylenically unsaturated double bond which is the polymerizable compound preferably used in the invention is selected from compounds having at least one, preferably two or more, terminal ethylenically unsaturated double bonds. Such compounds are widely known in the field of art and they can be used in the invention without any particular limitation. The compound has a chemical form, for example, a monomer, a prepolymer, specifically, a dimer, a trimer or an oligomer, or a copolymer thereof, or a mixture thereof. Examples of the monomer include unsaturated carboxylic acids (for example, acrylic acid, methacrylic acid, itaconic acid, crotonic acid, isocrotonic acid or maleic acid) and esters or amides thereof. Preferably, esters of an unsaturated carboxylic acid with an aliphatic polyhydric alcohol compound and amides of an unsaturated carboxylic acid with an aliphatic polyvalent amine compound are used. An addition reaction product of an unsaturated carboxylic acid ester or amide having a nucleophilic substituent, for example, a hydroxy group, an amino group or a mercapto group, with a monofunctional or polyfunctional isocyanate or epoxy, or a dehydration condensation reaction product of the unsaturated carboxylic acid ester or amide with a monofunctional or polyfunctional carboxylic acid is also preferably used. Furthermore, an addition reaction product of an unsaturated carboxylic acid ester or amide having an electrophilic substituent, for example, an isocyanato group or an epoxy group with a monofunctional or polyfunctional alcohol, amine or thiol, or a substitution reaction product of an unsaturated carboxylic acid ester or amide having a releasable substituent, for example, a halogen atom or a tosyloxy group with a monofunctional or polyfunctional alcohol, amine or thiol is also preferably used. In addition, compounds in which the unsaturated carboxylic acid described above is replaced by an unsaturated phosphonic acid, styrene, vinyl ether or the like can also be used.

Specific examples of the monomer, which is an ester of an aliphatic polyhydric alcohol compound with an saturated carboxylic acid, include acrylic acid esters, for example, ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate or polyester acrylate oligomer; methacrylic acid esters, for example, tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane or bis[p-(methacryloxyethoxy)phenyl]dimethylmethane; itaconic acid esters, for example, ethylene glycol diitaconate, propylene glycol diitaconate, 1,3-butanediol diitaconate, 1,4-butanediol diitaconate, tetramethylene glycol diitaconate, pentaerythritol diitaconate or sorbitol tetraitaconate; crotonic acid esters, for example, ethylene glycol dicrotonate, tetramethylene glycol dicrotonate, pentaerythritol dicrotonate or sorbitol tetracrotonate; isocrotonic acid esters, for example, ethylene glycol diisocrotonate, pentaerythritol diisocrotonate or sorbitol tetraisocrotonate; and maleic acid esters, for example, ethylene glycol dimaleate, triethylene glycol dimaleate, pentaerythritol dimaleate and sorbitol tetramaleate.

Other examples of the ester, which can be preferably used, include aliphatic alcohol esters described in JP-B-46-27926 (the term "JP-B" as used herein means an "examined Japanese patent publication"), JP-B-51-47334 and JP-A-57-196231, esters having an aromatic skeleton described in JP-A-59-5240, JP-A-59-5241 and JP-A-2-226149, and esters containing an amino group described in JP-A-1-165613.

The above-described ester monomers can also be used as a mixture.

Specific examples of the monomer, which is an amide of an aliphatic polyvalent amine compound with an unsaturated carboxylic acid, include methylene bisacrylamide, methylene bismethacrylamide, 1,6-hexamethylene bisacrylamide, 1,6-hexamethylene bismethacrylamide, diethylenetramine trisacrylamide, xylylene bisacrylamide and xylylene bismethacrylamide.

Other preferable examples of tie amide monomer include amides having a cyclohexylene structure described in JP-B-54-21726.

Urethane type addition polymerizable compounds produced using an addition reaction between an isocyanate and a hydroxy group are also preferably used, and specific examples thereof include vinylurethane compounds having two or more polymerizable vinyl groups per molecule obtained by adding a vinyl monomer containing a hydroxy group represented by formula (V) show below to a polyisocyanate compound having two or more isocyanate groups per molecule, described in JP-B-48-41708.

$$CH_2=C(R)COOCH_2CH(R')OH \qquad (V)$$

wherein R and R' each independently represents H or $CH_3$.

Also, urethane acrylates described in JP-A-51-37193, JP-B-2-32293 and JP-B-2-16765, and urethane compounds having an ethylene oxide skeleton described in JP-B-58-49860, JP-B-56-17654, JP-B-62-39417 and JP-B-62-39418 are preferably used.

The urethane type addition polymerizable compound is extremely preferable because it has good compatibility with the specific polyurethane resin according to the invention and high engraving sensitivity. Among them, PLEX 6661-0 (produced by Degussa GmbH) is particularly preferable because it rapidly undergoes heat decomposition (decrease of weight upon the heat decomposition) at approximately 250° C. not only to provide the high engraving sensitivity but also to exhibit high resolution due to shape edge shape of the engraving portion.

Furthermore, the resin composition capable of being cured at short times can be obtained by using an addition polymerizable compound having an amino structure or a sulfide structure in its molecule described in JP-A-63-277653, JP-A-63-260909 and JP-A-1-105238.

Other examples include polyfunctional acrylates and methacrylates, for example, polyester acrylates and epoxy acrylates obtained by reacting an epoxy resin with acrylic acid or methacrylic acid described in JP-A-48-64183, JP-B-49-43191 and JP-B-52-30490. Specific unsaturated compounds described in JP-B46-43946, JP-B-1-40337 and JP-B-1-40336, and vinylphosphonic acid series compounds described in JP-A-2-25493 can also be exemplified. In some cases, structure containing a perfluoroalkyl group described in JP-A-61-22048 can be preferably used. Moreover, photocurable monomers or oligomers described in *Nippon Secchaku Kyokaishi* (*Journal of Japan Adhesion Society*), Vol. 20, No. 7, pages 300 to 308 (1984) can also be used.

In view of the photo-speed, a structure having a large content of unsaturated groups per molecule is preferred and in many cases, a difunctional or more functional compound is preferred. In order to increase the strength of image area that is, cured layer, a trifunctional or more functional compound is preferred. A combination use of compounds different in the functional number or in the kind of polymerizable group (for example, an acrylic acid ester, a methacrylic acid ester, a styrene compound or a vinyl ether compound) is an effective method for controlling both the sensitivity and the strength. The polymerizable compound is preferably used in an amount from 5 to 80% by weight, more preferably from 25 to 75% by weight, based on the nonvolatile component of the resin composition. The polymerizable compounds may be used individually or in combination of two or more thereof. By using the polymerizable compound, the physical properties of layer, for example, brittleness or flexibility can be adjusted.

Before and/or after the laser decomposition, the laser-decomposable resin composition containing the polymerizable compound can be polymerized and cured with energy, for example, light or heat.

Preferable specific examples of the polymerizable compound used together with the specific polyurethane resin in the laser-decomposable resin composition according to the invention are set forth below.

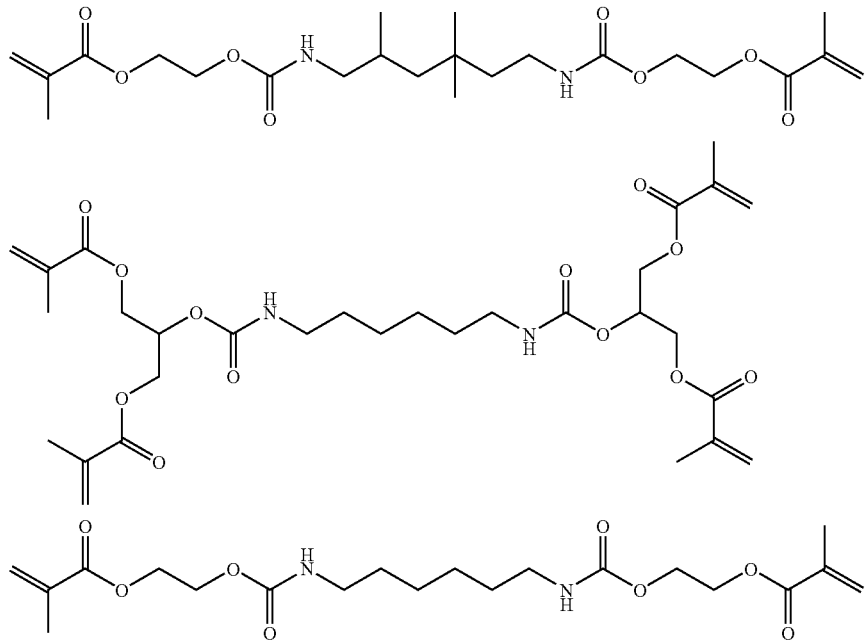

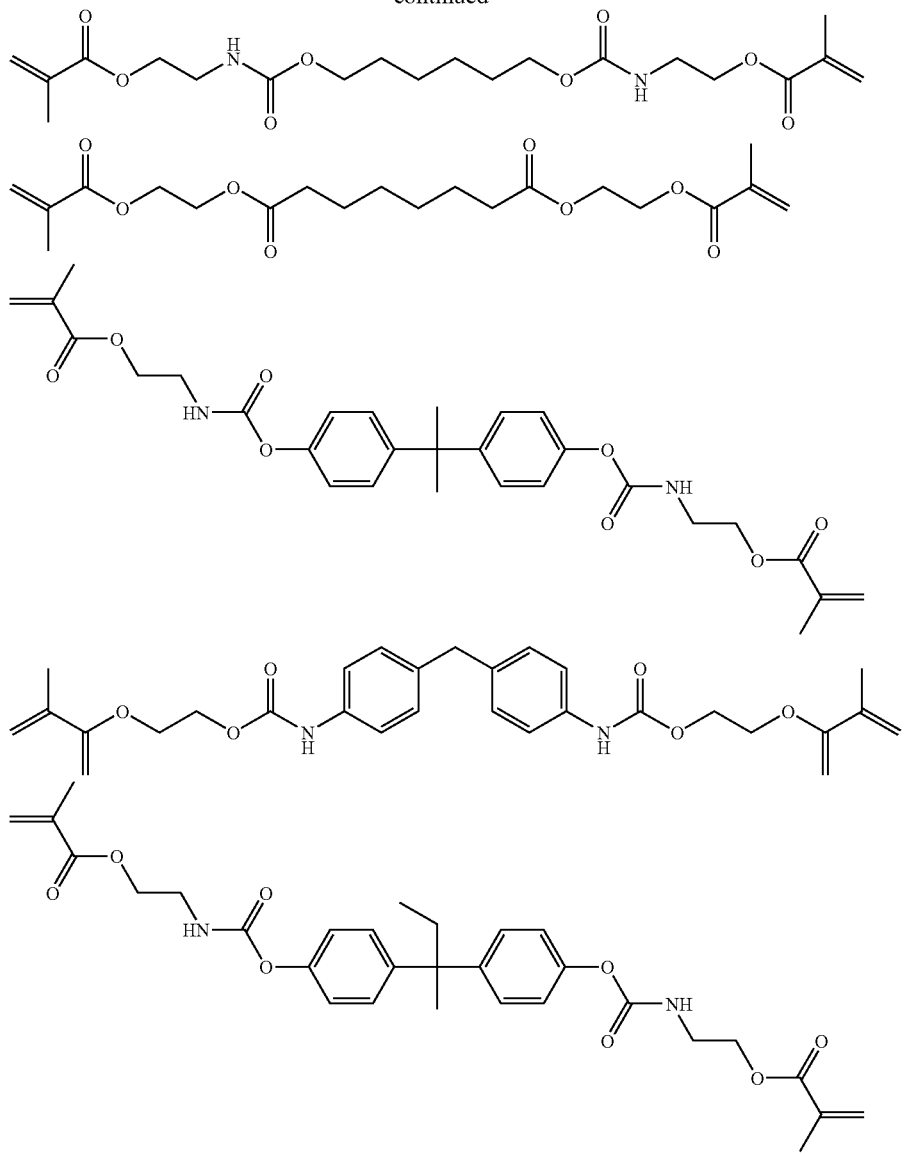

<Initiator>

As the initiator, initiators known to those skilled in the art can be used without limitation. Specifically, many compounds described in literature, for example, Bruce M. Monroe et al., *Chemical Review*, 93, 435 (1993), R. S. Davidson, *Journal of Photochemistry and Biology A: Chemistry*, 73, 81 (1993), J. P. Faussier, *Photoinitiated Polymerization-Theory and Applications: Rapra Review*, Vol. 9, Report Rapra Technology (1998) or M. Tsunooka et al., *Prog. Polym. Sci.*, 21, 1 (1996) can he used. Further, a group of compounds undergoing oxidative or reductive bond cleavage as described, for example, in F. D. Saeva, *Topics in Current Chemistry*, 156, 59 (1990), G. G. Maslak, *Topics in Current Chemistry*, 168, 1 (1993), H. B. Shuster et al., *JACS*, 112, 6329 (1990) and I. D. F. Eaton et al., *JACS*, 102, 3298 (1980) are known.

With respect to specific examples of preferable initiator, a radical initiator which is a compound that generates a radical upon light energy and/or heat energy and initiates or promotes a polymerization reaction of the above-described polymerizable compound is described in greater detail below, but the invention should not be construed as being limited thereto.

As the radical initiator preferably used in the invention, (a) an aromatic ketone, t) an onium salt compound, (c) an organic peroxide, (d) a thio compound, (e) a hexaarylbiimidazole compound, (f) a ketoxime ester compound, (g) a borate compound, (h) an azinium compound, (i) a metallocene compound, (j) an active ester compound, (k) a compound having a carbon-halogen bond and (l) an azo series compound. Specific examples of the compounds of (a) to (l) are set forth below, but the invention should not be construed as being limited thereto.

(a) Aromatic Ketone

The aromatic ketone (a) preferably used as the radical initiator in the invention includes compounds having a benzophenone skeleton or a thioxantone skeleton described in J. P, Fouassier and J. F. Rabek, *Radiation Curing in Polymer Science and Technology* pages 77 to 117 (1993). For example, the following compounds are recited.

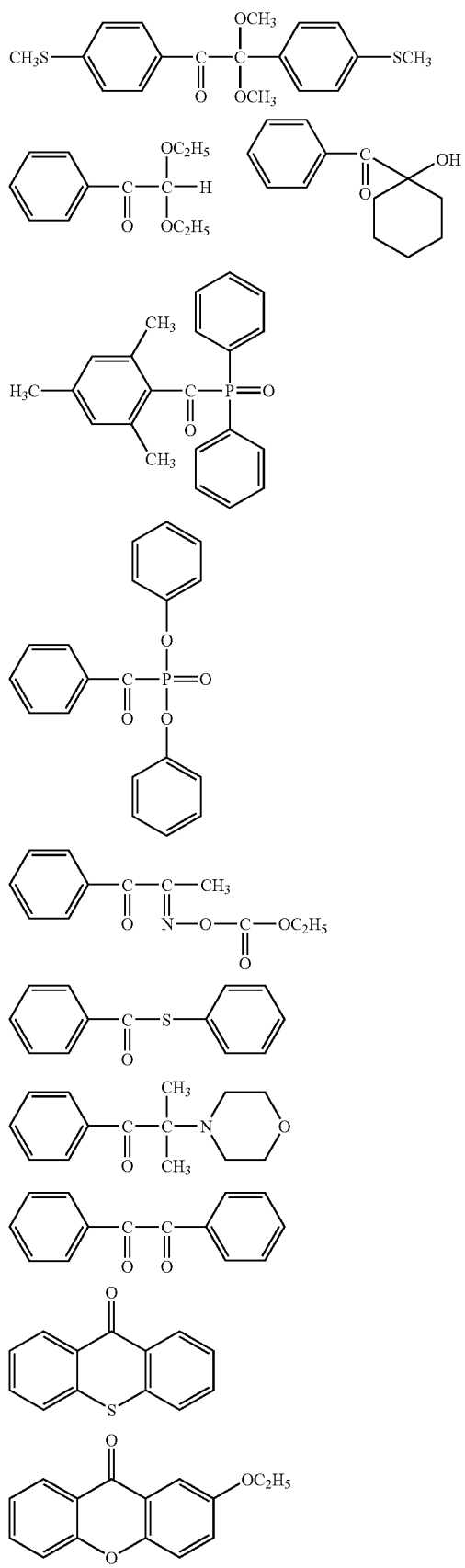
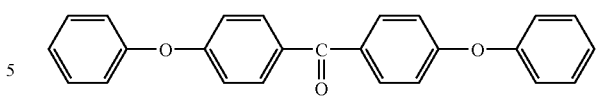
Among them, particularly preferable examples of the aromatic ketone (a) include the following compound:
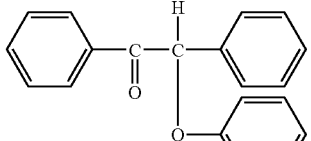
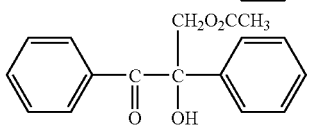
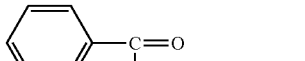
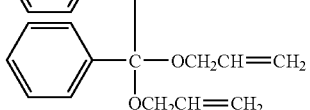
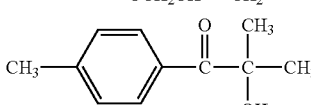
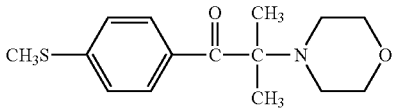
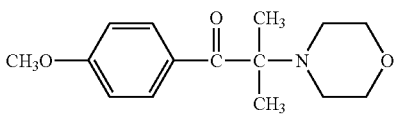
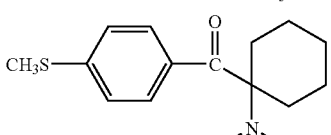
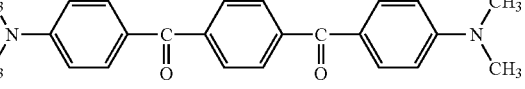
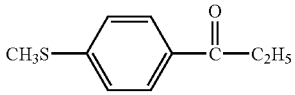
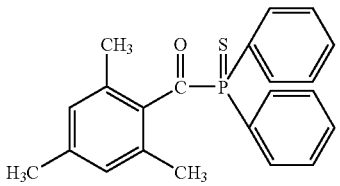

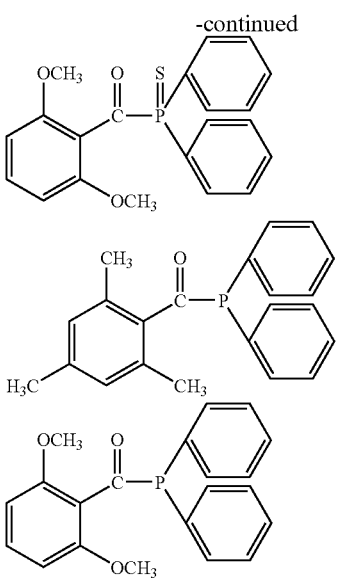

(b) Onium Salt Compound

The onium salt compound (b) preferably used as the radical initiator in the invention includes compounds represented by the following formulae (1) to (3):

$$Ar^1-I^+-Ar^2 \quad (Z^2)^- \qquad (1)$$

$$Ar^3-N^+\equiv N \quad (Z^3)^- \qquad (2)$$

$$\begin{array}{c} R^{23} \\ \phantom{R}\diagdown \\ \phantom{RR}S^+-R^{25} \quad (Z^4)^- \\ \phantom{R}\diagup \\ R^{24} \end{array} \qquad (3)$$

In formula (1), $Ar^1$ and $Ar^2$ each independently represent an aryl group having not more than 20 carbon atoms, which may have a substituent. $(Z^2)^-$ represents a counter ion selected from the group consisting of a halogen ion, a perchlorate ion, a carboxylate ion, tetrafluoroborate ion, a hexafluorophosphate ion and a sulfonate ion and is preferably a perchlorate ion, a hexafluorophosphate ion and an arylsulfonate ion.

In formula (2), $A^3$ represents an aryl group having not more than 20 carbon atoms, which may have a substituent. $(Z^3)^-$ represents a counter ion having the same meaning as defined for $(Z^2)^-$.

In formula (3), $R^{23}$, $R^{24}$ and $R^{25}$, which may be the same or different, each represent a hydrocarbon group having not more than 20 carbon atoms, which may have a substituent. $(Z^4)^-$ represents a counter ion having the same meaning as defined for $(Z^2)^-$.

Specific examples of the onium salt preferably used in the invention include those described in Paragraph Nos. [0030] to [0033] of JP-A-2001-133969 and Paragraph Nos. [0015] to [0046] of JP-A-2001-343742, and specific aromatic sulfonium salt compounds described in JP-A-2002-148790, JP-A-2001-343742, JP-A-2002-6482, JP-A-2002-116593 and JP-A-2004-102031 both of which the applicant has been previously proposed.

(c) Organic Peroxide

The organic peroxide (c) preferably used as the radical initiator in the invention includes almost all organic compounds having at least one oxygen-oxygen bond in the molecules thereof. Specific examples of the organic peroxide include methyl ethyl ketone peroxide, cyclohexanone peroxide, 3,3,5-trimethylcyclohexane peroxide, methylcyclohexanone peroxide, acetylacetone peroxide, 1,1-bis(tert-butylperoxy)-3,3,5-trimethylcyclohexane, 1,1-bis(tert-butylperoxy)cyclohexane, 2,2-bis(tert-butylperoxy)butane, tert-butylhydroperoxide, cumene hydroperoxide, diisopropylbenzene hydroperoxide, paramethane hydroperoxide, 2,5-dimethylhexane-2,5-dihydroperoxide, 1,1,3,3-tetramethylbutyl hydroperoxide, di-tert-butyl peroxide, tert-butyl cumyl peroxide, dicumyl peroxide, bis(tert-butylperoxyisopropyl)benzene, 2,5-dimethyl-2,5-di(tert-butylperoxy)hexane, 2,5-xanoyl peroxide, succinic peroxide, benzoyl peroxide, 2,4-dichlorobenzoyl peroxide, methatoluoyl peroxide, diisopropylperoxy dicarbonate, di-2-ethylhexylperoxy dicarbonate, di-2-ethoxyethylperoxy dicarbonate, dimethoxyisopropylperoxy dicarbonate, di(3-methyl-3-methoxybutyl)peroxy dicarbonate, tert-butylperoxy acetate, tert-butylperoxy pivalate, tert-butylperoxy neodecanoate, tert-butylperoxy octanoate, tert-butylperoxy 3,5,5-trimethylhexanoate, tert-butylperoxy laurate, tertiary carbonate, 3,3',4,4'-tetra(tert-butylperoxycarbonyl)benzophenone, 3,3',4,4'-tetra(tert-amylperoxycarbonyl)benzophenone, 3,3',4,4'-tetra(tert-hexylperoxycarbonyl)benzophenone, 3,3',4,4'-tetra(tert-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, carbonyl di(tert-butylperoxydihydrogen diphthalate) and carbonyl di(tert-hexylperoxydihydrogen diphthalate).

Among them, peroxy ester compounds, for example, 3,3',4,4'-tetra(tert-butylperoxycarbonyl)benzophenone, 3,3',4,4'-tetra(tert-amylperoxycarbonyl)benzophenone, 3,3',4,4'-tetra(tert-hexylperoxycarbonyl)benzophenone, 3,3',4,4'-tetra(tert-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone and d-tert-butyldiperoxy isophthalate are preferred.

(d) Thio Compound

The thio compound (d) preferably used as the radical initiator in the invention includes compounds having the structure represented by the following formula (4):

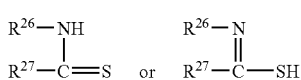

In formula (4), $R^{26}$ represents an alkyl group, an aryl group or a substituted aryl group. $R^{27}$ represents a hydrogen atom or an alkyl group. Alternatively, $R^{26}$ and $R^{27}$ combine with each other and together represent a non-metallic atomic group necessary for forming a 5-membered, 6-membered or 7-membered ring, which may contain a hetero atom selected from an oxygen atom, a sulfur atom and a nitrogen atom.

Specific examples of the thio compound represented by formula (4) include the following compounds.

| No. | $R^{26}$ | $R^{27}$ |
|---|---|---|
| 1 | —H | —H |
| 2 | —H | —$CH_3$ |
| 3 | —$CH_3$ | —H |
| 4 | —$CH_3$ | —$CH_3$ |
| 5 | —$C_6H_5$ | —$C_2H_5$ |
| 6 | —$C_6H_5$ | —$C_4H_9$ |

-continued

| No. | $R^{26}$ | $R^{27}$ |
|---|---|---|
| 7 | —$C_6H_4Cl$ | —$CH_3$ |
| 8 | —$C_6H_4Cl$ | —$C_4H_9$ |
| 9 | —$C_6H_4$—$CH_3$ | —$C_4H_9$ |
| 10 | —$C_6H_4$—$OCH_3$ | —$CH_3$ |
| 11 | —$C_6H_4$—$OCH_3$ | —$C_2H_5$ |
| 12 | —$C_6H_4$—$OC_2H_5$ | —$CH_3$ |
| 13 | —$C_6H_4$—$OC_2H_5$ | —$C_2H_5$ |
| 14 | —$C_6H_4$—$OCH_3$ | —$C_4H_9$ |
| 15 | | —$(CH_2)_2$— |
| 16 | | —$(CH_2)_2$—S— |
| 17 | | —$CH(CH_3)$—$CH_2$—S— |
| 18 | | —$CH_2$—$CH(CH_3)$—S— |
| 19 | | —$C(CH_3)_2$—$CH_2$—S— |
| 20 | | —$CH_2$—$C(CH_3)_2$—S— |
| 21 | | —$(CH_2)_2$—O— |
| 22 | | —$CH(CH_3)$—$CH_2$—O— |
| 23 | | —$C(CH_3)_2$—$CH_2$—O— |
| 24 | | —CH=CH—$N(CH_3)$— |
| 25 | | —$(CH_2)_3$—S— |
| 26 | | —$(CH_2)_2$—$CH(CH_3)$—S— |
| 27 | | —$(CH_2)_3$—O— |
| 28 | | —$(CH_2)_5$— |
| 29 | | —$C_6H_4$—O— |
| 30 | | —N=$C(SCH_3)$—S— |
| 31 | | —$C_6H_4$—NH— |
| 32 | | 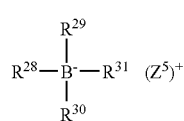 |

(e) Hexaarylbiimidazole Compound

The hexaarylbiimidazole compound (e) preferably used as the radical initiator in the invention includes lophine dimers described in JP-B-45-37377 and JP-B-44-86516, specifically, for example, 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5 5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole and 2,2'-bis(o-trifluoromethylphenyl)-4,4',5,5'-tetraphenylbiimidazole.

(f) Ketoxime Ester Compound

The ketoxime ester compound (f) preferably used as the radical initiator in the invention includes, for example, 3-benzoyloxyiminobutan-2-one, 3-acetoxyiminobutan-2-one, 3-propyonyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one and 2-ethoxycarbonyloxyimino-1-phenylpropan-1-one.

(g) Borate Compound

The borate compound (g) preferably used as the radical initiator in the invention includes compounds represented by the following formula (5):

$$R^{28}-\underset{\underset{R^{30}}{|}}{\overset{\overset{R^{29}}{|}}{B^-}}-R^{31} \quad (Z^5)^+ \tag{5}$$

In formula (5), $R^{28}$, $R^{29}$, $R^{30}$ and $R^{31}$, which may be the same or different, each represents a substituted or unsubstituted alkyl group, a substituted or unsubstituted aryl group, a substituted or unsubstituted alkenyl group, a substituted or unsubstituted alkynyl group or a substituted or unsubstituted heterocyclic group, or at least two of $R^{28}$, $R^{29}$, $R^{30}$ and $R^{31}$ may be combined with each other to form a cyclic structure, provided that at least one of $R^{28}$, $R^{29}$, $R^{30}$ and $R^{31}$ represents a substituted or unsubstituted alkyl group. $(Z^5)^+$ represents an alkali metal cation or a quaternary ammonium cation.

Specific examples of the compound represented by formula (5) include compounds described in U.S. Pat. Nos. 3,567,453 and 4,343,891, European Patents 109,772 and 109,773, and the following compounds:

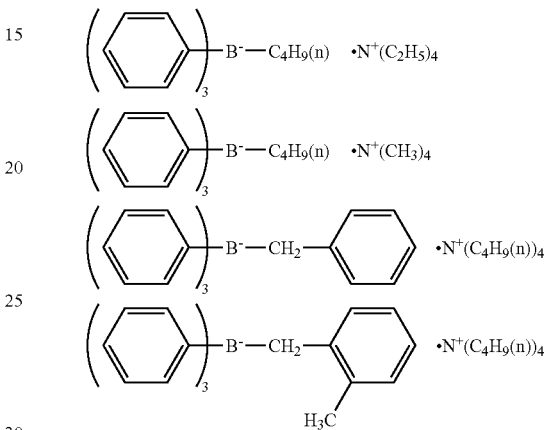

(h) Azinium Compound

The azinium compound (h) preferably used as the radical initiator in the invention includes compounds having an N—O bond described in JP-A-63-138345, JP-A-63-142345, JP-A-63-142346, JP-A-63-143537 and JP-B-46-42363.

(i) Metallocene Compound

The metallocene compound (i) preferably used as the radical initiator in the invention includes titanocene compounds described in JP-A-59-152396, JP-A-61-151197, JP-A-63-41484, JP-A-2-249 and JP-A-2-4705, and iron-arene complexes described in JP-A-1-304453 and JP-A-1-152109.

Specific examples of the titanocene compound include dicyclopentadienyl-Ti-dichloride, dicyclopentadienyl-Ti-biphenyl,
dicyclopentadienyl-Ti-bis-2,3,4,5,6-pentafluorophen-1-yl,
dicyclopentadienyl-Ti-bis-2,3,5,6-tetrafluorophen-1-yl,
dicyclopentadienyl-Ti-bis-2,4,6-difluorophen-1-yl,
dicyclopentadienyl-Ti-bis-2,6-difluorophen-1-yl,
dicyclopentadienyl-Ti-bis-2,4-difluorophen-1-yl,
dimethylcyclopentadienyl-Ti-bis-2,3,4,5,6-pentafluorophen-1-yl,
dimethylcyclopentadienyl-Ti-bis-2,3,5,6-tetrafluorophen-1-yl,
dimethylcyclopentadienyl-Ti-bis-2,4-difluorophen-1-yl,
bis(cyclopentadienyl)bis[2,6-difluoro-3-(pyr-1-yl)phenyl]titanium,
bis(cyclopentadienyl)bis[2,6-difluoro-3-(methylsufonamido)phenyl]titanium,
bis(cyclopentadienyl)bis[2,6-difluoro-3-(N-butylpivaloylamino)phenyl]titanium,
bis(cyclopentadienyl)bis[2,6-difluoro-3-(N-butyl-(4-chlorobenzoyl)amino)phenyl]titanium,
bis(cyclopentadienyl)bis[2,6-difluoro-3-(N-benzyl-2,2-dimethylpentanoylamino)phenyl]titanium,
bis(cyclopentadienyl)bis[2,6-difluoro-3-(N-(2-ethylhexyl)-4-tolylsulfonylamino)phenyl]titanium, bis(cyclopentadienyl)bis[2,6-difluoro-3-(N-(3-oxaheptyl)benzoylamino)phenyl]titanium, bis(cyclopentadienyl)bis[2,6-difluoro-3-(N-(3,6-dioxadecyl)benzoylamino)phenyl]titanium, bis(cylopentadienyl)bis[2,6-difluoro-3-trifluoromethylsulfonylamino)phenyl]titanium, bis(cyclopentadienyl)bis[2,6-difluoro-3-(trifluoroaceylamino)phenyl]titanium, bis(cyclopentadienyl)bis[2,6-difluoro-3-(2-chlorobenzoylamino)phenyl]titanium, bis(cyclopentadienyl)bis[2,6-difluoro-3-(4-chlorobenzoylamino)phenyl]titanium, bis(cyclopentadienyl)bis[2,6-difluoro-3-(N-(3,6-dioxadecyl)-2,2-dimethylpentanoylamino)phenyl]titanium, bis(cyclopentadienyl)bis[2,6-difluoro-3-(N-(3,7-dimethyl-7-methoxyoctyl)benzoylamino)phenyl]titanium and bis(cyclopentadienyl)bis[2,6-difluoro-3-(N-cyclohexylbenzoylamino)phenyl]titanium.

(j) Active Ester Compound

The active ester compound (j) preferably used as the radical initiator in the invention includes imidosulfonate compounds described in JP-B-62-6223, and active sulfonates described in JP-B-63-14340 and JP-A-59-174831.

(k) Compound Having a Carbon-Halogen Bond

The compound having a carbon-halogen bond (k) preferably used as the radical initiator in the invention includes the compounds represented by the following formulae (6) to (12):

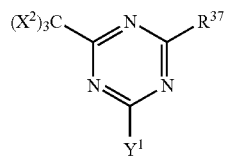
(6)

In formula (6), $X^2$ represents a halogen atom, $Y^1$ represents $-C(X^2)_3$, $-NH_2$, $-NHR^{38}$, $-N(R^{38})_2$ or $-OR^{38}$, $R^{38}$ represents an alkyl group, a substituted alkyl group, an aryl group or a substituted aryl group, and $R^{37}$ represents $-C(X^2)_3$, an alkyl group, a substituted alkyl group, an aryl group, a substituted aryl group or a substituted alkenyl group.

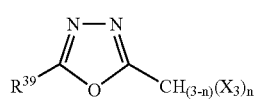
(7)

In formula (7), $R^{39}$ represents an alkyl group, a substituted alkyl group, an alkenyl group, a substituted alkenyl group, an aryl group, a substituted aryl group, a halogen atom, an alkoxy group, a substituted alkoxy group, a nitro group or a cyano group, $X^3$ represents a halogen atom, and n represents an integer of 1 to 3.

(8)

In formula (8), $R^{40}$ represents an aryl group or a substituted aryl group, $R^{41}$ represents a group shown below or a halogen atom, $Z^6$ represents $-C(=O)-$, $-C(=S)-$ or $-SO_2-$, $X^3$ represents a halogen atom, and m represents 1 or 2.

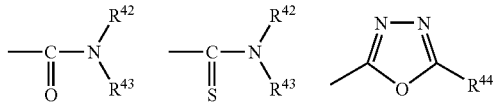

wherein, $R^{42}$ and $R^{43}$ each represents an alkyl group, a substituted alkyl group, an alkenyl group, a substituted alkenyl group, an aryl group or a substituted aryl group, and $R^{44}$ has the same meaning as defined for $R^{38}$ in formula (6).

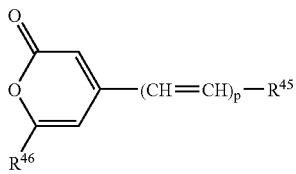
(9)

In formula (9), $R^{45}$ represents an aryl group which may be substituted or a heterocyclic group which may be substituted, $R^{46}$ represents a trihaloalkyl group or trihaloalkenyl group each having from 1 to 3 carbon atoms, and p represents 1, 2 or 3.

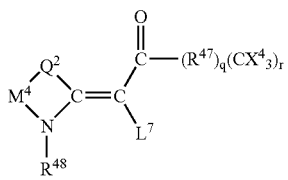
(10)

In formula (10), which represents a carbonylmethylene heterocyclic compound having a trihalogenomethyl group, $L^7$ represents a hydrogen atom or a group represented by formula $-CO-(R^{47})_q(C(X^4)_3)_r$, Q represents a sulfur atom, a selenium atom, an oxygen atom, a dialkylmethylene group, an alken-1,2-ylene group, a 1,2-phenylene group or $-N(-R^{48})-$, $M^4$ represents a substituted or unsubstituted alkylene group, a substituted or unsubstituted alkenylene group or a 1,2-arylene group, $R^{48}$ represents an alkyl group, an aralkyl group or an alkoxyalkyl group, $R^{47}$ represents a divalent carbocyclic or heterocyclic aromatic group, $X^4$ represents a chlorine atom, a bromine atom or an iodine atom, q represents 0 or 1, and r represents 1 or 2, provided that when q represents 0, r represents 1, and when q represents 1, r represents 1 or 2.

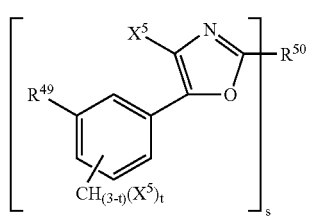
(11)

In formula (11), which represents a 4-halogeno-5-(halogenomethylphenyl)oxazole derivative, $X^5$ represents a halogen atom, t represents an integer of 1 to 3, s represents an integer of 1 to 4, $R^{49}$ represents a hydrogen atom or —$CH_{3-t}$ $X^5{}_t$, and $R^{50}$ represents an s-valent unsaturated organic residue, which may be substituted.

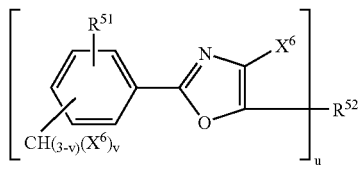

(12)

In formula (12), which represents a 2-(halogenomethylphenyl)-4-halogenooxazole derivative, $X^6$ represents a halogen atom, v represents an integer of 1 to 3, u represents an integer of 1 to 4, $R^{51}$ represents a hydrogen atom or —$CH_{3-v}$ $X^6{}_v$, and $R^{52}$ represents an u-valent unsaturated organic residue, which may be substituted.

Specific examples of the compound having a carbon-halogen bond include compounds described in Wakabayashi et al., *Bull. Chem. Soc. Japan*, Vol. 42, 2924 (1969), for example, 2-phenyl-4,6-bis(trichloromethyl)-S-triazine, 2-(p-chlorophenyl)-4,6-bis(trichloromethyl)-S-triazine, 2-(p-tolyl)-4,6-bis(trichloromethyl)-S-triazine, 2-(p-methoxyphenyl)-4,6-bis(trichloromethyl)-S-triazine, 2-(2',4'-dichlorophenyl)-4,6-bis(trichloromethyl)-S-triazine, 2,4,6-tris(trichloromethyl)-S-triazine, 2-methyl-4,6-bis(trichloromethyl)-S-triazine, 2-n-nonyl-4,6-bis(trichloromethyl)-S-triazine and 2-(α,α,β-trichloroethyl)-4,6-bis(trichloromethyl)-S-triazine. Further, compounds described in British Patent 1,388,492, for example, 2-styryl-4,6-bis(trichloromethyl)-S-triazine, 2-(p-methylstyryl)-4,6-bis(trichloromethyl)-S-triazine, 2-(p-methoxylstyryl)-4,6-bis(trichloromethyl)-S-triazine and 2-(p-methoxylstyryl)-4-amino-6-trichloromethyl-S-triazine, compounds described in JP-A-53-133428, for example, 2-(4-methoxynaphth-1-yl)-4,6-bis(trichloromethyl)-S-triazine, 2-(4-ethoxynaphth-1-yl)-4,6-bis(trichloromethyl)-S-triazine, 2-[4-(2-ethoxyethyl)naphth-1-yl]-4,6-bis(trichloromethyl)-S-triazine, 2-(4,7-dimethoxynaphth-1-yl)-4,6-bis(trichloromethyl)-S-triazine and 2-(acenaphth-5-yl)-4,6-bis(trichloromethyl)-S-triazine, and compounds described in German Patent 3,337,024, for example, the compounds shown below are exemplified. Moreover, compounds which can be easily synthesized by one skilled in the art according to synthesis methods described in M. P. Hutt, E. F. Elslager and L. M. Herbel, *Journal of Heterocyclic Chemistry*, Vol. 7, No. 3, page 511 et seq. (1970), for example, the compounds shown below are exemplified.

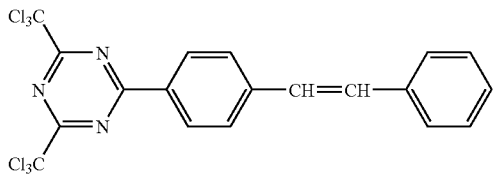

-continued

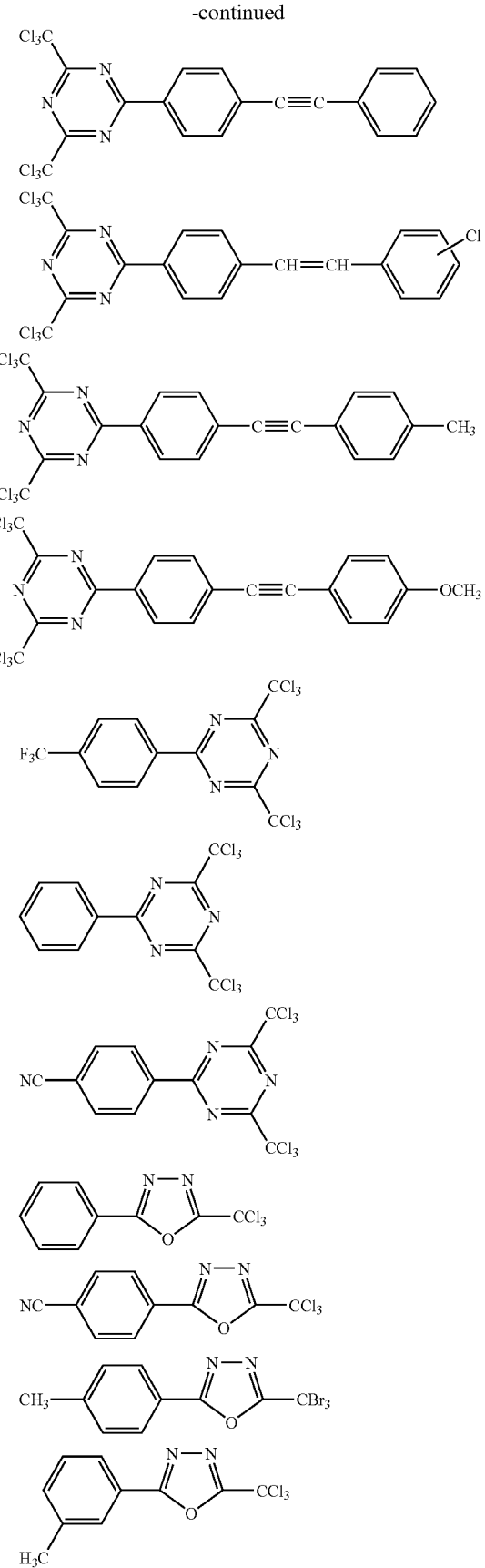

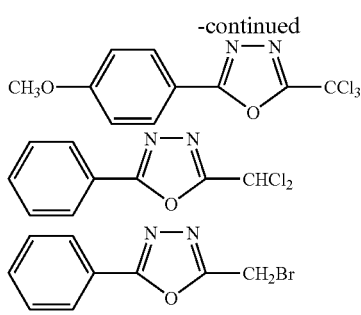

(l) Azo Series Compound

The azo series compound (1) preferably used as the radical initiator in the invention includes, for example, 2,2'-azobisisobutyronitrile, 2,2'-azobispropionitrile, 1,1'-azobis(cyclohexane-1-carbonitrile), 2,2'-azobis(2-methylbutyroritile), 2,2'-azobis(2,4-dimethylvaleronitrile), 2,2'-azobis(4-methoxy-2,4-dimethylvaleronitrile), 4,4'-azobis(4-cyanovaleric acid), dimethyl 2,2'-azobisisobutyrate, 2,2'-azobis(2-methylpropionamidooxime), 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[N-(2-propenyl)-2-methylpropionamide] and 2,2'-azobis(2,4,4-trimethylpentane).

More preferable examples of the radical initiator for use in the invention include the above-described aromatic ketone (a), onium salt compound (b), organic peroxide (c), hexaarylbiimidazole compound (e), metallocene compound (i) and compound having a carbon-halogen bond (k), and most preferable examples of the radical initiator include the aromatic iodonium salt, aromatic sulfonium salt, titanocene compound and trihalomethyl-S-triazine compound represented by formula (6) described above.

The initiator can be added to the laser-decomposable resin composition containing the polymerizable compound ordinarily from 0.1 to 50% by weight, preferably from 0.5 to 30% by weight, particularly preferably from 5 to 20% by weight, based on tie total solid content of the polymerizable composition.

The initiators can be preferably used individually or in combination of two or more thereof in the invention.

Other Components

To the laser-decomposable resin composition according to the invention, other components suitable for the use and production method thereof may further be appropriately added. Preferable examples of the additive are described below.

<Sensitizing Dye>

In the case wherein the exposure is conducted using as a light source, a laser (for example, YAG laser or semiconductor laser) emitting an infrared ray of 760 to 1,200 nm, an infrared absorbing agent is ordinarily used. The infrared absorbing agent absorbs a laser beam and generates heat to accelerate thermal decompositions. The infrared absorbing agent for use in the invention includes a dye and pigment each having an absorption maximum in a wavelength range of 760 to 1,200 nm.

As the dye, commercially available dyes and known dyes described in literatures, for example, *Senryo Binran (Dye Handbook)* compiled by The Society of Synthetic Organic Chemistry, Japan (1970) can be used. Specifically, the dye includes azo dyes, metal complex azo dyes, pyrazolone azo dyes, naphthoquinone dyes, anthraquinone dyes, phthalocyanine dyes, carbonium dyes, quinoneimine dyes, methine dyes, cyanine dyes, squarylium dyes, pyrylium salts and metal thiolate complexes.

Examples of preferable dye include cyanine dyes described, for example, in JP-A-58-125246, JP-A-59-84356, JP-A-59-202829 and JP-A-60-78787, methine dyes described, for example, in JP-A-58-173696, JP-A-58-181690 and JP-A-58-194595, naphthoquinone dyes described, for example, in JP-A-58-112793, JP-A-58-224793, JP-A-59-48187, JP-A-59-73996, JP-A-60-52940 and JP-A-60-63744, squarylium dyes described, for example, in JP-A-58-112792, and cyanine dyes described, for example, in British Patent 434,875.

Also, near fared absorbing sensitzers described in U.S. Pat. No. 5,156,938 are preferably used. Further, substituted arylbenzo(thio)pyrylium salts described in U.S. Pat. No. 3,881,924, trimethinethiapyrylium salts described in JP-A-57-142645 (corresponding to U.S. Pat. No. 4,327,169), pyrylium compounds described in JP-A-58-181051, JP-A-58-220143, JP-A-59-41363, JP-A-59-84248, JP-A-59-84249, JP-A-59-146063 and JP-A-59-146061, cyanine dyes described in JP-A-59-216146, pentamethinethopyrylium salts described in U.S. Pat. No. 4,283,475, and pyrylium compounds described in JP-B-5-13514 and JP-B-5-19702 are also preferably used. Other preferable examples of the dye include near infrared absorbing dyes represented by formulae (I) and (II) in U.S. Pat. No. 4,756,993.

Other preferable examples of the infrared absorbing dye according to the invention include specific indolenine cyanine dyes described in JP-A-2002-278057.

Of the dyes, cyanine dyes, squarylium dyes, pyrylium dyes, nickel thiolate complexes and indolenine cyanine dyes are preferred. Further, cyanine dyes and indolenine cyanine dyes are more preferred.

Specific examples of the cyanine dye preferably used in the invention include those described in Paragraph Nos. [0017] to [0019] of JP-A-2001-133969, Paragraph Nos. [0012] to [0038] of JP-A-2002-40638 and Paragraph Nos. [0012] to [0023] of J-A-2002-23360.

The dye represented by formula (d) or formula (e) shown below is preferable from the standpoint of light-to-heat conversion property.

(d)

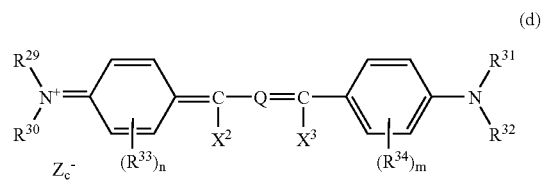

In formula (d), $R^{29}$ to $R^{32}$ each independently represents a hydrogen atom, an alkyl group or an alkyl group. $R^{33}$ and $R^{34}$ each independently represents an alkyl group, a substituted oxy group or a halogen atom. n and m each independently represents an integer of 0 to 4. $R^{29}$ and $R^{30}$ or $R^{31}$ and $R^{32}$ may be combined with each other to form a ring. Also, $R^{29}$ and/or $R^{30}$ and $R^{33}$ or $R^{31}$ and/or $R^{32}$ and $R^{34}$ may be combined with each other to form a ring. Further, when plural $R^{33}$s or $R^{34}$s are present, the $R^{33}$s or $R^{34}$s may be combined with each other to form a ring. $X^2$ and $X^3$ each independently represents a hydrogen atom, an alkyl group or an aryl group, provided that at least one of $X^2$ and $X^3$ represents a hydrogen atom or an alkyl group. Q represents a trimethine group which may have a substituent or a pentamethine group which may have a substituent or may form a ring structure together with a divalent organic group. $Zc^-$ represents a counter anion. However, $Zc^-$ is not necessary when the dye represented by formula (d) has an anionic substituent in the structure thereof and neutralization of charge is not needed. Preferable examples of the counter ion for $Zc^-$ include a halogen ion, a perchlorate ion, a tetrafluoroborate ion, a hexafluorophosphate ion and a sulfonate ion, and particularly preferable examples thereof include a perchlorate ion, a hexafluorophosphate ion and an arylsulfonate ion in view of the preservation stability of a coating solution for resin composition layer.

Specific examples of the dye represented by formula (d) preferably used in the invention include those illustrated below.

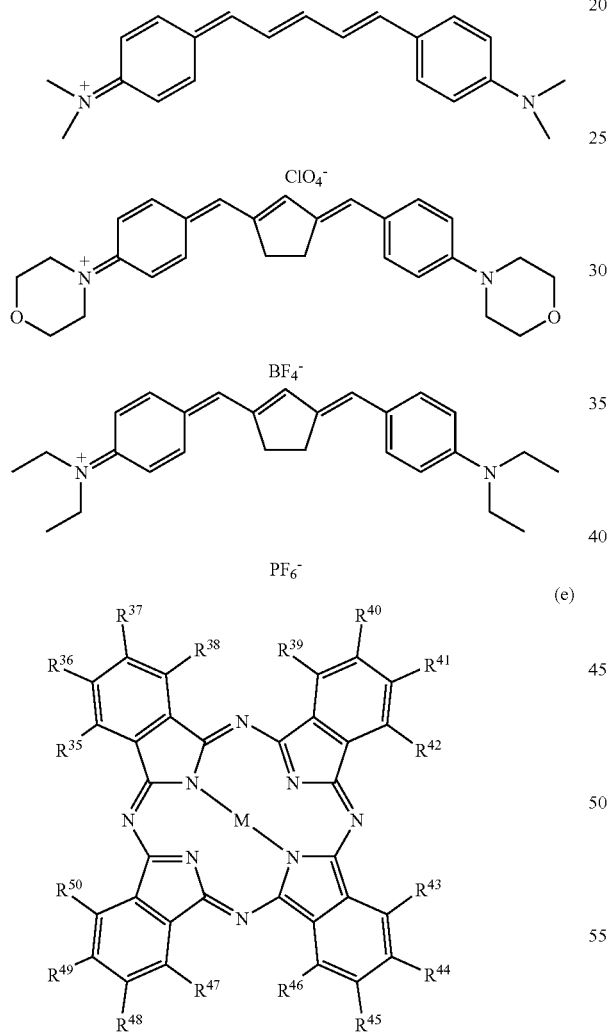

In formula (e) $R^{35}$ to $R^{50}$ each independently represents a hydrogen atom, a halogen atom, a cyano group, an alkyl group, an aryl group, an alkenyl group, an alkynyl group, a hydroxy group, a carbonyl group, a thio group, a sulfonyl group, a sulfinyl group, an oxy group, an amino group or an onium salt structure. When a substituent can be introduced into these groups, they may live the substituent. M represents two hydrogen atoms, a metal atom, a halometal group or an oxymetal group. Examples of the metal atom included therein include atoms of Groups IA, IIA, IIIB and IVB of the Periodic Table, transition metals of the first, second and third period, and lanthanoid elements. Among them, copper, magnesium, iron, zinc, cobalt, aluminum, titanium and vanadium are preferred.

Specific examples of the dye represented by formula (e) preferably used in the invention include those illustrated below.

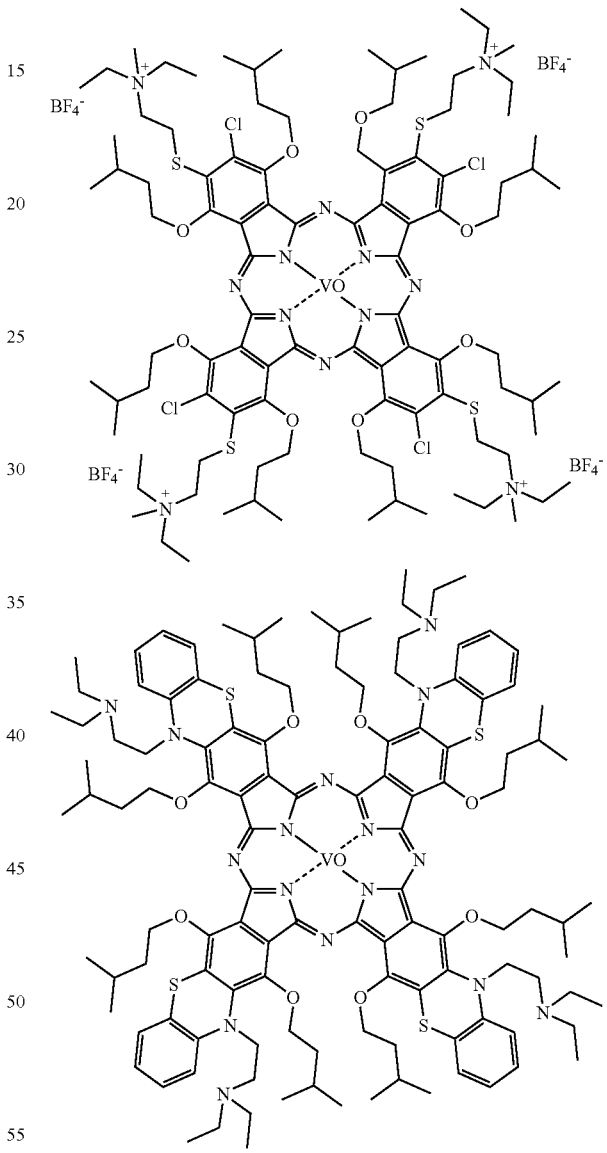

Examples of the pigment for use in the invention include commercially available pigments and pigments described in *Colour Index (C.I.)*, *Saishin Ganryo Binran* (*Handbook of the Newest Pigments*) compiled by Pigment Technology Society of Japan (1977), *Saishin Ganryo Oyou Gijutsu* (*Newest Application on Technologies for Pigments*), CMC Publishing Co., Ltd. (1986) and *Insatsu Ink Gijutsu* (*Printing Ink Technology*), CMC Publishing Co., Ltd. (1984).

Examples of the pigment include black pigments, yellow pigments, orange pigments, brown pigments, red pigments, purple pigments, blue pigments, green pigments, fluorescent pigments, metal powder pigments and polymer-bonded dyes. Specific examples of usable pigment include insoluble azo pigments, azo lake pigments, condensed azo pigments, chelated azo pigments, phthalocyanine pigments, anthraquinone pigments, perylene and perynone pigments, thioindigo pigments, quinacridone pigments, dioxazine pigments, isoindolinone pigments, quinophithalone pigments, dying lake pigments, azine pigments, nitroso pigments, nitro pigments, natural pigments, fluorescent pigments, inorganic pigments and carbon black. Of the pigments, carbon black is preferred.

The pigment may be used without undergoing surface treatment or may be used after tie surface treatment. For the surface treatment, a method of coating a resin or wax on the surface, a method of attaching a surfactant and a method of bonding a reactive substance (for example, a silane coupling agent, an epoxy compound or polyisocyanate) to the pigment surface. The surface treatment methods are described in *Kinzoku Sekken no Seishitsu to Oyo* (*Properties and Applications of Metal Soap*), Saiwai Shobo, *Insatsu Ink Gijutsu* (*Printing Ink Technology*), CMC Publishing Co., Ltd. (1984), and *Saishin Ganryo Oyo Gijutsu* (*Newest Application on Technologies for Pigments*), CMC Publishing Co., Ltd. (1986).

The pigment has a particle size of preferably from 0.01 to 10 μm, more preferably from 0.05 to 1 μm, particularly preferably from 0.1 to 1 μm. When the particle size of the pigment is 0.01 μm or more, stability of the pigment dispersion in a coating solution increases and when it is 10 μm or less, uniformity of the resin composition layer is good.

For dispersing the pigment, a known dispersion technique for use in the production of ink or toner may be used. Examples of the dispersing machine include an ultrasonic dispersing machine, a sand mill, an attritor, a pearl mill, a super-mill, a ball mill, an impeller, a disperser, a KD mill, a colloid mill, a dynatron, a three roll mill and a pressure kneader. The dispersing machines are described in detail in *Saishin Ganryo Oyo Gijutsu* (*Newest Application on Technologies for Pigments*), CMC Publishing Co., Ltd. (1986).

<Co-Sensitizer>

The sensitivity at the photo-curing of the resin composition layer can be further improved by using a certain additive (hereinafter referred to as a "co-sensitizer"). The operation mechanism of the co-sensitizer is not quite clear but may be considered to be mostly based on the following chemical process. Specifically, the co-sensitizer reacts with various intermediate active species (for example, a radical or a cation) generated during the process of photo-reaction initiated by the photopolymerization initiator and subsequent addition-polymerization reaction to produce new active radicals. The co-sensitizers are roughly classified into (a) compound which is reduced to produce an active radical, (b) compound which is oxidized to produce an active radical and (c) compound which reacts with a radical having low activity to convert it into a more highly active radical or acts as a chain transfer agent. However, in many cases, a common view about which an individual compound belongs to which type is not present.

(a) Compound Which is Reduced to Produce an Active Radical

Compound Having Carbon-Halogen Bond:

An active radical is considered to be generated by the reductive cleavage of the carbon-halogen bond. Specific examples of the compound preferably used include a trihalomethyl-s-triazine and a trihalomethyloxadiazole.

Compound Having Nitrogen-Nitrogen Bond:

An active radical is considered to be generated by the reductive cleavage of the nitrogen-nitrogen bond. Specific examples of the compound preferably used include a hexaaylbiimidazole.

Compound Having Oxygen-Oxygen Bond:

An active radical is considered to be generated by the reductive cleavage of the oxygen-oxygen bond. Specific examples of the compound preferably used include an organic peroxide.

Onium Compound:

An active radical is considered to be generated by the reductive cleavage of a carbon-hetero bond or oxygen-nitrogen bond. Specific examples of the compound preferably used include a diarryliodonium salt, a triarylsulfonium salt and an N-alkoxypyrdinium (azinium) salt.

Ferrocene and Iron-Arene Complexes:

An active radical can be reductively generated.

(b) Compound Which is Oxidized to Produce an Active Radical

Alkylate Complex:

An active radical is considered to be generated by the oxidative cleavage of a carbon-hetero bond. Specific examples of the compound preferably used include a triaryl alkyl borate.

Alkylamine Compound:

An active radical is considered to be generated by the oxidative cleavage of a C—X bond on the carbon adjacent to nitrogen, wherein X is preferably a hydrogen atom, a carboxyl group, a trimethylsilyl group or a benzyl group. Specific examples of the compound include an ethanolamine, an N-phenylglycine and an N-trimethylsilylmethylaniline.

Sulfur-Containing or Tin-Coating Compound:

A compound in which the nitrogen atom of the above-described amine compound is replaced by a sulfur atom or a tin atom is considered to generate an active radical in the same manner. Also, a compound having an S—S bond is known to effect sensitization by the cleavage of the S—S bond.

α-Substituted Methylcarbonyl Compound:

An active radical can be generated by he oxidative cleavage of carbonyl-α-carbon bond. The compound in which the carbonyl is converted into an oxime ether also shows the similar function. Specific examples of the compound include an 2-alkyl-1-[4-(alkylthio)phenyl]-2-morpholinopronone-1 and an oxime ether obtained by a reaction of the 2-alkyl-1-[4-(alkylthio)phenyl]-2-morphoinopronone-1 with a hydroxyamine and subsequent etherification of the N—OH.

Sulfinic Acid Salt:

An active radical can be reductively generated. Specific examples of the compound include sodium arylsulfinate.

(c) Compound Which Reacts with a Radical to Convert it into a More Highly Active Radial or Acts as a Chain Transfer Agent:

For example, a compound having SH, PH, SiH or GeH in its molecule is used as the compound which reacts with a radical to convert it into a more highly active radical or acts as a chain transfer agent. The compound donates hydrogen to a low active radical species to generate a radical or is oxidized and deprotonized to generate a radical. Specific examples of the compound include a 2-mercaptobenzothiazole, a 2-mercaptobenzoxazole and a 2-mercaptobenzimidazole.

A large number of examples of the co-sensitizer are more specifically described, for example, in JP-A-9-236913 as additives for the purpose of increasing sensitivity, and they can be used in the invention. Some of them are set forth below, but the invention should not be construed as being limited thereto. In the formulae below, -TMS indicates a trimethylsilyl group.

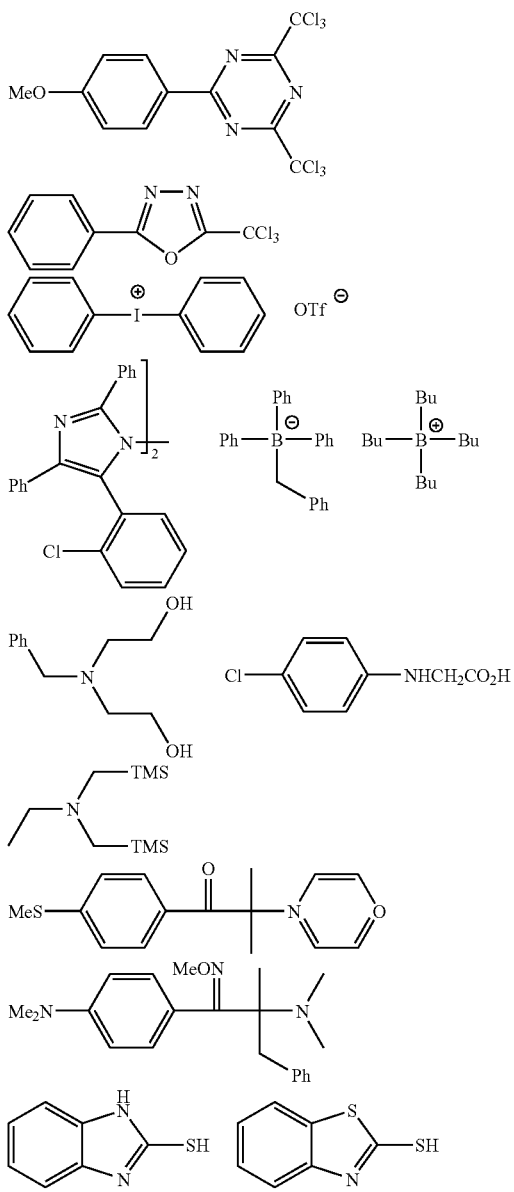

Similarly to the above-described sensitizing dye, the co-sensitizer can be subjected to various chemical modifications so as to improve the characteristics of the resin composition layer. For instance, methods, for example, binding to the sensitizing dye, initiator compound, addition-polymerizable unsaturated compound or other part introduction of a hydrophilic site, introduction of a substituent for improving compatibility or inhibiting deposition of crystal, introduction of a substituent for improving an adhesion property, and formation of a polymer, may be used.

The co-sensitizers may be used individually or in combination of two or more thereof. The amount of the co-sensitizer used is ordinarily from 0.05 to 100 parts by weight, preferably from 1 to 80 parts by weight, more preferably from 3 to 50 parts by weight, per 100 parts by weight of the polymerizable compound having an ethylenically unsaturated double bond.

<Polymerization Inhibitor>

It is preferred to add a small amount of a thermal polymerization inhibitor to the resin composition according to the invention in addition to the above-described components, in order to prevent undesirable thermal polymerization of the polymerizable compound having an ethylenically unsaturated double bond during the production or preservation of the resin composition. Suitable examples of the thermal polymerization inhibitor include hydroquinone, p-methoxyphenol, di-tert-butyl-p-cresol, pyrogallol, tert-butylcatechol, benzoquinone, 4,4'-thiobis(3-methyl-6-tert-butylphenol), 2,2'-methylenebis(4-methyl-6-tert-butylphenol) and N-nitrosophenylhydroxyamine cerium(III) salt. Also, as the polymerization inhibitor, Q-1301 (10% tricresyl phosphate solution, produced by Wako Pure Chemical Industries, Ltd.) is preferable because of extremely excellent stability at the preservation of a layer or pattern-forming material prepared by using the resin composition according to the invention. When is compound is used in combination with the above-described urethane type addition polymerizable compound, particularly, PLEX 6661-0 (produced by Degussa GmbH), the dramatically excellent preservation stability of the layer or pattern-forming material and the good laser engraving sensitivity can be obtained. The amount of the thermal polymerization inhibitor added is preferably from about 0.01 to about 5% by weight based on the total resin composition. In order to avoid polymerization inhibition due to oxygen, a higher fatty acid derivative, for example, behenic acid or behenic amide may be added and allowed to localize on the resin composition layer surface during the drying step after the coating thereof on a support, if desired. The amount of the higher fatty acid derivative added is preferably from about 0.5 to about 10% by weight based on the total resin composition.

<Coloring Agent>

A coloring agent, for example, a dye or a pigment may further be added for the purpose of coloring the resin composition layer. By the coloring, properties, for example, visibility of the image area or aptitude for an image density measurement apparatus can be improved. A pigment is preferably used as the coloring agent. Specific examples the coloring agent include a pigment, for example, a phthalocyanine pigment, an azo pigment carbon black or titanium oxide, and a dye, for example, Ethyl Violet, Crystal Violet, an azo dye, an athraquinone dye or a cyanine dye. The amount of the coloring agent added is preferably from about 0.5 to about 5% by weight based on the total resi cmposition.

<Other Additives>

Further, known additives, for example, a filler or a plasticizer may be added for improving physical properties of the cured layer.

The filler may be an organic compound, an inorganic compound or a mixture thereof. Examples of the organic compound include carbon black, carbon nanotube, fullerene and graphite. Examples of the inorganic compound include silica, alumina aluminum and calcium carbonate.

Examples of the plasticizer include dioctyl phthalate, didodecyl phtlalate, triethylene glycol dicaprylate, dimethyl glycol phthalate, tricresyl phosphate, dioctyl adipate, dibutyl sebacate and triacetyl glycerol. In the case of using a binder, the plasticizer can be added in an amount of 10% by weight or less based on the total weight of the compound having an ethylenically unsaturated double bond and the binder.

Of the plasticizers, since not only the flexibility of the layer or pattern-forming material prepared from the resin composition according to the invention becomes very well and the aptitude for a flexographic printing plate increases but also the engraving sensitivity increases, a polyethylene glycol and a polypropylene glycol (monool type or diol type) are preferable. A polypropylene glycol (monool type or diol type) is more preferable, and a polypropylene glycol (diol type, average molecular weight: 1,000) is particularly preferable. When the polypropylene glycol (monool type or diol type) plasticizer is used in combination with the above-described urethane type addition polymerizable compound, particularly, PLEX 6661-0 (produced by Degussa GmbH), the above described excellent characteristics become prominent.

(Formation of Film)

In order to mold the laser-decomposable resin composition according to the invention into a sheet form, a roll form or a cylindrical form, a molding method for conventional resin can be used. For example, a casting method, a method of extruding the resin composition from a nozzle or dies using a machine, for example, a pump or an extruder and adjusting the thickness by a blade or by calendering with a roller is exemplified. In such case, it is also possible to perform the molding accompanied with heating within a range wherein the performance of the resin composition is not damaged. Also, a rolling treatment, a grinding treatment or the like may be carried out, if desired. Ordinarily, the resin composition is molded on an underlay referred to as a back film composed of a material, for example, PET or nickel in many cases. Further, a cylindrical support made of fiber reinforced plastic (FRP), plastic or metal can also be used. As the cylindrical support, a hollow cylindrical support having a constant thickness can be used for the purpose of weight saving. The role of the back film or cylindrical support is to ensure the dimensional stability of molding. Therefore, a material with high dimensional stability should be selected. Specific examples of the material include a crystalline resin, for example, a polyester resin, a polyimide resin, a polyamide resin, polyamideimide resin, a polyetherimide resin, polybismaleimide resin, a polysulfone resin, a polycarbonate resin, a polyphenyleneether resin, a polyphenylenethioether resin, a polyethersulfone resin or a full aromatic polyester resin, a full aromatic polyamide resin and an epoxy resin. Further, the resins may be used in the form of laminate. For example, a sheet composed of a full aromatic polyamide film having a thickness of 4.5 μm both surfaces of which are laminated with a polyethylene terephthalate layer having a thickness of 50 μm is exemplified. Moreover, a porous sheet, for example, a cloth formed by knitting of fiber, a nonwoven cloth or a film having fine pores can be used as the back film. In the case of using a porous sheet as the back film, when the resin composition is impregnated into the pores of the porous sheet and subjected to light curing, a high adhesive property can be achieved by means of integration of the cured resin layer and the back film. Examples of the fiber for the formation of cloth or nonwoven cloth include, an inorganic fiber, for example, a glass fiber, alumina fiber, a carbon fiber, an alumina-silica fiber, a boron fiber, a high silicon fiber, a potassium titanate fiber or a sapphire fiber, a natural fiber, for example, cotton or hemp, a semisynthetic fiber, for example, rayon or acetate, and a synthetic fiber, for example, nylon, polyester, acryl, vinylon, polyvinyl chloride, polyolefin, polyurethane, polyimide or aramide. Furthermore, cellulose produced by a bacterium is a high crystalline nanofiber and a material capable of forming a thin and highly dimensionally stable nonwoven fiber.

<Pattern-Forming Material>

The pattern-forming material according to the invention means a pattern-forming material wherein based on laser exposure, the exposed area forms a concave portion in comparison with the unexposed area, whereby a concavo-convex pattern is formed. Therefore, it includes not only a pattern-forming material of type wherein the concave portion is directly (for example, by ablation) formed by the laser exposure but also a pattern-forming material of type wherein the concave portion is formed by conducting heating treatment or development processing with an aqueous alkali solution or the like after the laser exposure. The pattern-forming material according to the invention is particularly preferably used as the pattern-forming material of the former type.

As for the pattern-forming material according to the invention the use thereof is not particularly restricted, as long as the above-described characteristic is fulfilled, and it can be utilized over a wide range, for instance, in a printing plate precursor, for example, for lithographic printing, gravure printing, letterpress or screen printing, a printed circuit board, a photoresist material for semiconductor and a recording material for optical disc. Above all, the pattern-forming material is preferably used as a printing plate precursor for direct plate-making by engraving with laser, so-called "laser engraving". In particular, it is preferably used as a flexographic printing plate precursor and a flexographic printing plate precursor for laser engraving is a most preferable use for the pattern-forming material according to the invention.

The pattern-forming material according to the invention comprises a support having thereon at least one heat-decomposable resin layer (hereinafter, also referred to as a pattern-forming layer).

According to a first embodiment of the pattern-forming material of the invention, the pattern-forming material is characterized by having a heat-decomposable resin layer comprising the laser-decomposable resin composition according to the invention on a support. The heat-decomposable resin layer may contain the above-described polymerizable compound, initiator and other components, if desired, in addition to the specific polyurethane resin.

According to a second embodiment of the pattern-forming material of the invention, the pattern-forming material is characterized by having at least two heat-decomposable resin layers on a support wherein a resin constituting the heat-decomposable resin layer close to the support is the specific polyurethane resin according to the invention. Specifically, the pattern-forming material is characterized in that the pattern-forming layer comprises a construction of two or more layers (hereinafter, also referred to as a multilayer construction) and has a first layer close to the support (hereinafter, also referred to as an lower layer) and a second layer positioned above the first layer (hereinafter, also referred to as an upper layer) and in that as a resin constituting the lower layer is used the specific polyurethane resin according to the invention. The upper limit of number of the pattern-forming layers is not particularly restricted.

The specific polyurethane resin used in the lower layer has a feature in that the heat decomposition temperature thereof is relatively low (not higher than 250° C.).

The term "heat decomposition temperature of resin" as used herein means temperature at which decrease of weight resulting from the heat decomposition of resin initiates in TGA (thermogravimetic analysis) measurement. Specifically, the measurement of heat decomposition temperature of resin can be performed in the following manner. More specifically, 7 mg of the resin was heated from 30 to 500° C. at a temperature rising rate of 10° C./minute using a thermogravimetric apparatus (produced by TA Instruments Japan Co., Ltd.) to determine heat decomposition initiation temperature and the temperature obtained is considered as the heat decomposition temperature of the resin. The term "heat decomposition initiation temperature" as used herein means temperature at which decrease of weight resulting from the heat decomposition of the resin initiates while the resin has been heated.

In general, temperature elevation of the pattern-forming layer due to laser irradiation gradually decreases in the direction of thickness of the layer and temperature becomes relatively low in the neighborhood of support. However, in the laser-decomposable pattern-forming material according to the second embodiment of the invention, it is believed that since the heat decomposition temperature of the resin of the lower layer is low, the heat decomposition of the resin is apt to occur under the circumstances and as a result, the laser decomposability (laser engraving property) increases to achieve high sensitivity.

The lower layer of laser-decomposable pattern-forming material may contain other rein, if desire, in addition to the above-described specific polyurethane resin. Examples of the other resin include the binder polymer described above with respect to the laser-decomposable resin composition. Further, if desired, the lower layer may contain additives, for example, the polymerizable compound (monomer), initiator and other components described above with respect to the laser-decomposable resin composition.

It is desirable that such other resin and additives are used within the range wherein the heat decomposability of the lower layer is not impaired. From this point of view, a ratio of the polyurethane resin/the other components than the polyurethane resin is preferably from 50/50 to 100/0 (by weight), more preferably from 70/30 to 100/0 (by weight), and particularly preferably 100/0 (by weight).

Now, the upper layer of the laser-decomposable pattern-forming layers according to the second embodiment of the invention is described below.

The upper layer may be any layer comprising a laser-decomposable resin composition and ordinarily contains additives, for example, a polymerizable compound (monomer), initiator and other components in addition to a binder polymer.

Examples of the binder polymer for use in the upper layer include the binder polymer described above with respect to the laser-decomposable resin composition. The amount of the binder polymer added is ordinarily from 1 to 99% by weight, preferably from 5 to 80% by weight, based on the total solid content of the upper layer. The binder polymer may also used together with the conventional resin described above with respect to the laser-decomposable resin composition.

The amount of the resin used together is ordinarily from 1 to 90% by weight, preferably from 5 to 80% by weight, based on the binder polymer described above.

It is preferred that the resin constituting the upper layer has heat decomposition temperature higher than the heat decomposition temperature of the specific polyurethane resin constituting the lower layer. From the standpoint of laser decomposability (laser engraving property), the difference of heat decomposition temperatures is preferably 80° C. or more, more preferably 100° C. or more, and particularly preferably 150° C. or more.

With respect to the polymerizable compound (monomer), initiator, other additives and the like for use in the upper layer, those described for the laser-decomposable resin composition described above are exemplified, respectively.

(Support)

A material having flexibility and excellent dimensional stability is preferably used as the support of the pattern-forming material in the invention. Examples of the support include a polyethylene terephthalate film, a polyethylene naphthalate film, a polybutylene terephthalate film and a polycarbonate film. The thickness of the support is preferably from 50 to 350 µm and more preferably from 100 to 250 µm from the standpoint, for example, of mechanical characteristics, shape stability and handling property of the pattern-forming material. Also, in order to increase adhesion between the support and the pattern-forming layer, a known adhesive layer conventionally used for such a purpose may be provided on the surface of the support, if desired.

Further, the adhesion property to the pattern-forming layer or the adhesive layer can be improved by conducting physical or chemical treatment on the surface of support used in the invention. Examples of the physical treatment include a sand blast method, a wet sand blast method spraying liquid containing fine particles, a corona discharge treatment method, a plasma treatment method or an ultraviolet ray or vacuum ultraviolet ray irradiation treatment method. Examples of the chemical treatment include a strong acid treatment method, a strong alkali treatment method, an oxidant treatment method and a coupling agent treatment method.

(Patter-Forming Layer)

The patter-forming layer according to the invention is preferably prepared, for example, by a method of dissolving the constituting components of the layer in a solvent and coating on a support, followed by drying or a method of kneading the constituting components of the layer by a kneader and casting on a support. In order to prepare a plurality of patter-forming layers, a method wherein the components of each layer were dissolved in a solvent and the lower layer is coated on a support, followed by drying and the upper layer is coated on the lower layer, followed by drying or a method wherein the components of each layer were kneaded by a kneader and casting successively on a support is preferably used.

It is preferred at the pattern-forming layer according to the invention is cured by crosslinking polymerization) before the decomposition with laser from the standpoint of increasing the strength of layer. In order to cure the layer, it is preferred to incorporate the polymerizable compound as described above into the layer. This method is ordinarily employed as a means for increasing the strength of layer in a negative-type (polymerization type) photosensitive material, and it is believed that the similar result can also be achieved in the invention.

The method is particularly effective in the case wherein the pattern-forming material is a flexographic printing plate precursor for laser engraving. By the curing before the laser engraving, advantages are obtained in that a relief formed by the laser engraving becomes sharp and in that tackiness of engraved scrap generated at the laser engraving can be restrained.

The method for curing the layer can be used without any particular limitation as long as it is possible to cause polymerization reaction of the polymerizable compound, for example, to heat the layer, to irradiate the layer with light or to incorporate a photo- or heat-polymerization initiator or the like into the layer and to perform light irradiation of heating.

Among them, as the method for curing, the heating of the layer is preferable in view of ease of operation. For the heating to cause crosslinking polymerization) of the layer before the laser decomposition, any heating method, for example, an oven, a thermal head, a heating roll or a laser beam can be used. When the temperature control is necessary, it can be performed by controlling the temperature of the oven, thermal head or heating roll or by controlling the intensity or spot diameter of the laser beam. The heating temperature is preferably from 40 to 250° C., more preferably from 60 to 220° C., and sill more preferably from 80 to 200° C., from the standpoint of thermal stability of the coexisting organic compound.

The thickness of the pattern-forming layer (total thickness of the lower layer and the upper layer in the case of a multi-layer construction) is ordinarily from 0.0005 to 10 mm, and preferably from 0.005 to 7 mm.

The thickness of the layer for use in the laser engraving can be appropriately determined depending on the purpose of utilization. The thickness is preferably in a range of 0.05 to 10 mm, and more preferably in a range of 0.1 to 7 mm.

A ratio of the thickness of lower layer/upper layer is preferably in a range of 30/70 to 95/5, more preferably in a range of 50/50 to 95/5, and particularly preferably in a range of 70/30 to 90/10.

In some cases, the layers having different compositions may be multiply laminated. As a combination of plural layers, for example, it is possible to from a layer capable of undergoing engraving using a laser having an emitting wavelength in a near infrared region, for example, a YAG laser, a fiber laser or a semiconductor laser as the uppermost layer and under the layer, a layer capable of undergoing laser engraving using an infrared laser, for example, a carbon dioxide gas laser or a visible-ultraviolet laser is formed. In the case of conducting the laser engraving of such laminate, different laser engraving apparatus equipped with an infrared laser and a near infrared laser respectively can be employed or one laser engraving apparatus equipped with both of an infrared laser and a near infrared laser can be employed.

According to the invention, a cushion layer composed of a resin or rubber having cushioning property can be formed between the support and the pattern-forming layer or between the pattern-forming layer and the adhesive layer. In the case of forming the cushion layer between the support and pattern-forming layer, a method of preparing the cushion layer having an adhesive layer on one side and pasting the adhesive layer side thereof onto the support is simple. After pasting the cushioning layer, the surface may be subjected to cutting and polishing to shape. In a simpler manner, a liquid adhesive composition is coated on the support in a constant thickness and cured with light to from the cushion layer. It is preferable for the cushion layer to have the cushioning property that the hardness of the cushion layer cured with light is low. The resin layer cured with light having the cushioning property may contain bubbles.

<Laser Engraving>

In the laser engraving, a relief image is formed on the pattern-forming material by making digitalized data based on the image to be formed and operating a laser equipment utilizing a computer.

As described above, the pattern-forming material for use in laser engraving is not particularly restricted, and the flexographic printing plate precursor for laser engraving is particularly preferably used.

The laser used in the laser engraving can be any laser as long as it is able to form a pattern by laser ablation of the pattern-forming material. In order to carry out the engraving with high speed, a laser having a high power is desirable. One preferable example of the laser is a laser having an emitting wavelength in an infrared region or near infrared region, for example, a carbon dioxide gas laser, a YAG laser, a semiconductor laser or a fiber laser. Also, an ultraviolet laser having an emitting wavelength in an ultraviolet region, for example, an excimer laser, a YAG laser wavelength-converted to the third harmonic or the fourth harmonic or a copper vapor laser is also able to conduct ablation processing which cleaves a bond between molecules of organic compound and thus is suitable for microfabrication. A laser having an extremely high peak power, for example, a fermtosecond laser can also be employed. The laser irradiation may be performed continuously or pulsewise. As for the flexographic printing plate precursor for laser engraving, a carbon dioxide gas laser or a YAG laser is preferably used.

Although the engraving with laser is conducted under oxygen-containing gas, ordinarily in the presence of air or in airflow, it can be conducted under carbon dioxide gas or nitrogen gas. After the completion of the engraving, the powdery or liquid substance (scrap) occurred on the surface of relief image can be removed by an appropriate method, for example, a method of washing out, for example, with a solvent or water containing a surfactant, a method of spraying an aqueous cleaning agent, for example, by a high-pressure sprayer, a method of spraying high-pressure steam, or a method of wiping off with cloth or the like.

The laser-decomposable resin composition according to the invention can be applied to various usages, for example, a stamp, a seal, a design roll for embossing, a relief image for patterning an insulator, resistor or conductive paste used for the production of electronic components, a relief image for a mold material of ceramic materials, a relief image for display, for example, an advertising board or a sign board, or a prototype or matrix of various moldings, as well as the relief image.

It is also achieved to decrease tackiness on the surface of pattern image by forming a modifying layer on the surface of pattern image after the laser engraving. As the modifying layer, a coating treated with a compound reacting with the surface hydroxy group of the pattern image, for example, a silane coupling agent or a titanium coupling agent or a polymer film containing porous inorganic particles is exemplified. The silane coupling agent widely used is a compound having in its molecule a functional group having high reactivity with the surface hydroxy group of the pattern image. Examples of such a functional group include a trimethoxysilyl group, an triethoxysilyl group, a trichlorosilyl group, a diethoxysilyl group, a dimethoxysilyl group, a dichlorosilyl group, a monoethoxysilyl group, a monomethoxysilyl group and a monochlorosilyl group. At least one of the functional groups is present in the molecule of the compound and the compound is fixed on the surface of the pattern image by the reaction of the functional group with the surface hydroxy group of the pattern image. Further, as the compound constituting the silane coupling agent according to the invention, that having in its molecule at least one reactive functional group selected from an acryloyl group, a methacryloyl group, an active halogen-containing amino group, an epoxy group, a vinyl group, a perfluoroalkyl group and a mercapto group or that having in its molecule a long chain alkyl group is also used. When the coupling agent fixed on the surface has particularly a polymerizable reactive group in its molecule, the more solid coating can be formed by irradiating the surface with light, heat or an electron beam to form crosslinkage after the fixing the coupling agent on the surface.

EXAMPLES

The present invention will be described in more detail with reference to the following examples, but the invention should not be construed as being limited thereto.

<Synthesis of Specific Polyurethane Resin>

Synthesis Example 1

Synthesis of Polyurethane Resin P-1

In a 500 ml 3-necked round-bottom flask equipped with a condenser and a stirrer, 8.2 g (0.05 moles) of 2,2-bis(hydroxymethyl)butanoic acid and 13.0 g (0.05 moles) of Diol compound (1) show below were dissolve in 100 ml of N,N-dimethylacetamide. To the solution were added 25.5 g (0.102 moles) of 4,4-diphenylmethane diisocyanate and 0.1 g of dibutyltin dilaurate, and the mixture was heated at 100° C. for 8 hours with stirring. Then, the reaction mixture was diluted with 100 ml of N,N-dimethylformamide and 200 ml of methyl alcohol and stirred for 30 minutes. The reaction solution was poured into 3 liters of water with stirring to deposit a white polymer. The polymer was collected by filtration, washed with water and dried under vacuum to obtain 37 g of the polymer.

As a result of measurement of a molecular weight by gel permeation chromatography (GPC), a weight average molecular weight (in terms of standard polystyrene) of the polymer was 95,000.

Synthesis Example 2

Synthesis of Polyurethane Resin P-5

In a 500 ml 3-necked round-bottom flask equipped with a condenser and a stirrer, 5.9 g (0.04 moles) of 2,2-bis(hydroxymethyl)butanoic acid and 15.9 g (0.06 moles) of Diol compound (2) shown below were dissolve in 100 ml of N,N-diethylacetamide. To the solution were added 20.4 g (0.082 moles) of 4,4-diphenylmethane isocyanate, 3.4 g (0.02 moles) of 1,6-hexamethylene diisocyanate and 0.1 g of dibutyltin dilaurate, and the mixture was heated at 100° C. for 8 hours with stirring. Then, the reaction mixture was diluted with 100 ml of N,N-dimethylformamide and 200 ml of methyl alcohol and stirred for 30 minutes. The reaction solution was poured into 3 liters of water wit stirring to deposit a white polymer. The polymer was collected by filtration, washed with water and dried under vacuum to obtain 34 g of the polymer.

As a result of measurement of a molecular weight by gel permeation chromatography (GPC), a weight average molecular weight (in terms of standard polystyrene) of the polymer was 99,000.

Synthesis Example 3

Synthesis of Polyurethane Resin P-6

In a 500 ml 3-necked round-bottom flask equipped with a condenser and a stirrer, 5.4 g (0.04 moles) of 2,2-bis(hydroxymethyl)propionic acid and 15.6 g (0.06 moles) of Diol compound (3) shown below were dissolve in 100 ml of N,N-dimethylacetamide. To the solution were added 21.4 g (0.102 moles) of naphthalene diisocyanate and 0.1 g of dibutyltin dilaurate, and the mixture was heated at 100° C. for 8 hours with stirring. Then, the reaction mixture was diluted with 100 ml of N,N-dimethylformamide and 200 ml of methyl alcohol and stirred for 30 minutes. The reaction solution was poured into 3 liters of water with stirring to deposit a white polymer. The polymer was collected by filtration, washed with water and dried under vacuum to obtain 34 g of the polymer.

As a result of measurement of a molecular weight by gel permeation chromatography (GPC), a weight average molecular weight (in terms of standard polystyrene) of the polymer was 96,000.

Diol Compound (1):

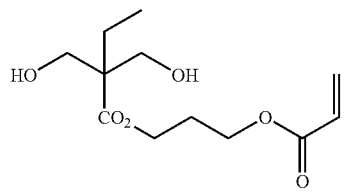

Diol Compound (2):

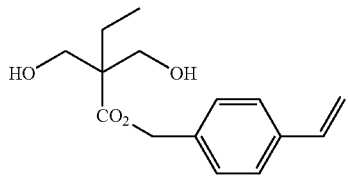

Diol Compound (3):

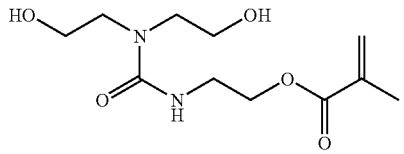

Examples 1 to 14 and 1a and Comparative Examples 1 to 3

<Measurement of Heat Decomposition Initiation Temperature>

Seven milligrams of each of the resins (the specific polyurethane resins according to the invention, a comparative polyurethane resin and comparative resins) as sown in Table A below was heated from 30 to 500° C. at a temperature rising rate of 10° C./minute using a thermogravimetric apparatus (produced by TA Instruments Japan Co. Ltd.) to determine heat decomposition initiation temperature. With respect to Specific polyurethane resins P-37 and P-38, using 1 g of Specific polyurethane resin P-37 or P-38, a 48% by weight methyl ethyl ketone solution was prepared, the solution was cast on a glass petri dish and dried under a reduced pressure for 6 hours at 50° C. to remove methyl ethyl ketone, and the resulting solid was used as the sample for measurement. The term "heat decomposition Initiation temperature" as used herein means temperature at which decrease of weight resulting from the heat decomposition of a sample initiates while the sample has been heated. The results obtained are shown in Table A below.

TABLE A

| Resin | | Heat Decomposition Initiation Temperature (° C.) |
|---|---|---|
| Example 1 | Specific Polyurethane Resin P-1 | 229 |
| Example 2 | Specific Polyurethane Resin P-5 | 231 |
| Example 3 | Specific Polyurethane Resin P-6 | 235 |
| Example 4 | Specific Polyurethane Resin P-21 | 230 |
| Example 5 | Specific Polyurethane Resin P-29 | 240 |
| Example 6 | Specific Polyurethane Resin P-30 | 240 |
| Example 7 | Specific Polyurethane Resin P-31 | 245 |
| Example 8 | Specific Polyurethane Resin P-32 | 210 |
| Example 9 | Specific Polyurethane Resin P-33 | 215 |
| Example 10 | Specific Polyurethane Resin P-34 | 205 |
| Example 11 | Specific Polyurethane Resin P-35 | 195 |
| Example 12 | Specific Polyurethane Resin P-36 | 185 |
| Example 13 | Specific Polyurethane Resin P-37 | 244 |
| Example 14 | Specific Polyurethane Resin P-38 | 258 |
| Example 1a | Specific Polyurethane Resin P-39 | 170 |
| Comparative Example 1 | Comparative Polyurethane Resin CP-1 | 400 |
| Comparative Example 2 | Comparative Resin CP-2 | 412 |
| Comparative Example 3 | Comparative Resin CP-3 | 410 |

Comparative Polyurethane Resin CP-1:

Polyurethane resin synthesized from Diisocyanate Compound (X) shown below and Diol Compound (Y) shown below (1:1 in molar ratio) (weight average molecular weight: 32,000)

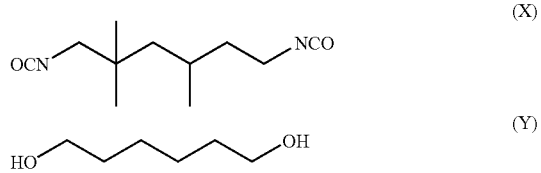

Comparative Resin CP-2:

Styrene-butadiene block copolymer (trade name: TR2000, produced by JSR Corp) Comparative Resin CP-3:

Polymethyl methacrylate (weight average molecular weight: 21,000, produced by Aldrich Corp.)

From the results shown in Table A, it is apparent that the resins in the examples according to the invention exhibit the remarkably low heat decomposition initiation temperature and excellent in the heat decomposability in comparison with the resins in the comparative examples. These results indicate the effect of improving the heat decomposability due to the specific polyurethane resin according to the invention. Considering that the decrease in the heat decomposition initiation temperature is not recognized as is apparent from the comparison of the case wherein the polyurethane resin not containing an aromatic group as in Comparative Example 1 with the cases wherein the resin other than the polyurethane is used as in Comparative Examples 2 and 3, it is highly surprising that the specific polyurethane resin according to the invention has such unique properties.

Examples 15 to 27 an Comparative Examples 4 to 5

<Preparation of Pattern-Forming Material>

The polyurethane resin, binder polymer, additive and laser absorber as shown in Table B below were mixed in a kneader for laboratory at material temperature of 100° C. for 20 minutes to uniformly disperse the laser absorber. The resulting mixture was then dissolved in toluene together with the polymerizable compound and initiator as shown in Table B below at 100° C., cooled to 40° C. and cast on a PET film having a thickness of 125 μm. The film was dried in he atmosphere at room temperature for 48 hours and then dried at 90° C. for 1.5 hours. Thereafter, the relief layer (layer thickness: 1,000 μm) formed was laminated to a PET film having a thickness of 125 μm coated with a mixture of adhesion components. Thus, the relief layer was transferred to the PET film having a thickness of 125 μm coated with a mixture of adhesion components. Then, the relief layer was heated using an over equipped with an exhaust system at normal pressure and at 180° C. for 20 minutes to crosslink the relief layer. The crosslinking of the relief layer was confirmed by observation of the disappearance of the peak derived from a carbon-carbon unsaturated bond using FT-IR. Thus, a pattern-forming material was prepared.

TABLE B

| Composition of Pattern-Forming Layer | Amount (% by weight) |
|---|---|
| Polyurethane resin (shown in Table C) | Amount shown in Table C |
| Binder polymer: Styrene-butadiene block copolymer (trade name: TR2000, produced by JSR Corp.) | Amount shown in Table C |
| Polymerizable compound: Hexanediol dimethacrylate | 5.00 |
| Polymerizable compound: Lauryl acrylate | 5.00 |
| Initiator: Irugacure 369 (produced by Ciba-Geigy Corp.) | 1.00 |
| Laser absorber: Finely divided carbon black | 3.00 |
| Additive (ozone degradation preventing wax): 1,4-Benzoquinone | 1.00 |

<Laser Engraving of Pattern-Forming Material>

Engraving by laser irradiation was performed using a high-grade $CO_2$ Laser Marker ML-9100 Series (produced by Keyence Corp.) at 12 W and line speed of 20 cm/sec with respect to a carbon dioxide ($CO_2$) laser or using a Marker Engine 3000 (produced by Laserfront Technologies, Inc.) at 10 W and line speed of 10 cm/sec with respect to a Nd-YAG laser. The difference of height between the laser irradiation portion (concave portion) and laser unirradiation portion was measured by ultra-deep profile measuring microscope (VK-8500, produced by Keyence Corp.) to evaluate the depth of laser engraving. The results are shown in Table C. As the value of the depth of laser engraving is large, the laser engraving is preformed in higher sensitivity.

TABLE C

| | Polyurethane Resin | | Amount of Binder | | Depth of |
|---|---|---|---|---|---|
| | Kind | Amount (% by weight) | Polymer (% by weight) | Kind of Laser | Engraving (μm) |
| Example 15 | P-29 | 85.00 | 0 | $CO_2$ | 300 |
| Example 16 | P-29 | 20.00 | 65.00 | $CO_2$ | 280 |
| Example 17 | P-30 | 85.00 | 0 | $CO_2$ | 310 |
| Example 18 | P-31 | 85.00 | 0 | $CO_2$ | 300 |
| Example 19 | P-32 | 85.00 | 0 | $CO_2$ | 330 |
| Example 20 | P-32 | 20.00 | 65.00 | $CO_2$ | 300 |
| Example 21 | P-32 | 85.00 | 0 | Nd-YAG | 150 |
| Example 22 | P-34 | 85.00 | 0 | $CO_2$ | 350 |
| Example 23 | P-35 | 85.00 | 0 | $CO_2$ | 380 |
| Example 24 | P-35 | 20.00 | 65.00 | $CO_2$ | 355 |
| Example 25 | P-36 | 85.00 | 0 | $CO_2$ | 415 |
| Example 26 | P-36 | 20.00 | 65.00 | $CO_2$ | 400 |
| Example 27 | P-36 | 85.00 | 0 | Nd-YAG | 185 |
| Comparative Example 4 | None | 0 | 85.00 | $CO_2$ | 195 |
| Comparative Example 5 | CP-1 | 85.00 | 0 | Nd-YAG | 50 |

From the results show in Table C, it is apparent that the resin compositions in the examples according to the invention exhibit the large depth of laser engraving in comparison with the resin compositions in the comparative examples. It can be seen that the heat decomposability of the resin composition increases and the laser engraving is performed in high sensitivity by using the specific polyurethane resin according to the invention.

Examples 28 to 33 and 46 to 47 and Comparative Examples 6 to 9

<Preparation of Pattern-Forming Material>

The composition for pattern-forming layer shown in Table D below was cast in a frame (15 cm×15 cm) made of teflon adhered on a PET film (thickness: 0.2 mm) with a cellophane tape and dried in an oven at 40° C. for 3 hours to form a layer (thickness: 1.2 mm). The thickness of the layer was controlled by scraping out the excess composition for pattern-forming layer run over from the frame with a horizontal metal ruler. Then, using an ultrahigh pressure mercury lamp having an emission wavelength in an ultraviolet region, one side (surface 1) of the resulting layer was overall exposed (exposure amount: about 1,500 mJ/cm$^2$) and then the opposite side (surface 2) of the resulting layer was overall exposed (exposure amount: about 600 mJ/cm$^2$) to prepare a pattern-forming material. With respect to Specific polyurethane resins P-37 and P-38, a 48% by weight methyl ethyl ketone solution of each of Specific polyurethane resins P-37 and P-38 was prepared and used.

TABLE D

| Composition of Pattern-Forming Layer | Amount |
| --- | --- |
| Resin (shown in Table E) | 100.9 g |
| Polymerizable compound (shown in Table E) | 24.4 g |
| Methyl ethyl ketone | 29.6 g |
| Polypropylene glycol (average molecular weight: 1,000, produced by Wako Pure Chemical industries, Ltd.) | 24.4 g |
| Initiator: Irugacure 184 (produced by Ciba-Geigy Corp.) | 2.0 g |
| Polymerization inhibitor: N-nitrosophenylhydroxylamine aluminum salt (Q-1301: 10% tricresyl phosphate solution, produced by Wako Pure Chemical industries, Ltd.) | 0.5 g |

<Laser Engraving of Pattern-Forming Material>

The laser engraving was performed on the surface 1 of the pattern-forming material in the same manner as in Examples 15 to 27 and the depth of laser engraving was evaluated, The results are shown in Table E.

TABLE E

| | Resin | Polymerizable Compound | Kind of Laser | Depth of Engraving (μm) |
| --- | --- | --- | --- | --- |
| Example 28 | Specific Polyurethane Resin P-37 | PLEX 6661-0 | $CO_2$ | 540 |
| Example 29 | Specific Polyurethane Resin P-38 | PLEX 6661-0 | $CO_2$ | 530 |
| Example 30 | Specific Polyurethane Resin P-37 | M-1 | $CO_2$ | 450 |
| Example 31 | Specific Polyurethane Resin P-37 | PLEX 6661-0 | Nd-YAG | 190 |
| Example 32 | Specific Polyurethane Resin P-38 | PLEX 6661-0 | Nd-YAG | 190 |
| Example 33 | Specific Polyurethane Resin P-37 | M-1 | Nd-YAG | 140 |
| Example 46 | Specific Polyurethane Resin P-39 | PLEX 6661-0 | $CO_2$ | 580 |
| Example 47 | Specific Polyurethane Resin P-39 | PLEX 6661-0 | Nd-YAG | 220 |
| Comparative Example 6 | Comparative Resin CP-2 | PLEX 6661-0 | $CO_2$ | 270 |
| Comparative Example 7 | Comparative Resin CP-2 | M-1 | $CO_2$ | 270 |
| Comparative Example 8 | Comparative Resin CP-2 | PLEX 6661-0 | Nd-YAG | 45 |
| Comparative Example 9 | Comparative Resin CP-2 | M-1 | Nd-YAG | 50 |

PLEX 6661-0 (produced by Degussa GmbH
Mixture of the following structural isomers

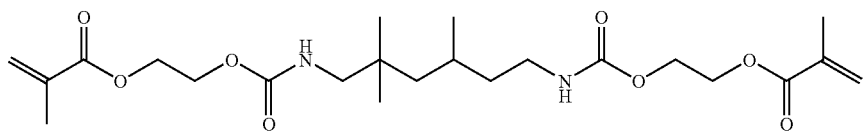

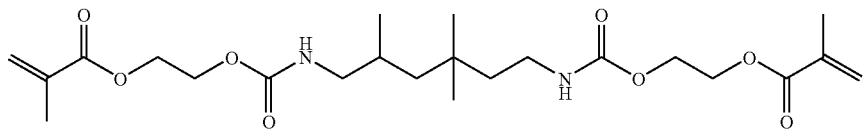

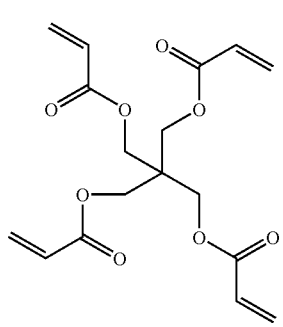

M-1

From the results shown in Table E, it is apparent that the resin compositions in the examples according to the invention exhibit the large depth of laser engraving in comparison with the resin compositions in the comparative examples. It can be seen that by using the specific polyurethane resin according to the invention, the heat decomposability of the resin composition increases and the laser engraving is performed in higher sensitivity when used together with the urethane type addition-polymerizable compound.

Examples 34 to 45 an Comparative Examples 10 to 15

<Preparation of Pattern-Forming Material>

One hundred grams of each of the resins (the specific polyurethane resins according to the invention and comparative resins) as sown in Table F below was stirred in a kneader for laboratory at material temperature of 120° C. to melt, cooled to 70° C. and cast on a PET film support having a thickness of 125 μm. The film was dried in the atmosphere at room temperature for 48 hours and then dried at 80° C. for 3 hours to prepare a lower layer The binder polymer, additive and laser absorber as shown in Table G below were mixed in a kneader for laboratory at material temperature of 120° C. for 15 minutes to uniformly disperse the laser absorber. The resulting mixture was then dissolved in toluene together with the polymerizable compound as shown in Table G below at 100° C., cooled to 60° C. and cast on a PET film having a thickness of 125 μm. The film was dried in the atmosphere at room temperature for 48 hours and then dried at 80° C. for 3 hours to prepare an upper layer. Then, the upper layer was brought into close contact with the lower layer to form a laminate and the PET film of the upper layer was peeled off so that a pattern-forming material having the lower layer (thickness: 0.94 mm) and the upper layer (thickness: 0.20 mm) provided on the PET film support was prepared.

TABLE F

| | Resin of Lower Layer | | Difference of Heat Decomposition Temperature between Upper Layer and Lower Layer (° C.) | Kind of Laser | Depth of Engraving (μm) |
|---|---|---|---|---|---|
| | Kind | Heat Decomposition Temperature (° C.) | | | |
| Example 34 | P-1 | 229 | 156 | $CO_2$ | 280 |
| Example 35 | P-5 | 231 | 154 | $CO_2$ | 285 |
| Example 36 | P-6 | 235 | 150 | $CO_2$ | 290 |
| Example 37 | P-21 | 230 | 155 | $CO_2$ | 285 |
| Example 38 | P-29 | 240 | 145 | $CO_2$ | 265 |
| Example 39 | P-30 | 240 | 145 | $CO_2$ | 260 |
| Example 40 | P-31 | 245 | 140 | $CO_2$ | 260 |
| Example 41 | P-32 | 210 | 175 | $CO_2$ | 310 |
| Example 42 | P-33 | 215 | 170 | $CO_2$ | 300 |
| Example 43 | P-33 | 215 | 170 | Nd-YAG | 120 |
| Example 44 | P-35 | 195 | 190 | $CO_2$ | 325 |
| Example 45 | P-36 | 185 | 200 | $CO_2$ | 340 |
| Comparative Example 10 | CP-1 Singe Layer | — | — | $CO_2$ | 195 |
| Comparative Example 11 | Lower Layer: CP-2/ Upper Layer: CP-1 | — | 75 | $CO_2$ | 220 |
| Comparative Example 12 | Lower Layer: CP-3/ Upper Layer: CP-1 | — | 12 | $CO_2$ | 195 |
| Comparative Example 13 | CP-1 Singe Layer | — | — | Nd-YAG | 52 |
| Comparative Example 14 | Lower Layer: CP-2/ Upper Layer: CP-1 | — | 75 | Nd-YAG | 53 |
| Comparative Example 15 | Lower Layer: CP-3/ Upper Layer: CP-1 | — | 12 | Nd-YAG | 54 |

Comparative Resin CP-1:
Styrene-butadiene block copolymer (trade name: TR2000, produced by JSR Corp.)(Heat decomposition temperature: 412° C.)

Comparative Resin CP-2:
Aliphatic polyurethane resin synthesized from Diisocyanate Compound (X) shown below and Diol Compound (Y) shown below (1:1 in molar ratio) (weight average molecular weight: 32,000)(Heat decomposition temperature: 337° C.)

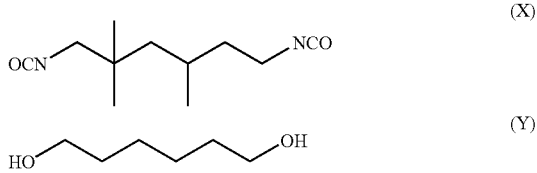

Comparative Resin CP-3:
Styrene-isoprene-styrene block copolymer (produced by Aldrich Corp.)(Heat decomposition temperature: 400° C.)

The heat decomposition temperature of the resin was obtained in the following manner.

Seven milligrams of the resin was heated from 30 to 500° C. at a temperature rising rate of 10° C./minute using a thermogravimetric apparatus produced by TA Instruments Japan Co., Ltd.) to determine heat decomposition initiation temperature. The value obtained was considered as the heat decomposition temperature of the resin. The term "heat decomposition initiation temperature" as used herein means temperature at which decrease of weight resulting from the heat decomposition of the resin initiates while the resin has been heated.

TABLE G

| Composition of Pattern-Forming Layer | Amount (% by weight) |
| --- | --- |
| Binder polymer: Styrene-butadiene block copolymer (trade name: TR2000, produced by JSR Corp.) | 80.00 |
| Polymerizable compound: Hexanediol dimethacrylate | 14.00 |
| Laser absorber: Finely divided carbon black | 5.00 |
| Additive (ozone degradation preventing wax): 1,4-Benzoquinone | 1.00 |

<Laser Engraving of Pattern-Forming Material>

Engraving by laser irradiation was performed using a high-grade $CO_2$ Laser Marker ML-9100 Series (produced by Keyence Corp.) at 12 W and line speed of 10 cm/sec with respect to a carbon dioxide ($CO_2$) laser or using a Marker Engine 3000 (produced by Laserfront Technologies, inc.) at 10 W and line speed of 10 cm/see with respect to a Nd-YAG laser. The difference of height between the laser irradiation portion (concave portion) and laser unirradiation portion was measured by ultra-deep profile measuring microscope (VK-8500, produced by Keyence Corp.) to evaluate the depth of laser engraving. The results are shown in Table F. As the value of the depth of laser engraving is large, the laser engraving is performed in higher sensitivity.

From the results shown in Table F, it is apparent that the examples according to the invention exhibit the large depth of laser engraving in comparison with the comparative examples. It can be seen that the heat decomposability of the resin increases and the laser engraving is performed in high sensitivity by using the specific polyurethane resin according to the invention in the lower layer.

Further, it can be understood that the extent of increase in the depth of laser engraving when Examples 42 and 43 using the specific polyurethane resin according to the invention in the lower layer are compared with Comparative Examples 10 and 13 having the pattern-forming layer composed of a single layer is extremely large in comparison with the extent of increase in the depth of laser engraving when Comparative Examples 11 and 14 using the polyurethane resin containing no aromatic group in the lower layer are compared with Comparative Examples 10 and 13 having the pattern-forming layer composed of a single layer. These facts illustrate the unique properties of the polyurethane resin including an aromatic group according to the invention which are highly surprising.

This application is based on Japanese Patent application JP 2006-237784, filed Sep. 1, 2006, Japanese Patent application JP 2006-263213, filed Sep. 27, 2006, and Japanese Patent application JP 2007-85986, filed Mar. 28, 2007, the entire contents of which are hereby incorporated by reference, the same as if fully set forth herein.

Although the invention has been described above in relation to preferred embodiments and modifications thereof, it will be understood by those skilled in the art that other variations and modifications can be effected in these preferred embodiments without departing from the scope and spirit of the invention.

What is claimed is:

1. A laser-decomposable pattern-forming material comprising a support, a first heat-decomposable resin layer and a second heat-decomposable resin layer provided in this order, wherein a resin constituting the first heat-decomposable resin layer is a polyurethane resin having a structure wherein an aromatic group is directly connected to a urethane bond.

2. The laser-decomposable pattern-forming material as claimed in claim 1, wherein heat decomposition temperature of a resin constituting the second heat-decomposable resin layer is higher than heat decomposition temperature of the polyurethane resin having a structure wherein an aromatic group is directly connected to a urethane bond.

3. The laser-decomposable pattern-forming material as claimed in claim 1, wherein the polyurethane resin is a polyurethane resin comprising a urethane bond represented by the following formula (1):

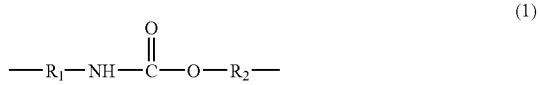

wherein, $R_1$ and $R_2$ each independently represents a divalent organic group, provided that at least one of $R_1$ and $R_2$ is an aromatic group.

4. The laser-decomposable pattern-forming material as claimed in claim 3, wherein $R_2$ in the formula (1) represents an aromatic group.

5. The laser-decomposable pattern-forming material as claimed in claim 3, wherein $R_1$ and $R_2$ in the formula (1) each represents an aromatic group.

6. The laser-decomposable pattern-forming material as claimed in claim 1, wherein the polyurethane resin further has a carbonate site.

* * * * *